(12) United States Patent
Hunnicutt

(10) Patent No.: US 8,393,344 B2
(45) Date of Patent: Mar. 12, 2013

(54) MICROVALVE DEVICE WITH PILOT OPERATED SPOOL VALVE AND PILOT MICROVALVE

(75) Inventor: Harry A. Hunnicutt, Austin, TX (US)

(73) Assignee: DunAn Microstaq, Inc., Austin, TX (US)

( * ) Notice: Subject to any disclaimer, the term of this patent is extended or adjusted under 35 U.S.C. 154(b) by 768 days.

(21) Appl. No.: 12/569,361

(22) Filed: Sep. 29, 2009

(65) Prior Publication Data

US 2010/0012195 A1    Jan. 21, 2010

Related U.S. Application Data

(63) Continuation-in-part of application No. PCT/US2008/004139, filed on Mar. 28, 2008.

(60) Provisional application No. 60/921,142, filed on Mar. 30, 2007.

(51) Int. Cl.
*F16K 11/07* (2006.01)
*F16K 31/383* (2006.01)
*F16K 31/40* (2006.01)

(52) U.S. Cl. ............ 137/1; 137/625.34; 251/25; 251/26
(58) Field of Classification Search ............. 137/625.34, 137/1; 251/25, 26
See application file for complete search history.

(56) References Cited

U.S. PATENT DOCUMENTS

| | | | |
|---|---|---|---|
| 668,202 A * | 2/1901 | Nethery | 251/25 |
| 886,045 A | 4/1908 | Ehrlich et al. | |
| 1,886,205 A | 11/1932 | Lyford | |
| 1,926,031 A | 9/1933 | Boynton | |
| 2,412,205 A | 12/1946 | Cook | |
| 2,504,055 A | 4/1950 | Thomas | |
| 2,651,325 A * | 9/1953 | Lusignan, Jr. | 251/26 |
| 2,840,107 A | 6/1958 | Campbell | |
| 2,875,779 A | 3/1959 | Campbell | |

(Continued)

FOREIGN PATENT DOCUMENTS

| CN | 200880014057.X | 7/2010 |
|---|---|---|
| CN | 10161715513 | 3/2012 |

(Continued)

OTHER PUBLICATIONS

Chinese Office Action, Application No. 200880014057.X dated Jul. 14, 2010.

(Continued)

*Primary Examiner* — John Rivell
(74) *Attorney, Agent, or Firm* — MacMillan, Sobanski & Todd, LLC

(57) ABSTRACT

The microvalve device includes a pilot microvalve and a pilot operated spool valve. The pilot microvalve includes a pilot input orifice; a pilot output orifice, at least one of the pilot input orifice and the pilot output orifice having a cross-section flow area that changes as the pilot microvalve is actuated; and a passageway providing fluid communication between the pilot input orifice and the pilot output orifice. The pilot operated spool valve includes a spool having a surface in fluid communication with the passageway; a spool input port; and a spool output port, at least one of the spool input port and the spool output port having a cross-section flow area that changes as the spool is actuated. The spool valve is operable by the pilot microvalve such that a ratio of the cross-sectional flow area of the spool input port to the spool output port will substantially equal to a ratio of the cross-sectional flow area of the pilot input orifice to the pilot output orifice. The spool valve may be a microvalve or a standard size valve.

33 Claims, 19 Drawing Sheets

U.S. PATENT DOCUMENTS

| | | |
|---|---|---|
| 3,031,747 A | 5/1962 | Green |
| 3,729,807 A | 5/1973 | Fujiwara |
| 3,747,628 A | 7/1973 | Holster et al. |
| 3,860,949 A | 1/1975 | Stoeckert et al. |
| 4,005,454 A | 1/1977 | Froloff et al. |
| 4,019,388 A | 4/1977 | Hall, II et al. |
| 4,023,725 A | 5/1977 | Ivett et al. |
| 4,100,236 A | 7/1978 | Gordon et al. |
| 4,152,540 A | 5/1979 | Duncan et al. |
| 4,181,249 A | 1/1980 | Peterson et al. |
| 4,298,023 A | 11/1981 | McGinnis |
| 4,341,816 A | 7/1982 | Lauterbach et al. |
| 4,354,527 A | 10/1982 | McMillan |
| 4,434,813 A | 3/1984 | Mon |
| 4,476,893 A | 10/1984 | Schwelm |
| 4,543,875 A | 10/1985 | Imhof |
| 4,581,624 A | 4/1986 | O'Connor |
| 4,593,719 A | 6/1986 | Leonard |
| 4,628,576 A | 12/1986 | Giachino et al. |
| 4,647,013 A | 3/1987 | Giachino et al. |
| 4,661,835 A | 4/1987 | Gademann et al. |
| 4,687,419 A | 8/1987 | Suzuki et al. |
| 4,772,935 A | 9/1988 | Lawler et al. |
| 4,821,997 A | 4/1989 | Zdeblick |
| 4,824,073 A | 4/1989 | Zdeblick |
| 4,826,131 A | 5/1989 | Mikkor |
| 4,828,184 A | 5/1989 | Gardner et al. |
| 4,869,282 A | 9/1989 | Sittler et al. |
| 4,938,742 A | 7/1990 | Smits |
| 4,943,032 A | 7/1990 | Zdeblick |
| 4,946,350 A | 8/1990 | Suzuki et al. |
| 4,959,581 A | 9/1990 | Dantlgraber |
| 4,966,646 A | 10/1990 | Zdeblick |
| 5,029,805 A | 7/1991 | Albarda et al. |
| 5,037,778 A | 8/1991 | Stark et al. |
| 5,050,838 A | 9/1991 | Beatty et al. |
| 5,054,522 A | 10/1991 | Kowanz et al. |
| 5,058,856 A | 10/1991 | Gordon et al. |
| 5,061,914 A | 10/1991 | Busch et al. |
| 5,064,165 A | 11/1991 | Jerman |
| 5,065,978 A | 11/1991 | Albarda et al. |
| 5,066,533 A | 11/1991 | America et al. |
| 5,069,419 A | 12/1991 | Jerman |
| 5,074,629 A | 12/1991 | Zdeblick |
| 5,082,242 A | 1/1992 | Bonne et al. |
| 5,096,643 A | 3/1992 | Kowanz et al. |
| 5,116,457 A | 5/1992 | Jerman |
| 5,131,729 A | 7/1992 | Wetzel |
| 5,133,379 A | 7/1992 | Jacobsen et al. |
| 5,142,781 A | 9/1992 | Mettner et al. |
| 5,161,774 A | 11/1992 | Engelsdorf et al. |
| 5,169,472 A | 12/1992 | Goebel |
| 5,176,358 A | 1/1993 | Bonne et al. |
| 5,177,579 A | 1/1993 | Jerman |
| 5,178,190 A | 1/1993 | Mettner |
| 5,179,499 A | 1/1993 | MacDonald et al. |
| 5,180,623 A | 1/1993 | Ohnstein |
| 5,197,517 A | 3/1993 | Perera |
| 5,209,118 A | 5/1993 | Jerman |
| 5,215,244 A | 6/1993 | Buchholz et al. |
| 5,216,273 A | 6/1993 | Doering et al. |
| 5,217,283 A | 6/1993 | Watanabe |
| 5,222,521 A | 6/1993 | Kihlberg |
| 5,238,223 A | 8/1993 | Mettner et al. |
| 5,244,537 A | 9/1993 | Ohnstein |
| 5,267,589 A | 12/1993 | Watanabe |
| 5,271,431 A | 12/1993 | Mettner et al. |
| 5,271,597 A | 12/1993 | Jerman |
| 5,309,943 A | 5/1994 | Stevenson et al. |
| 5,323,999 A | 6/1994 | Bonne et al. |
| 5,325,880 A | 7/1994 | Johnson et al. |
| 5,333,831 A | 8/1994 | Barth et al. |
| 5,336,062 A | 8/1994 | Richter |
| 5,355,712 A | 10/1994 | Petersen et al. |
| 5,368,704 A | 11/1994 | Madou et al. |
| 5,375,919 A | 12/1994 | Furuhashi |
| 5,400,824 A | 3/1995 | Gschwendtner et al. |
| 5,417,235 A | 5/1995 | Wise et al. |
| 5,445,185 A | 8/1995 | Watanabe et al. |
| 5,458,405 A | 10/1995 | Watanabe |
| 5,543,349 A | 8/1996 | Kurtz et al. |
| 5,553,790 A | 9/1996 | Findler et al. |
| 5,566,703 A | 10/1996 | Watanabe et al. |
| 5,577,533 A | 11/1996 | Cook, Jr. |
| 5,589,422 A | 12/1996 | Bhat |
| 5,611,214 A | 3/1997 | Wegeng et al. |
| 5,785,295 A | 7/1998 | Tsai |
| 5,810,325 A | 9/1998 | Carr |
| 5,838,351 A | 11/1998 | Weber |
| 5,848,605 A | 12/1998 | Bailey et al. |
| 5,856,705 A | 1/1999 | Ting |
| 5,873,385 A | 2/1999 | Bloom et al. |
| 5,909,078 A | 6/1999 | Wood et al. |
| 5,926,955 A | 7/1999 | Kober |
| 5,941,608 A | 8/1999 | Campau et al. |
| 5,954,079 A | 9/1999 | Barth et al. |
| 5,955,817 A | 9/1999 | Dhuler et al. |
| 5,970,998 A | 10/1999 | Talbot et al. |
| 5,994,816 A | 11/1999 | Dhuler et al. |
| 6,019,437 A | 2/2000 | Barron et al. |
| 6,023,121 A | 2/2000 | Dhuler et al. |
| 6,038,928 A | 3/2000 | Maluf et al. |
| 6,041,650 A | 3/2000 | Swindler et al. |
| 6,096,149 A | 8/2000 | Hetrick et al. |
| 6,105,737 A | 8/2000 | Weigert et al. |
| 6,114,794 A | 9/2000 | Dhuler et al. |
| 6,116,863 A | 9/2000 | Ahn et al. |
| 6,123,316 A | 9/2000 | Biegelsen et al. |
| 6,124,663 A | 9/2000 | Haake et al. |
| 6,171,972 B1 | 1/2001 | Mehregany et al. |
| 6,182,742 B1 | 2/2001 | Takahashi et al. |
| 6,224,445 B1 | 5/2001 | Neukermans et al. |
| 6,255,757 B1 | 7/2001 | Dhuler et al. |
| 6,279,606 B1 | 8/2001 | Hunnicutt et al. |
| 6,283,441 B1 | 9/2001 | Tian |
| 6,386,507 B2 | 5/2002 | Dhuler et al. |
| 6,390,782 B1 | 5/2002 | Booth et al. |
| 6,494,804 B1 | 12/2002 | Hunnicutt et al. |
| 6,505,811 B1 | 1/2003 | Barron et al. |
| 6,520,197 B2 | 2/2003 | Deshmukh et al. |
| 6,523,560 B1 | 2/2003 | Williams et al. |
| 6,533,366 B1 | 3/2003 | Barron et al. |
| 6,540,203 B1 | 4/2003 | Hunnicutt |
| 6,581,640 B1 | 6/2003 | Barron |
| 6,637,722 B2 | 10/2003 | Hunnicutt |
| 6,662,581 B2 | 12/2003 | Hirota et al. |
| 6,694,998 B1 | 2/2004 | Hunnicutt |
| 6,724,718 B1 | 4/2004 | Shinohara et al. |
| 6,761,420 B2 | 7/2004 | Maluf et al. |
| 6,845,962 B1 | 1/2005 | Barron et al. |
| 6,872,902 B2 | 3/2005 | Cohn et al. |
| 6,902,988 B2 | 6/2005 | Barge et al. |
| 6,958,255 B2 | 10/2005 | Khuri-Yakub et al. |
| 6,966,329 B2 | 11/2005 | Liberfarb |
| 7,011,378 B2 | 3/2006 | Maluf et al. |
| 7,063,100 B2 | 6/2006 | Liberfarb |
| 7,210,502 B2 | 5/2007 | Fuller et al. |
| 7,372,074 B2 | 5/2008 | Milne et al. |
| 7,449,413 B1 | 11/2008 | Achuthan et al. |
| 8,113,448 B2 | 2/2012 | Keating |
| 8,113,482 B2 | 2/2012 | Hunnicutt |
| 8,156,962 B2 | 4/2012 | Luckevich |
| 2002/0014106 A1 | 2/2002 | Srinivasan et al. |
| 2002/0029814 A1 | 3/2002 | Unger et al. |
| 2002/0096421 A1 | 7/2002 | Cohn et al. |
| 2002/0174891 A1 | 11/2002 | Maluf et al. |
| 2003/0061889 A1 | 4/2003 | Tadigadapa et al. |
| 2003/0092526 A1 | 5/2003 | Hunnicutt et al. |
| 2003/0098612 A1 | 5/2003 | Maluf et al. |
| 2003/0159811 A1 | 8/2003 | Nurmi |
| 2003/0206832 A1 | 11/2003 | Thiebaud et al. |
| 2004/0115905 A1 | 6/2004 | Barge et al. |
| 2005/0121090 A1 | 6/2005 | Hunnicutt |
| 2005/0200001 A1 | 9/2005 | Joshi et al. |
| 2005/0205136 A1 | 9/2005 | Freeman |
| 2006/0017125 A1 | 1/2006 | Lee et al. |
| 2006/0067649 A1 | 3/2006 | Tung et al. |

| | | | |
|---|---|---|---|
| 2006/0218953 | A1 | 10/2006 | Hirota |
| 2007/0251586 | A1 | 11/2007 | Fuller et al. |
| 2007/0289941 | A1 | 12/2007 | Davies |
| 2008/0072977 | A1 | 3/2008 | George et al. |
| 2009/0123300 | A1 | 5/2009 | Uibel |
| 2009/0186466 | A1 | 7/2009 | Brewer |
| 2010/0019177 | A1 | 1/2010 | Luckevich |
| 2010/0038576 | A1 | 2/2010 | Hunnicutt |
| 2010/0225708 | A1 | 9/2010 | Peng et al. |
| 2012/0000550 | A1 | 1/2012 | Hunnicutt |

FOREIGN PATENT DOCUMENTS

| | | |
|---|---|---|
| DE | 2215526 | 10/1973 |
| DE | 2930779 | 2/1980 |
| DE | 3401404 | 7/1985 |
| DE | 4101575 | 7/1992 |
| DE | 4417251 | 11/1995 |
| DE | 4422942 | 1/1996 |
| EP | 250948 | 1/1988 |
| EP | 261972 | 3/1988 |
| EP | 1024285 | 8/2000 |
| GB | 2238267 | 5/1991 |
| JP | Sho 39-990 | 2/1964 |
| JP | 04-000003 | 1/1992 |
| JP | 06-117414 | 4/1994 |
| JP | 01-184125 | 7/2001 |
| JP | 2001184125 | 7/2001 |
| JP | 2003-049933 | 2/2003 |
| JP | 2006-080194 | 3/2006 |
| WO | WO99/16096 | 4/1999 |
| WO | WO99/24783 | 5/1999 |
| WO | 00/14415 A2 | 3/2000 |
| WO | WO00/14415 | 3/2000 |
| WO | 00/14415 A3 | 7/2000 |
| WO | WO2005/084211 | 9/2005 |
| WO | 2005/084211 A3 | 1/2006 |
| WO | 2006/076386 A1 | 7/2006 |
| WO | 2008/076388 A1 | 6/2008 |
| WO | 2008/076388 B1 | 8/2008 |
| WO | 2008/121365 A1 | 10/2008 |
| WO | 2008/121369 A1 | 10/2008 |
| WO | 2010/019329 A2 | 2/2010 |
| WO | 2010/019329 A3 | 2/2010 |
| WO | 2010/019665 A2 | 2/2010 |
| WO | 2010/019665 A3 | 2/2010 |
| WO | 2010/065804 A2 | 6/2010 |
| WO | 2010/065804 A3 | 6/2010 |
| WO | 2011/022267 A2 | 2/2011 |
| WO | 2011/022267 A3 | 2/2011 |
| WO | 2011/094300 A2 | 8/2011 |
| WO | 2011/094300 A3 | 8/2011 |
| WO | 2011-094302 A2 | 8/2011 |
| WO | 2011/094302 A3 | 8/2011 |

OTHER PUBLICATIONS

Substitute Claims filed in Chinese Application No. 200880014057.X dated Jul. 14, 2010.
Günther, Götz, "Entwicklung eines pneumatischen 3/2-Wege-Mikroventils", O + P Olhydraulik Und Pneumatik, Vereinigte Fachverlage, Mainz, DE, vol. 42, No. 6, Jun. 1, 1998, pp. 396-398, XP000831050, ISSN: 0341-2660.
Gui, C. et al, "Selective Wafer Bonding by Surface Roughness Control", Journal of The Electrochemical Society, 148 (4) G225-G228 (2001).
Gui, C. et al., "Fusion bonding of rough surfaces with polishing technique for silicon micromachining", Microsystem Technologies (1997) 122-128.
Zhixiong Liu et al., "Micromechanism fabrication using silicon fusion bonding", Robotics and Computer Integrated Manufacturing 17 (2001) 131-137.
International Search Report dated Apr. 5, 2010 for Application No. PCT/US2009/05355.
Booth, Steve and Kaina, Rachid, Fluid Handling—Big Gains from Tiny Valve, Appliance Design (Apr. 2008), pp. 46-48.
Controls Overview for Microstaq Silicon Expansion Valve (SEV), Rev. 1, Dec. 2008, http://www.microstaq.com/pdf/SEV_controls.pdf, accessed May 17, 2010.
Copeland, Michael V., Electronic valves promise big energy savings, Fortune (Sep. 9, 2008), http://techland.blogs.fortune.cnn.com/2008/09/09/electronic-valves-promise-big-energy-savings, accessed Sep. 9, 2008.
Higginbotham, Stacey, Microstaq's Tiny Valves Mean Big Energy Savings, http//earth2tech.com/2008/09/09/microstaqs-tiny-valves-mean-big-energy savings (posted Dec. 8, 2008), accessed Sep. 9, 2008.
Keefe, Bob, Texas firm says value-replacing chip can drastically cut energy use, Atlanta Metro News (Sep. 10, 2008), http://www.ajc.com/search/content/shared/money/stories/2008/09/microstaq10_cox-F9782.html, accessed Sep. 10, 2008.
Luckevich, Mark, MEMS microvlaves: the new valve world, Valve World (May 2007), pp. 79-83.
MEMS, Microfluidics and Microsystems. Executive Review, http:www.memsinvestorjournal.com/2009/04/mems-applications-for-flow-control-.html, accessed May 17, 2010.
Microstaq Announces High Volume Production of MEMS-Based Silicon Expansion Valve, http://www.earthtimes.org/articles/printpressstory.php?news+1138955 (posted Jan. 27, 2010), accessed Jan. 27, 2010.
Microstaq Product Description, Proportional Direct Acting Silicon Control Valve (PDA-3), http://www.microstaq.com/products/pda3.html, accessed May 17, 2010.
Microstaq Product Description, Proportional Piloted Silicon Control Valve (CPS-4), http://www.microstaq.com/products/cps4.html, accessed May 17, 2010.
Microstaq Product Descriptions, SEV, CPS-4, and PDA-3, http://www.microstaq.com/products/index.html, accessed May 17, 2010.
Microstaq Technology Page, http://www.microstaq.com/technology/index.html, accessed May 17, 2010.
Press Release, Freescale and Microstaq Join Forces on Smart Superheat Control System for HVAC and Refrigeration Efficiency, http://www.microstaq.com/pressReleases/prDetail_04.html (posted Jan. 22, 2008), accessed May 17, 2010.
Press Release, Microstaq Mastering Electronic Controls for Fluid-Control Industry, http://www.microstaq.com/pressReleases/prDetail_02.html (posted May 5, 2005), accessed May 17, 2010.
Press Release, Microstaq Unveils Revolutionary Silicon Expansion Valve at Demo 2008, http://www.microstaq.com/pressReleases/prDetail_05.html (posted Sep. 8, 2008), accessed May 17, 2010.
Press Release, Nanotechnology Partnerships, Connections Spur Innovation for Fluid Control Industries, http://www.microstaq.com/pressReleases/prDetail_03.html (posted Jun. 9, 2005), accessed May 17, 2010.
Product Review, greentechZONE Products for the week of May 18, 2009, http://www.en-genius.net/site/zones/greentechZONE/product_reviews/grnp_051809, accessed May 17,2010.
SEV Installation Instructions, http://www.microstaq.com/pdf/SEV_Instruction_sheet.pdf, accessed May 17, 2010.
Silicon Expansion Valve (SEV)—for Heating, Cooling, and Refrigeration Applications, http://www.microstaq.com/pdf/SEV_Quicksheet.pdf, accessed May 17, 2010.
Silicon Expansion Valve Data Sheet, http://www.microstaq.com/pdf/SEV_Datasheet_1_8.pdf, accessed May 17, 2010.
Silicon Expansion Valve Information Sheet, http://www.microstaq.com/pdf/SEV_Infosheet_2_0.pdf, accessed May 17, 2010.
SMIC Announces Successful Qualification of a MEMS Chip for Microstaq, http://www.prnewswire.com/news-releases/smic-announces-successful-qualification-of-a-mems-chip-for-microstaq-65968252.html (posted Oct. 26, 2009), accessed. May 17, 2010.
SMIC quals Microstaq MEMS chip for fluid control, http://www.electroiq.com/ElectroiQ/en-us/index/display/Nanotech_Article_Tools_Template.articles.small-times.nanotechmems.mems.microfluidics.2009.10.smic-quals_microstaq.html, (posted Oct. 26, 2009), acc.
Tiny Silicon Chip Developed by Microstaq Will Revolutionize Car Technology, http://www.nsti.org/press/PRshow.html?id=160 (posted May 19, 2005), accessed May 19, 2005.
Turpin, Joanna R., Soft Economy, Energy Prices Spur Interest in Technologies, http://www.achrnews.com/copyright/BNP_GUID_9-5-2006_A_10000000000000483182, accessed May 18, 2010.

Uibel, Jeff, The Miniaturization of Flow Control (Article prepared for the 9th International Symposium on Fluid Control Measurement and Visualization (FLUCOME 2007)), Journal of Visualization (vol. 11, No. 1, 2008), IOS Press.

"A Silicon Microvalve for The Proportional Control of Fluids" by K.R. Williams, N.I. Maluf, E.N. Fuller, R.J. Barron, D.P. Jaeggi, and B.P. van Drieenhuizen, Transducers '99, Proc. 10th International Conference on Solid State Sensors and Actuators, held Jun. 7-10, 1999, Sendai, Japan, pp. 18-21.

"Process for in-plane and out-of-plane single-crystal-silicon thermal microactuators"; J. Mark Noworolski, et al.; Sensors and Actuators A 55 (1996); pp. 65-69.

Ayon et al., "Etching Characteristics and Profile Control in a Time Multiplexed ICP Etcher," Proc. of Solid State Sensor and Actuator Workshop Technical Digest, Hilton Head SC, (Jun. 1998) 41-44.

Bartha et al., "Low Temperature Etching of Si in High Density Plasma Using SF6/02," Microelectronic Engineering, Elsevier Science B.V., vol. 27, (1995) 453-456.

Fung et al., "Deep Etching of Silicon Using Plasma" Proc. of the Workshop on Micromachining and Micropackaging of Transducers, (Nov. 7-8, 1984) pp. 159-164.

IEEE Technical Digest entitled"Compliant Electra-thermal Microactuators", J. Jonsmann, O. Sigmund, S. Bouwstra, Twelfth IEEE International Conference on Micro Electro Mechanical Systems held Jan. 17-21, 1999, Orlando, Florida, pp. 588-593, IEEE Catalog No. 99CH36291C.

Klaassen et al., "Silicon Fusion Bonding and Deep Reactive Ion Etching; A New Technology for Microstructures," Proc., Transducers 95 Stockholm Sweden, (1995) 556-559.

Linder et al., "Deep Dry Etching Techniques as a New IC Compatible Tool for Silicon Micromachining," Proc,. Transducers, vol. 91, (Jun. 1991) pp. 524-527.

Petersen et al. "Surfaced Micromachined Structures Fabricated with Silicon Fusion Bonding" Proc., Transducers 91, (Jun. 1992) pp. 397-399.

Yunkin et al., "Highly Anisotropic Selective Reactive Ion Etching of Deep Trenches in Silicon," Microelectronic Engineering, Elsevier Science B.V., vol. 23, (1994) pp. 373-376.

Biography, Ohio State University Website [online], [retrieved Dec. 31, 2000]. Retrieved from the Internet <URL: http://www.chemistry.ohio-state.edu/resource/pubs/brochure/madou.htm>.

Madou, Marc, "Fundamentals of Microfabrication", Boca Raton: CRC Press, 1997, 405-406.

\* cited by examiner

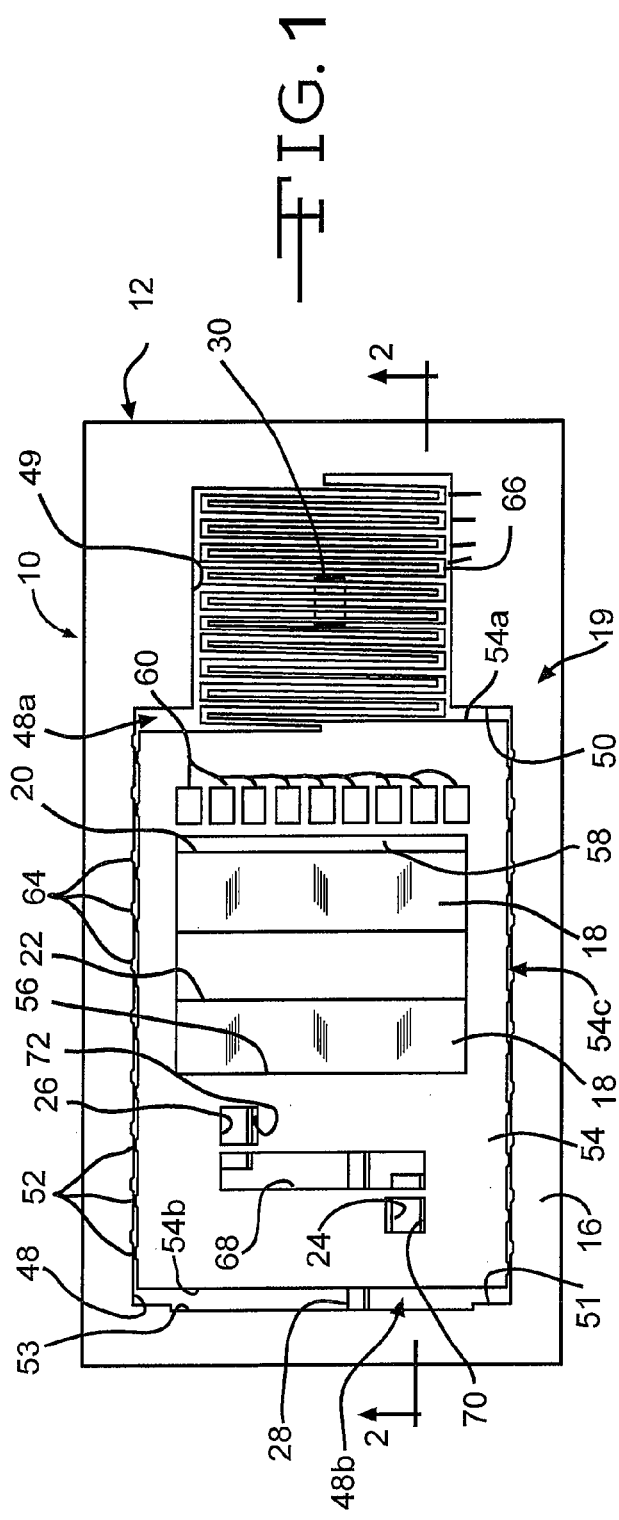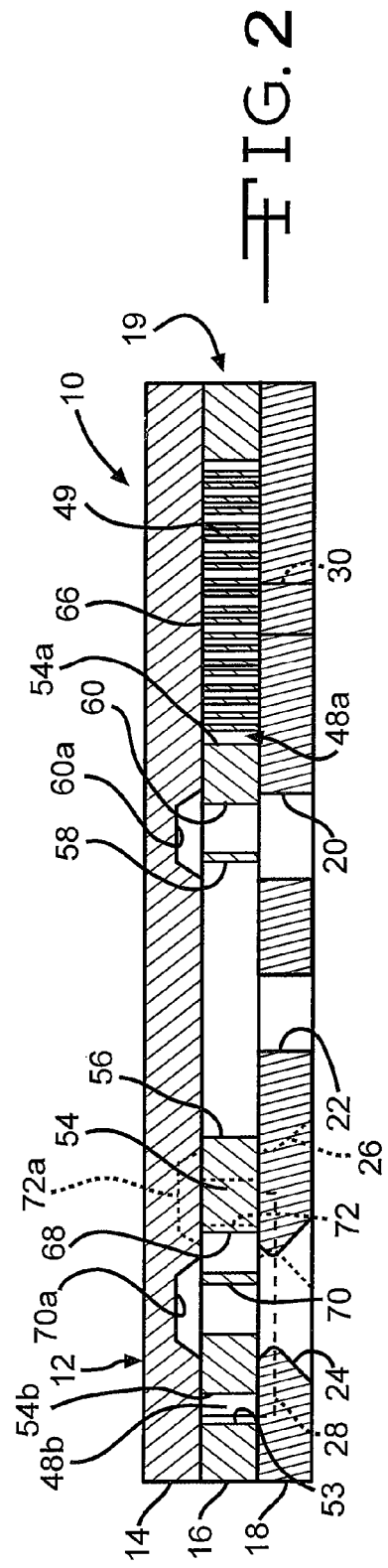

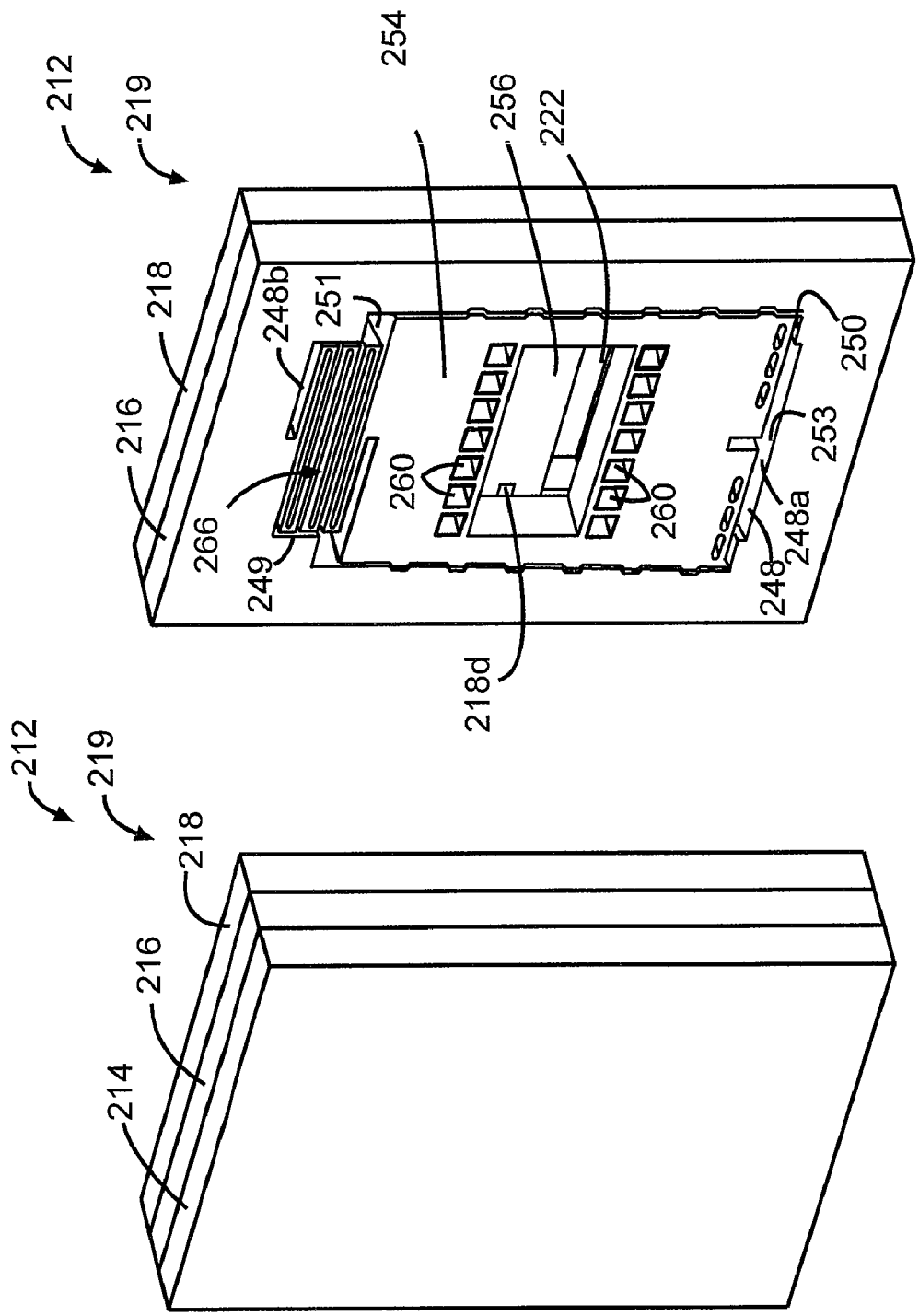

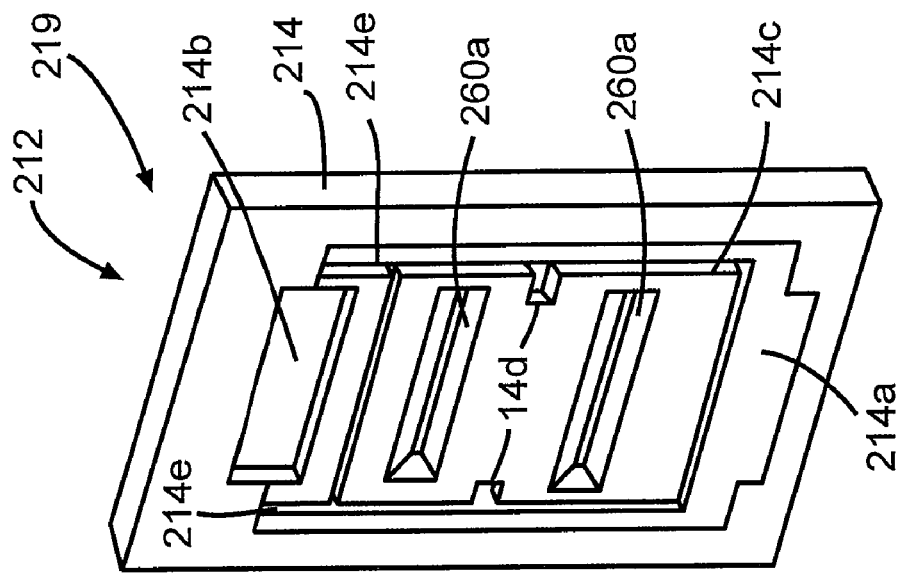
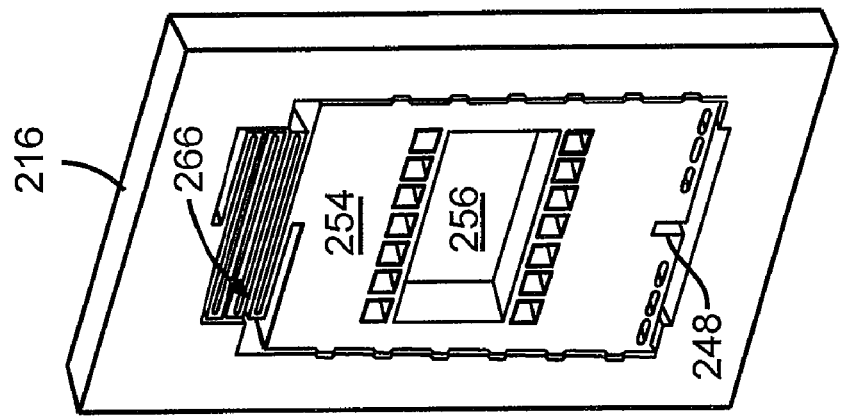
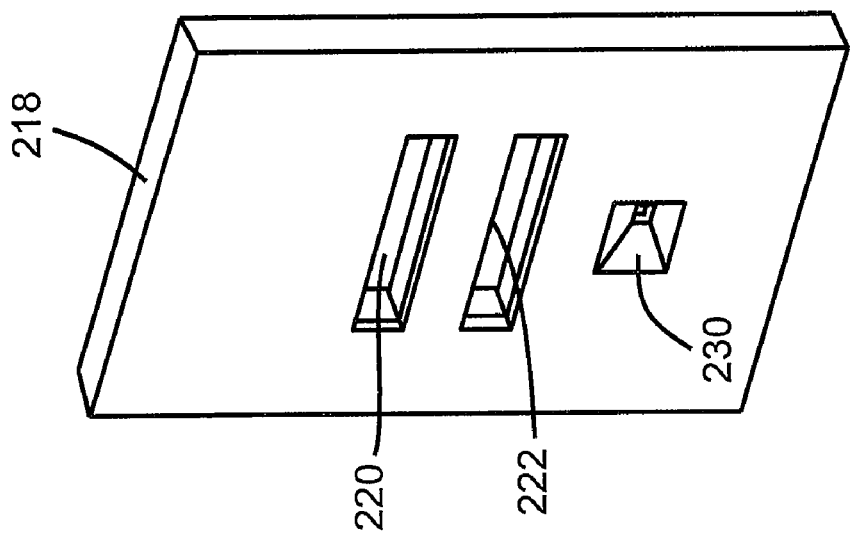
FIG. 25

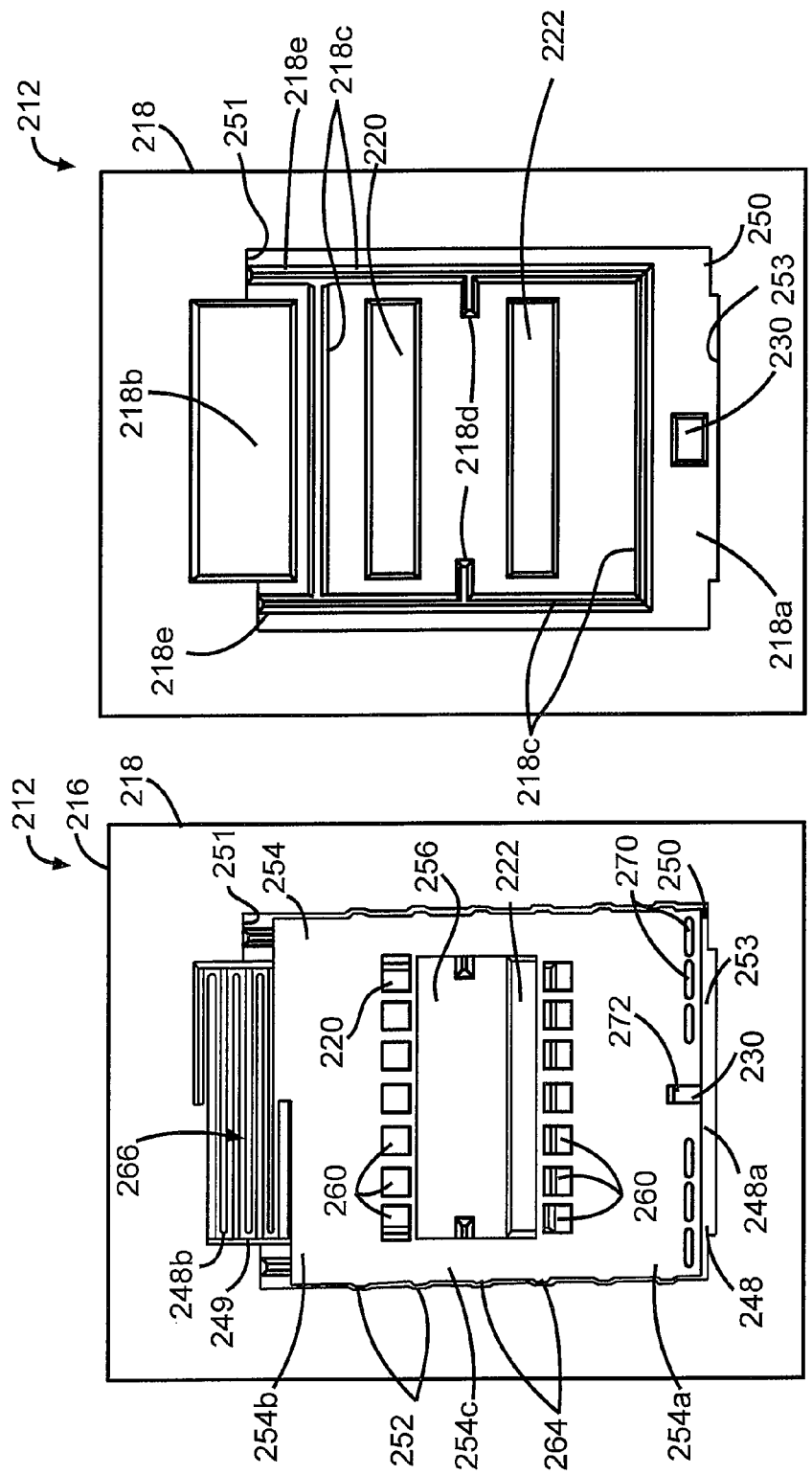

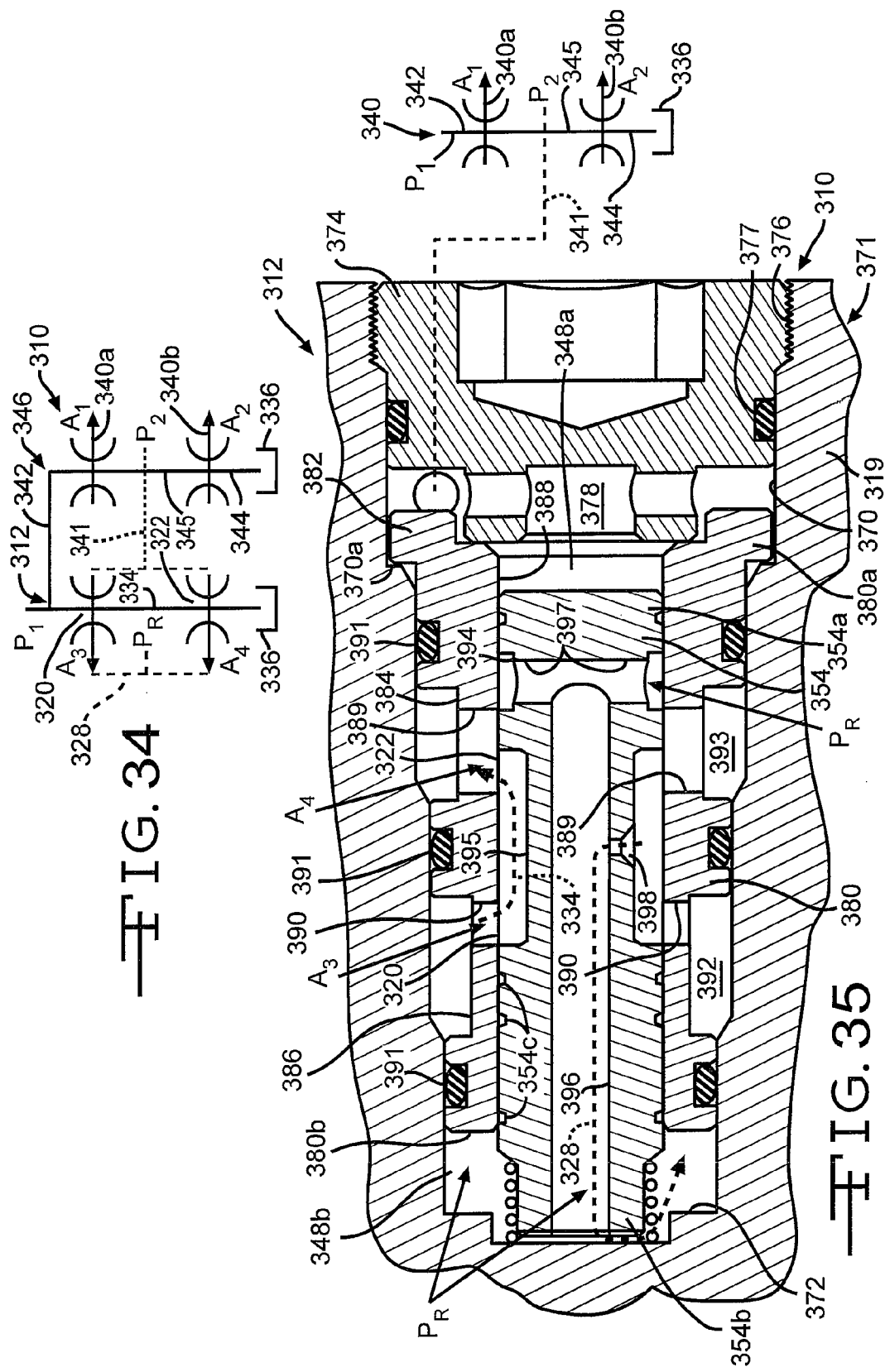

MICROVALVE DEVICE WITH PILOT OPERATED SPOOL VALVE AND PILOT MICROVALVE

CROSS-REFERENCE TO RELATED APPLICATIONS

This application is a Continuation-In-Part of co-pending international application PCT/US2008/004139, filed 28 Mar. 2008, which claimed priority to U.S. Provisional Patent Application No. 60/921,142, filed 30 Mar. 2007, the disclosures of both of which are incorporated herein by reference.

BACKGROUND OF THE INVENTION

This invention relates in general to valves for controlling fluid flow in a fluid system. More particularly, this invention relates to an improved microvalve device.

Valves are widely used for controlling the flow of a fluid from a source of pressurized fluid to a load device or from a load device to a pressure vent. Frequently, a pump, or other device, is provided as the source of pressured fluid. The flow of the fluid is selectively controlled by a valve to control the operation of the load device.

One type of valve is a microvalve. A microvalve system is a MicroElectroMechanical System (MEMS) relating in general to semiconductor electromechanical devices.

MEMS is a class of systems that are physically small, having features with sizes in the range of one micrometer (micron) or smaller. A MEMS device is a device that at least in part forms part of such a system. These systems have both electrical and mechanical components. The term "micromachining" is commonly understood to mean the production of three-dimensional structures and moving parts of MEMS devices.

MEMS originally used modified integrated circuit (computer chip) fabrication techniques (such as chemical etching) and materials (such as silicon semiconductor material) to micromachine these very small mechanical devices. Today there are many more micromachining techniques and materials available.

The term "microvalve", as used in this application, means a valve having features with sizes in range of one micrometer (micron) or smaller, and thus by definition is at least partially formed by micromachining. The term "microvalve device", as used in this application, means a device that includes a microvalve, and that may include other components. It should be noted that if components other than a microvalve are included in the microvalve device, these other components may be micromachined components or standard sized (larger) components.

Various microvalve devices have been proposed for controlling fluid flow within a fluid circuit. A typical microvalve device includes a displaceable member or valve movably supported by a body and operatively coupled to an actuator for movement between a closed position and a fully open position. When placed in the closed position, the valve blocks or closes a first fluid port that is placed in fluid communication with a second fluid port, thereby preventing fluid from flowing between the fluid ports. When the valve moves from the closed position to the fully open position, fluid is increasingly allowed to flow between the fluid ports.

One type of microvalve is the micro spool valve. The micro spool valve typically consists of a main valve body disposed in a chamber formed in an intermediate layer of multilayer valve housing. A variety of ports through the layers of the housing provide fluid communication with the chamber. The main valve body is moveable in the chamber to selectively allow fluid communication though the chamber by blocking particular ports depending on the desired result. In operation, a differential pressure is exerted across the main valve body to move the main valve body into a desired position. Typically, the differential pressure is controlled by a pilot valve.

Another type of microvalve, often used as a pilot valve, consists of a beam resiliently supported by the body at one end, or at a location intermediate the two ends of the beam. In operation, an actuator forces the beam to bend about the supported end of the beam. In order to bend the beam, the actuator must generate a force sufficient to overcome the spring force associated with the beam. As a general rule, the output force required by the actuator to bend or displace the beam increases as the displacement requirement of the beam increases.

In addition to generating a force sufficient to overcome the spring force associated with the beam, the actuator must generate a force capable of overcoming the fluid flow forces acting on the beam that oppose the intended displacement of the beam. These fluid flow forces generally increase as the flow rate through the fluid ports increases.

As such, the output force requirement of the actuator and in turn the size of the actuator and the power required to drive the actuator generally must increase as the displacement requirement of the beam increases and/or as the flow rate requirement through the fluid ports increases.

One specific type of microvalve system is the pilot operated microvalve. Typically, such a microvalve device includes a micro spool valve that is pilot operated by a microvalve of the type as described above. For example, U.S. Pat. Nos. 6,494,804, 6,540,203, 6,637,722, 6,694,998, 6,755,761, 6,845,962, and 6,994,115 disclose pilot operated microvalves, the disclosures of which are herein incorporated by reference.

SUMMARY OF THE INVENTION

This invention relates to an improved microvalve device for controlling fluid flow in a fluid system.

The microvalve device includes a pilot microvalve and a pilot operated spool valve. The pilot microvalve includes a pilot input orifice; a pilot output orifice, at least one of the pilot input orifice and the pilot output orifice having a cross-section flow area that changes as the pilot microvalve is actuated; and a passageway providing fluid communication between the pilot input orifice and the pilot output orifice. The pilot operated spool valve includes a spool having a surface in fluid communication with the passageway; a spool input port; and a spool output port, at least one of the spool input port and the spool output port having a cross-section flow area that changes as the spool is actuated. The spool valve is operable by the pilot microvalve such that a ratio of the cross-sectional flow area of the spool input port to the spool output port will substantially equal to a ratio of the cross-sectional flow area of the pilot input orifice to the pilot output orifice. The spool valve may be a microvalve or a standard size valve.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a plan view of a microvalve device in accordance with one embodiment of the present invention.

FIG. 2 is a cross-sectional view of the microvalve device taken along the line 2-2 of FIG. 1.

FIG. 22 is a perspective view of a pilot operated micro spool valve of the microvalve device of FIG. 221.

FIG. 23 is a perspective view of the pilot operated micro spool valve shown in FIG. 22 with a top layer removed.

FIG. 25 is an exploded perspective view of the pilot operated micro spool valve shown from a different vantage point.

FIG. 26 is a plan view of the pilot operated micro spool valve with the top layer removed, wherein the pilot operated micro spool valve is in a closed position.

FIG. 27 is a plan view of the pilot operated micro spool valve with the top layer and the intermediate layer removed.

FIG. 29A is a diagrammatic representation view of the pilot microvalve show schematically in FIG. 29.

FIG. 30A is a diagrammatic representation view of the pilot microvalve show schematically in FIG. 30.

FIG. 34 is a schematic view of a microvalve device in accordance with another embodiment of the present invention.

FIG. 35 is a partial cross-section and partial schematic representation of the microvalve device in FIG. 34, including a macro spool valve having a pilot microvalve with two variable orifices.

DETAILED DESCRIPTION OF THE PREFERRED EMBODIMENT

Preliminarily it should be noted that in the following description, terms such as "upper", "top", "bottom", and "lower" and similar relational terms are used for ease of reference in describing the figure in which they are first used, and are not meant to be in any way limiting upon the claimed invention in use. Also, it should be noted that the term "substantial fluid leakage flow" means fluid leakage flow which would substantially impact operation of a microvalve device having such fluid leakage flow in an intended application.

Figure 3:
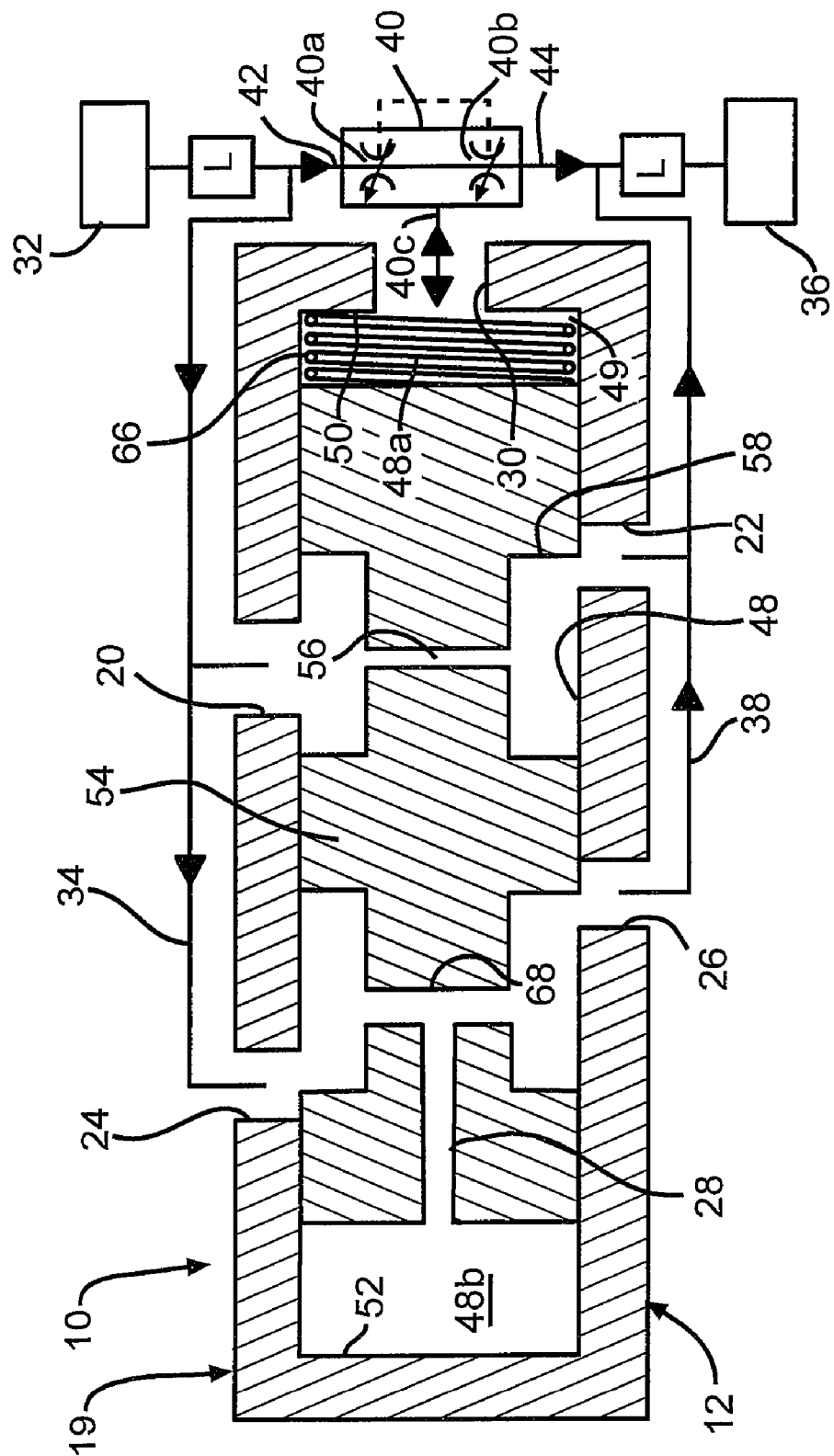
FIG. 3 is a schematic view of a fluid circuit diagram including the microvalve device of FIG. 1; the microvalve device is shown in a functional diagrammatic view.
Figure 10:
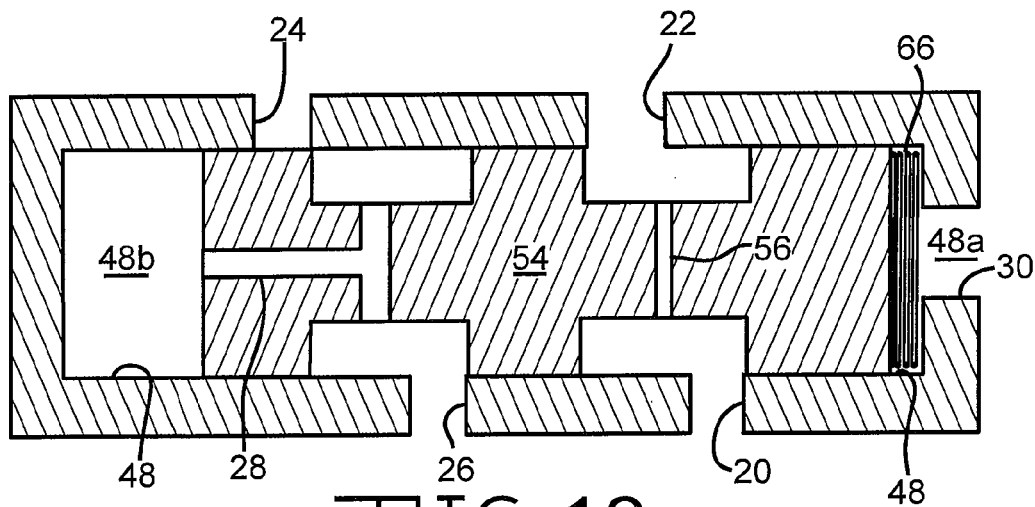
FIG. 10 is a schematic view of a fluid circuit diagram including the microvalve device of FIG. 4 in which the microvalve device is shown in a functional diagrammatic view.
Figure 11:
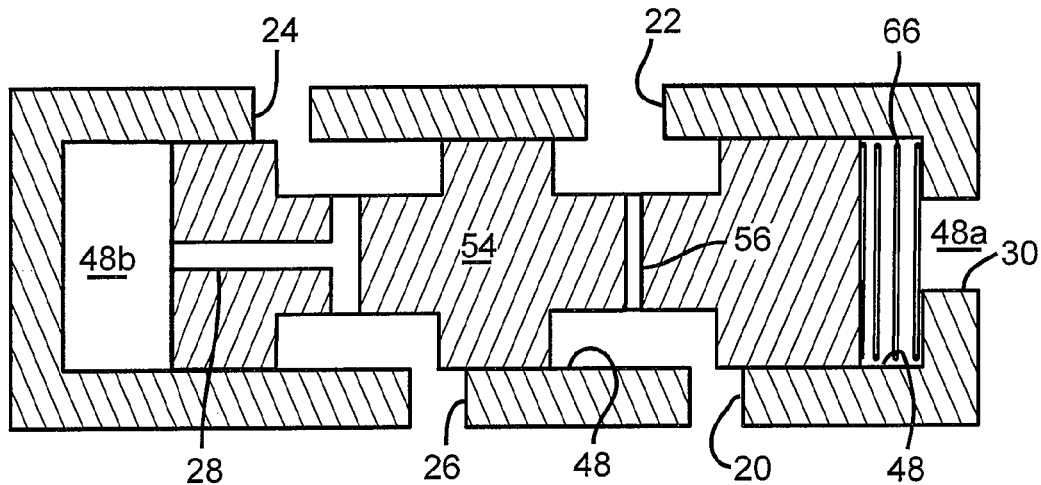
FIG. 11 is a schematic view of a fluid circuit diagram including the microvalve device of FIG. 5 in which the microvalve device is shown in a functional diagrammatic view.
Figure 12:
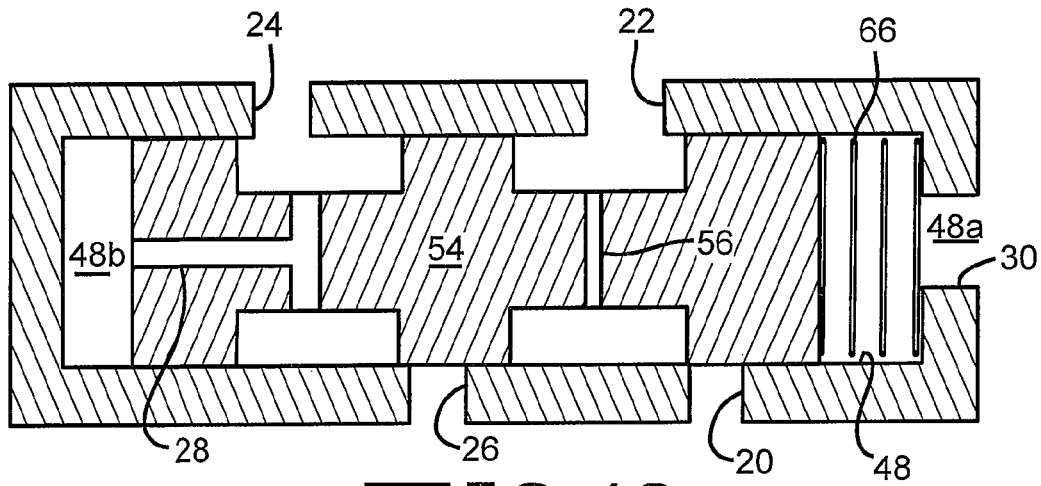
FIG. 12 is a schematic view of a fluid circuit diagram including the microvalve device of FIG. 6 in which the microvalve device is shown in a functional diagrammatic view.

Referring now to the drawings, there is illustrated in FIG. 1, FIG. 2, and FIG. 3 a microvalve device, generally indicated at 10, in accordance with one embodiment of the present invention. Note that elements with similar structure and function through out all of the Figures are labeled with similar identifiers (reference numbers). Note also that FIG. 3 is not a sectional view of the microvalve device 10, but rather a functional diagrammatic view; cross-hatching is used to clarify the drawing. FIGS. 10, 11, and 12, discussed below, are similar functionally equivalent schematic views, and are not to be taken as cross-sections of the physical device.

The microvalve device 10 includes a pilot operated micro spool valve indicated generally at 12. As best shown in FIG. 2, the micro spool valve 12 includes a top layer 14, an intermediate layer 16, and a bottom layer 18, which cooperate to form a body 19. Although only three layers 12, 14, and 16 are illustrated, it is contemplated that any suitable number of layers may be utilized in the microvalve device 10, or, indeed, in any microvalve device of the present invention.

The bottom layer 18 includes a main input port 20 and a main output port 22. The bottom layer 18 also includes a reference inlet port 24 and a reference outlet port 26 (seen in FIG. 1). Additionally, the bottom layer 18 includes a reference channel 28 that is formed on the interior surface of the bottom layer 18. The bottom layer 18 also includes a command port 30.

As best shown in FIG. 3, the main input port 20 is in fluid communication with a supply source 32, such as a pump, an accumulator, or any other device that provides pressurized fluid, e.g. a high-pressure source. The reference inlet port 24 is also in fluid communication with the supply source 32. As illustrated, the main input port 20, the reference inlet port 24 and the supply source 32 are in communication via a supply fluid conduit 34, although such a common conduit is not required and the main input port 20, the reference inlet port 24 and the supply source 32 may be arranged in any suitable fluid communication arrangement.

The main output port 22 is in fluid communication with a destination device 36 such as a fluid reservoir or fluid accumulator or any other suitable destination for selectively controlled pressurized fluid such as a low-pressure destination or low-pressure region. It must be understood that the destination device 36 may be a return line to the supply source 32. The reference outlet port 26 is also in fluid communication with the destination device 36. As illustrated, the main output port 22, the reference outlet port 26 and the destination device 36 are in fluid communication via a destination fluid conduit 38, although such a common conduit is not required and the main output port 22, the reference outlet port 26 and the destination device 36 may be arranged in any suitable fluid communication arrangement.

One or more load devices L are placed in fluid communication between the supply source 32 and the main input port 20 and/or the main output port 22 and the destination device 36. The load device L may be any fluid driven or fluid regulated device suitable to have a flow of fluid controlled by the spool valve 12. It must be understood that any load device L may be either upstream or downstream of the spool valve 12 as desired.

While the bottom layer 18 of the micro spool valve 12 is illustrated as having a single main input port 20, a single output port 22, a single reference inlet port 24, and a single reference output port 26, it must be understood, however, that the micro spool valve 12 may have any suitable number of main and reference ports in any suitable location, as desired. It may be desirable, for example, to form multiple smaller ports that are blocked and unblocked by different portions of the micro spool valve 12 rather than a single larger port for reasons of ease of reliable fabrication, or for reasons of improved operational performance.

The command port 30 is in fluid communication with a pilot valve 40 (FIG. 3) supplying a command pressure. As illustrated, the pilot valve 40 is in communication with the supply source via a pilot supply conduit 42. Also, the pilot valve 40 is in communication with the destination device 36 via a pilot dump fluid conduit 44. It is preferred, although not required, that the upstream side of the pilot valve 40 is in direct fluid communication with the upstream side of the micro spool valve 12 and that downstream side of the pilot valve 40 is in direct fluid communication with the down stream side of the micro spool valve 12. Preferably, the pilot valve 40 is operable to allow the command port 30 to selectively communicate with the supply source 32 and the destination device 36 in order to alternatively provide pressurization and pressure relief.

In the preferred embodiment, the position of the pilot valve 40 is generally proportional to power applied to an actuator of the pilot valve 40. Preferably, the pilot valve 40 is arranged such that actuation progressively opens a pilot input orifice 40a in communication with the pilot supply conduit 42 while equally and oppositely closing a pilot output orifice 40b in fluid communication with the pilot dump fluid conduit 44. A pilot vent port 40c is preferably arranged between these the pilot input orifice 40a and the pilot output orifice 40b. The pilot vent port 40c in communication with the command port 30 and sets the pressure of a command volume 48a as a function of the difference between the upstream and down stream pressures at the pilot valve 40 and regulated by the opening and closing of the pilot input orifice 40a and the pilot output orifice 40b. Preferably, this function is only dependent upon the open area of the pilot input orifice 40a and the pilot output orifice 40b and not dependent upon any pressure or flow parameters of the system, although such is not required.

Thus, as will be further explained below, in a preferred embodiment, the percent area open for the input reference port 24 is in a direct relation to the percent area open of the pilot input orifice 40a and the percent area open for the output reference port 26 is in a direct relation to the percent area open of the pilot output orifice 40b. In this manner, in this embodiment, the micro spool valve 12 is not controlled to set a pressure or a flow. The micro spool valve 12 sets a cross-sectional orifice area in direct relation to the position of the pilot valve 40.

As will also be further explained below, the configuration of the microvalve device 10 is shown in a manner that, when the command pressure volume 48a is set by the pilot valve 40, a spool 54 moves until a reference pressure volume 48b balances the command pressure volume 48a and a force applied by a spring 66. As will be explained below, with respect to Equations 1 through 6, the structure of the microvalve device is such that the spool 54 moves so as to maintain a direct correlation between the ratio of the cross-sectional flow areas of the pilot input orifice 40a to the pilot output orifice 40b and the ratio of the cross-sectional flow areas of the reference input port 24 to the reference output port 26. Thus, in this manner, in this embodiment, the micro spool valve 12 replicates the travel and position change of the pilot valve 40. Hence, the micro spool valve 12 moves in a generally linear relationship with the pilot valve 40.

Figure 13:
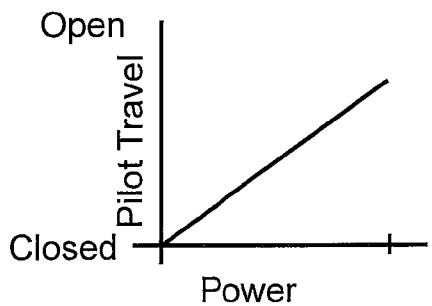
FIG. 13 is a graph illustrating the linear relationship between pilot travel and power applied.

There is shown in FIG. 13 a graph which is an idealized valve curve of the pilot valve 40, illustrating a generally linear relationship between the change of position of the pilot valve 40 and the power applied to the pilot valve 40 according to a preferred embodiment of the pilot valve 40. Depending upon the exact structure of the pilot valve 40, other valve curves (plots of position vs. power) may result, including linear valve curves with a different slope, or even non-linear valve curves.

Figure 14:
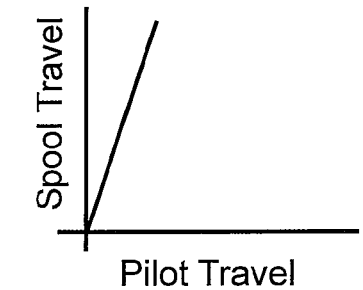
FIG. 14 is a graph illustrating the linear relationship between spool travel and pilot travel.

The graph in FIG. 14 illustrates a generally linear relationship between the travel of the spool 54 and the change in position of the pilot valve 40. It will be recognized by those of ordinary skill in the art that the exact shape of the graphs in FIG. 14 (and FIGS. 15 to 20 discussed below) may depend upon the exact cross-sectional shapes of the pilot input orifice and pilot output orifice in the pilot valve 40 and the various ports of the micro spool valve 12, including the reference inlet port 24 and the reference outlet port 26. If, for example the ports in the pilot valve 40 have a circular cross-section and the ports in the micro spool valve 12 are rectangular, there may not be a precisely linear correlation. However, for the purposes of illustration, a generally linear relationship will be assumed. Thus, if the pilot valve 40 travels, for example, through half it's full stroke of movement, then the spool 54 will have traveled through half it's full stroke of movement, so as to maintain equality between the ratio of the cross-sectional flow areas of the pilot input orifice 40a to the pilot output orifice 40b and the ratio of the cross-sectional flow areas of the reference input port 24 to the reference output port 26, as will explained further below, with reference to Equations 1 through 6.

Figure 15:
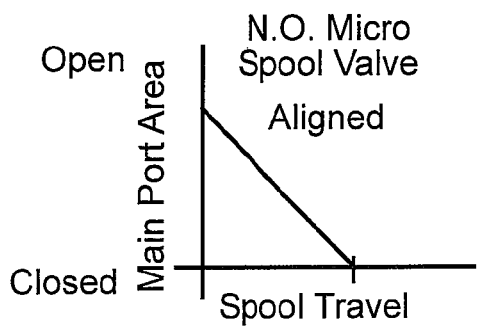
FIG. 15 is a graph illustrating the linear relationship between main port area and spool travel in an aligned normally open valve.

FIG. 15 then shows a graph illustrating an idealized valve curve having a generally linear relationship (in the present example of an aligned, normally open, spool valve) between the cross-sectional area of the main input port 20 and the travel of the spool 54. Assume that, as illustrated, the micro spool valve 12 is normally open (that is, in the absence of a command pressure from the pilot valve 40, both the main input port 20 and the main output port 22 are open). Upon application of power to the pilot valve 40, the pilot valve 40 begins to generate a command pressure that starts to move the spool 54, causing the main input port 20 to start to travel away from the open position toward the closed position, and the cross-sectional flow area of the main input port 20 (and thus the cross-sectional flow area of the flow path through the micro spool valve 12 via the main input port 20 and the main output port 22, indicated on FIG. 15 as "Main Port Area") will begin to decrease.

It will be recognized by those of ordinary skill in the art that the exact shape of the valve curves illustrated in FIGS. 13 and 15 (and FIGS. 16 to 20, discussed below), and the plot of pilot travel to spool travel in FIG. 14 may depend upon the exact shapes of the pilot input orifice and pilot output orifice in the pilot valve 40 and the various ports of the micro spool valve 12, including the reference inlet port 24 and the reference outlet port 26. If, for example the ports in the pilot valve 40 have a circular cross-section and the ports in the micro spool valve 12 are rectangular, there may not be the precisely linear correlation illustrated in FIG. 14. However, for the purposes of illustration, a generally linear relationship will be assumed, and illustrated in the accompanying idealized plot of FIG. 14. Similarly, the idealized valve curves of FIGS. 13, and 15 through 20 are shown with assumed linear segments for the purposes of illustration.

In the illustrated embodiment, it may be that the flow through the main ports 22 and 22 is synchronized with the flow through the reference ports 24 and 26, in that the flow path opening and closing positions are aligned. When the reference port 26 is just closing, so is the main port 22. However, as discussed above, it must be understood that it is not required that flow though the main ports 20 and 22 be synchronized with flow through the reference ports 24 and 26. For example, it may be desired to offset one or more of the main ports 20 and 22 so that the flow path through the main ports 20 and 22 closes slightly before or after the flow path through the reference ports 24 and 26.

Figure 16:
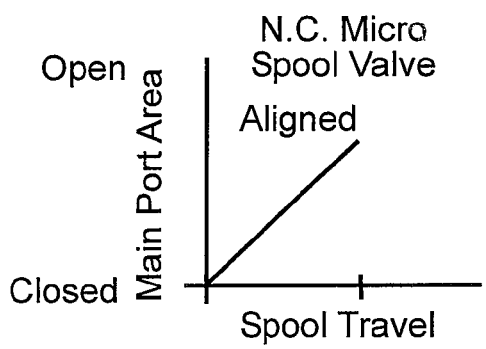
FIG. 16 is a graph illustrating the linear relationship between main port area and spool travel in an aligned normally closed valve.

Alternative embodiments of the present invention include normally open spool valves that are aligned, overlap, or under-lap and normally closed spool valves that are aligned, overlap, or under-lap. FIG. 16 illustrates an idealized valve curve showing a linear relationship between the cross-sectional area of a main port and the spool travel in an aligned normally closed valve. The flow path through the main ports is closed (main port area=0) when the spool valve spool is all the way at one end of travel, and the flow path through the main ports opens to a maximum amount when the spool has completed it full stroke of travel.

Figure 17:
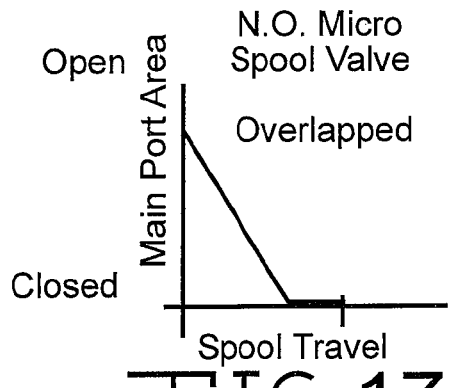
FIG. 17 is a graph illustrating the linear relationship between main port area and spool travel in an overlapped normally open valve.

In FIG. 17, an idealized valve curve shows a relationship between the cross-sectional area of a main port and the spool travel in an overlapped normally open micro spool valve 12. In this overlapped micro spool valve 12, as the pilot microvalve 40 is operated to move from an open position to a position that closes off the flow path between the pilot input orifice 40a and the pilot output orifice 40b, and the micro spool valve 12 is moved from it's open position toward a closed position, the main port area, that is, the flow path between the main ports 20 and 22 closes before the spool 54 fully travels so as to shut off the flow path between the reference ports 24 and 26. After the flow path between the main ports 20 and 22 closes, the spool 54 continues to travel, until the flow path between the reference ports 24 and 26 is shut off.

Figure 18:
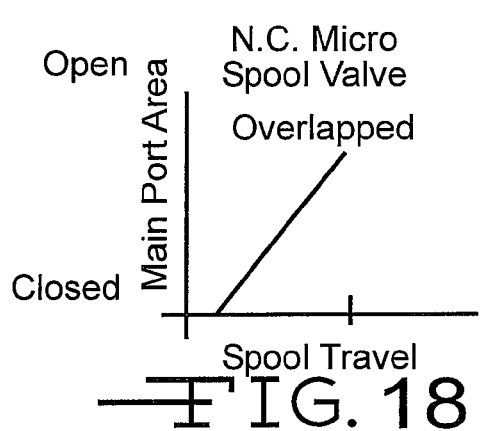
FIG. 18 is a graph illustrating the linear relationship between main port area and spool travel in an overlapped normally closed valve.

In FIG. 18, an idealized valve curve illustrates the relationship between the cross-sectional area of a main port and the spool travel in an overlapped normally closed valve. Initially, the flow path through the main port area, that is, the flow path between the main ports 20 and 22 is closed (main port area=0) when the spool valve spool 54 is all the way at one end of travel. As the spool 54 is urged to move toward the other end of travel, the flow path between the main ports 20 and 22 initially remains closed. As the spool 54 continues to move toward the other end of travel, and achieves some intermediate position, the flow path between the main ports 20 and 22 begins to open up. When the spool 54 has completed it full stroke of travel, the cross-sectional flow area of the flow path between the main ports 20 and 22 has reached a maximum area.

The maximum cross-sectional flow area of the flow path between the main ports 20 and 22 achieved when the spool has fully traveled may not be as great as that of the aligned valve described in FIG. 16, if all other aspects of the spool valves are identical. However, it will be appreciated that by changing parameters such as port shape, port size, etc. between the different spool valves of FIG. 16 and FIG. 18, a spool valve could be designed to achieve the same cross-sectional flow area at the end of travel despite being overlapped. This is illustrated in FIG. 18, where the same main port area size is achieved in FIG. 18 as that in FIG. 16. Since the main port area achieves the same change in opening size, within a smaller portion of the spool travel, the slope of the curve after the main port area begins to increase is steeper, as will be readily apparent by a visual comparison of the graphs in FIG. 16 and FIG. 18. A comparison of FIG. 15 and FIG. 17 illustrates a similar difference in magnitude of slope, which may be for a similar reason.

Figure 19:
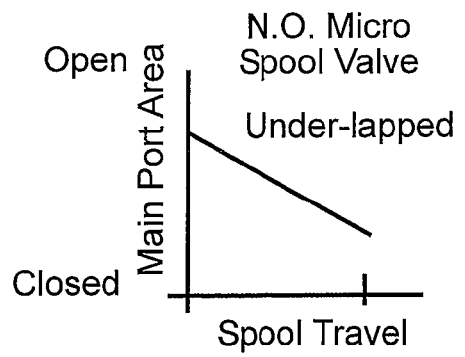
FIG. 19 is a graph illustrating the linear relationship between main port area and spool travel in an under-lapped normally open valve.

FIG. 19 is an idealized valve curve showing a relationship between the cross-sectional area of a main port and the spool travel in an under-lapped normally open micro spool valve 12. In this under-lapped micro spool valve 12, as the spool 54 is moved from the normally open position at one extreme of travel of the pool 54 toward an opposite extreme of travel of the spool 54, the main port area, that is, the flow path between the main ports 20 and 22 begins to close immediately, but does not fully close before the spool 54 fully travel.

Figure 20:
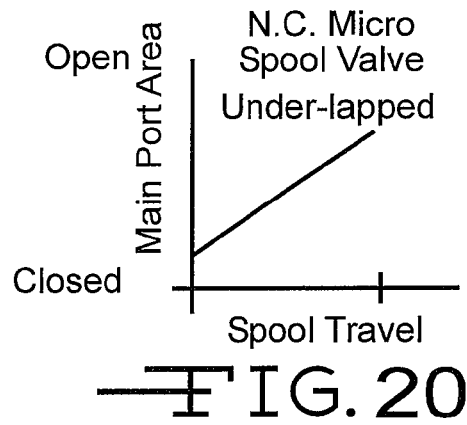
FIG. 20 is a graph illustrating the linear relationship between main port area and spool travel in an under-lapped normally closed valve.

Finally, FIG. 20 illustrates an idealized valve curve showing the relationship between the cross-sectional area of a main port and the spool travel in an under-lapped normally closed valve. Initially, the flow path through the main port area, that is, the flow path between the main ports 20 and 22 is not closed (main port area=some positive value) when the spool valve spool 54 is all the way at one end of travel. As the spool 54 is urged to move toward the other end of travel, the flow path between the main ports 20 and 22 opens further. When the spool 54 has completed it full stroke of travel, the cross-sectional flow area of the flow path between the main ports 20 and 22 has reached a maximum area.

Referring again to FIGS. 1-3, the middle layer 16 defines a wide and preferably rectangular spool chamber 48 and an adjacent, preferably narrower, and also preferably rectangular spring chamber 49. The spool chamber 48 and the spring chamber 49 are in fluid communication with each other.

The spool chamber 48 has a first end 50 which is adjacent and in fluid communication with the spring chamber 49. The spool chamber 48 also has a second end 51 opposite to the first end 50. Each of the walls of the spool chamber 48 extending between the first end 50 and the second end 51 has a plurality of outwardly extending recesses 52 formed therein, the purpose of which will be described below. The wall of the spool chamber 48 at the second end 51 has an outwardly extending recess 53 formed thereon, the purpose of which will be described below.

The micromachined spool 54 is disposed in the spool chamber 48 between the first and second ends 50 and 51 of the spool chamber 48. The spool 54 is movable between a first position adjacent the first end 50 of the spool chamber 48 (illustrated in FIGS. 4, 7, and 10, and a second position adjacent the second end 51 of the spool chamber 48 (illustrated in FIGS. 6, 9, and 12).

The spool 54 is generally rectangular. The spool 54 has a first end (command end) 54a disposed nearest the first end 50 of the spool chamber 48. The first end 54a of the spool 54 cooperates with the body 19 to define the variable sized command volume 48a between the first end 54a and the first end 50 of the spool chamber 48. The spool 54 has a second end (reference end) 54b disposed nearest the second end 51 of the spool chamber 48. The second end 54b of the spool 54 cooperates with the body 19 to define the variable sized reference volume 48b between the second end 54b and the second end 51 of the spool chamber 48. The spool 54 also has a central portion 54c between the first end 54a and the second end 54b. The central portion 54c defines a central aperture 56, which is preferably rectangular. The central aperture 56 remains in fluid communication with the output port 22 in all positions of the spool 54. One or more pressure-balancing micro vents 6o are defined in the spool 54 between the central aperture 56 and the first end 54a, immediately adjacent the central aperture 56, as shown. The purpose of the micro vents 60 will be described below. The spool 54 also includes pressure-balancing micro vents 70 and 72 associated with the reference inlet port 24 and the reference outlet port 26.

Figure 4:
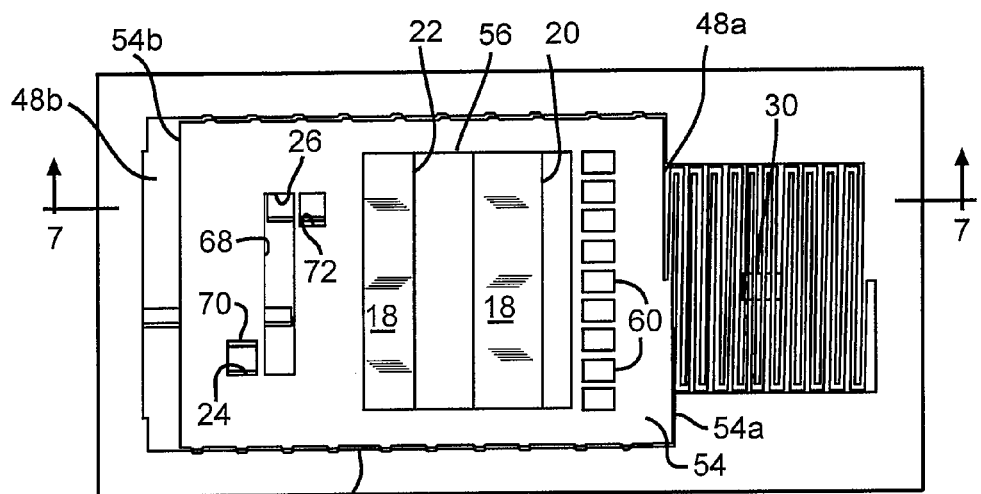
FIG. 4 is a plan view of the microvalve device of FIG. 1 shown in an open position.
Figure 5:
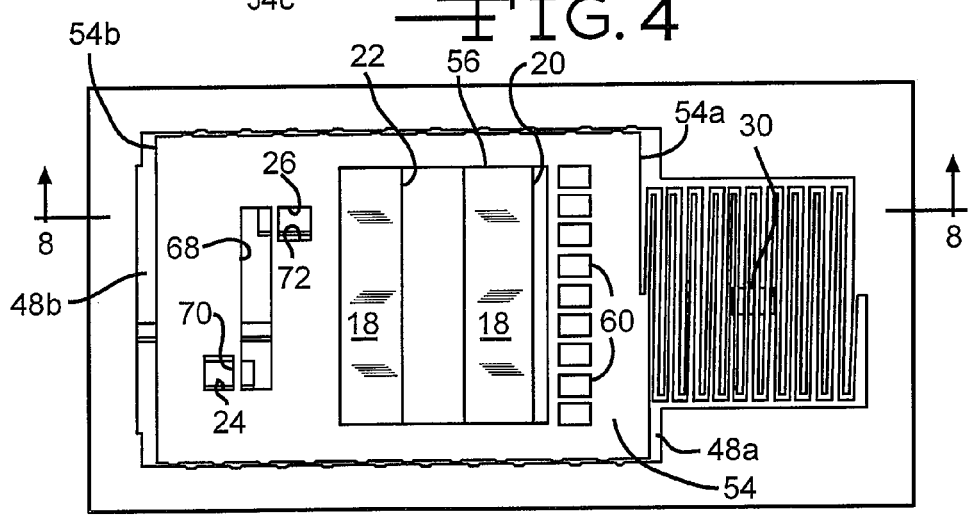
FIG. 5 is a plan view of the microvalve device of FIG. 1 shown in an intermediate position.
Figure 6:
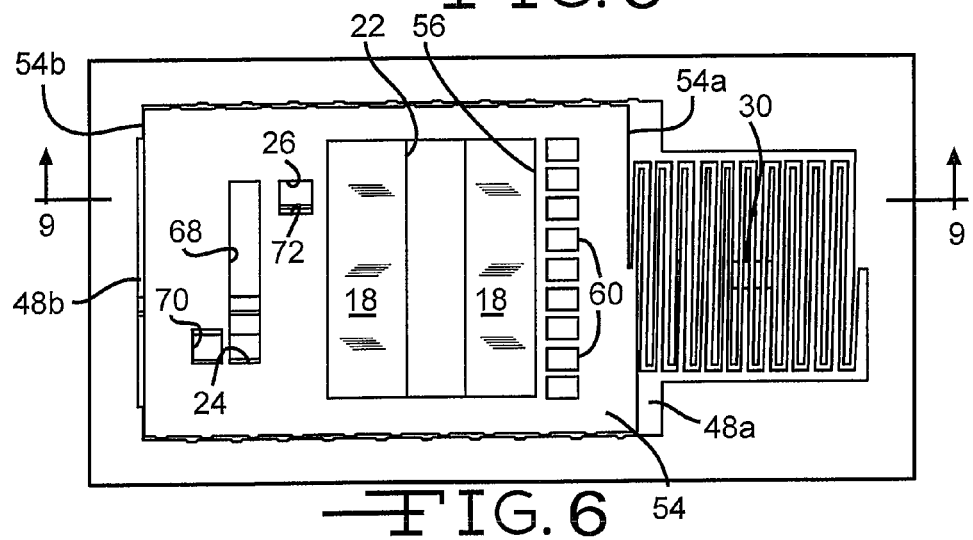
FIG. 6 is a plan view of the microvalve device of FIG. 1 shown in a closed position.
Figure 7:
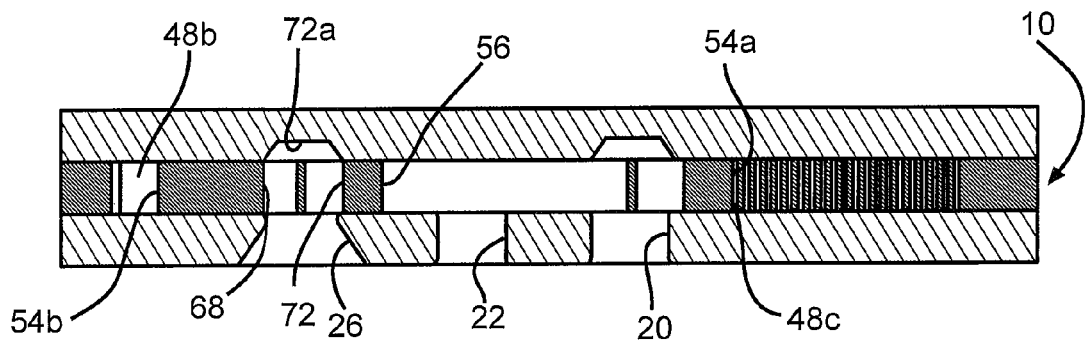
FIG. 7 is a cross-sectional view taken along the line 7-7 of the microvalve device of FIG. 4.
Figure 8:
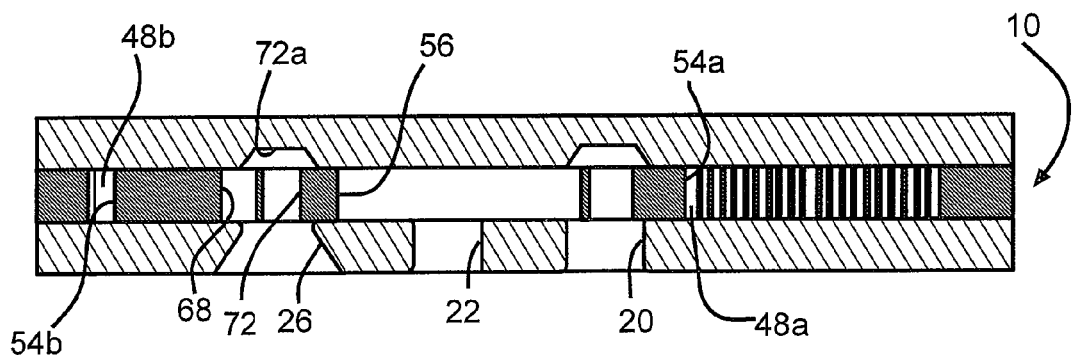
FIG. 8 is a cross-sectional view taken along the line 8-8 of the microvalve device of FIG. 5.
Figure 9:
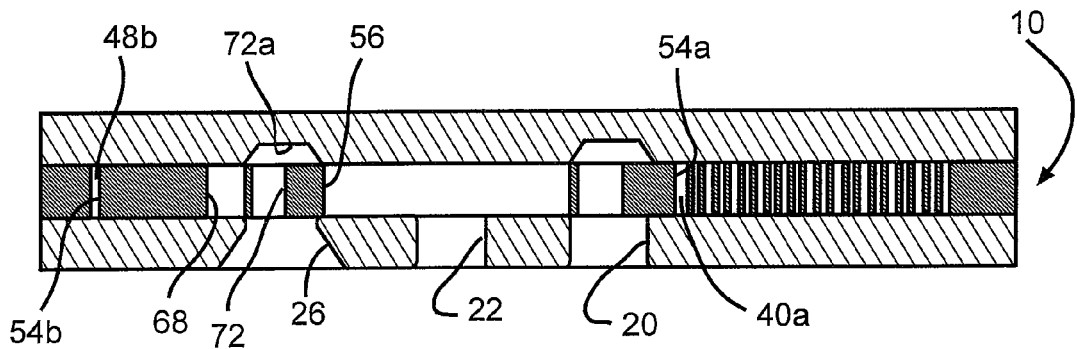
FIG. 9 is a cross-sectional view taken along the line 9-9 of the microvalve device of FIG. 6.

The spool 54 also defines a reference window 68 between the central aperture 56 and the second end 54b of the spool 54. The reference window 68 allows selective communication between the reference inlet port 24, the reference outlet port 26 and the reference channel 28. More specifically, the reference window 68 is situated such that the reference window 68 is in fluid communication with both the reference outlet port 26 and the reference channel 28, and the reference window 68 is not in fluid communication with the reference inlet port 24, when the spool 54 is in the first position thereof, as is best seen in FIGS. 4, 7, and 10. The reference window 68 is in fluid communication with both the reference inlet port 24 and the reference channel 28, and the reference window 68 is not in fluid communication with the reference outlet port 26, when the spool 54 is in the second position thereof, as is best seen in FIGS. 6, 9, and 12. When the spool 54 is in an intermediate position between the first and second positions, as seen in FIGS. 5, 8, and 11, the reference window 68 is simultaneously in fluid communication with the reference inlet port 24, the reference outlet port 26, and the reference channel 28.

The spool 54 further has a plurality of bumps 64 defined on the laterally outward walls thereof that extend between the first end 54a and the second end 64b, each of the bumps 64 being aligned with a corresponding one of the recesses 52 formed in the walls of the spool cavity 48, when the spool 54 is in the first position. The bumps 64 are sufficiently shallow not to interfere with the travel of the spool 54 within the spool chamber 48. However, when the spool 54 is out of the first position, the outwardly-extending bumps 64 on the spool 54 are no longer disposed next to the corresponding outwardly-extending recesses 52, and thus have diminished clearance in against the non-recessed rest of the inner-wall of the spool chamber 48. This arrangement restricts a leakage path that exists between the laterally outer walls of the spool 54 and the adjacent walls of the spool cavity 48 by which fluid could flow between the first end 50 and the second end 51 of the spool cavity 48 when the spool 54 is not in the first position thereof, such that substantial fluid leakage flow does not occur.

The middle layer 16 also includes a tether, in the form of the spring 66, disposed in the spring chamber 49. The spring 66 moveably connects the fixed portion of the middle layer 16 to the spool 54. The spring 66 retains the spool 54 in the spool chamber 48, simplifying handling of the middle layer 16 during manufacture. In one preferred manufacture operation the spool 54 and the spring 66 are integrally formed from the plate forming the middle layer 16 and defining the spool chamber 48 and the spring chamber 49. Preferably, the spring 66 biases the spool 54 to the first position.

The micro vents 60, 70, and 72 are all preferably associated with corresponding micro troughs 60a, 70a, and 72a, respectively, formed in the upper layer 14. U.S. Pat. No. 6,540,203 entitled "Pilot Operated Microvalve Device", the disclosures of which are hereby incorporated herein by reference, describes a similar vent and trough arrangement suitable for use in a microvalve and explains the pressure balancing purpose of micro vents and micro troughs, which is generally to help equalize static fluid pressures between the upper and lower surfaces of the spool 54 in the region of fluid ports when the ports are blocked by the spool 54. In an alternative embodiment, instead of the micro troughs, for each port formed through the lower layer 18 that may be blocked by the spool 54, a fluid port is formed through the upper layer 14 opposite the location of, and connected in parallel to, the corresponding port formed through the lower layer In such an arrangement, the micro vents through the spool 54 may be eliminated; however, even in such an arrangement, it is possible that pressure imbalances may momentarily exist between a port through the upper layer 14 and the corresponding port in the lower layer, so that it may be advantageous to retain the micro vents through the spool to help equalize such pressure imbalances.

In the exemplary microvalve device 10, the micro spool valve 12 is a pilot operated micro spool valve, although it must be understood that the micro spool valve 12 may be other than as shown and described. The micro spool valve 12 is shown in an illustrative example in FIG. 3 as being used to control the flow of fluid through the load device L, between the supply source 32 and the destination device 36. It must be understood, however, that the micro spool valve 12 may be used with any suitable devices between which it may be desired to control the flow of fluid by use of the micro spool valve 12.

In the illustrated example, the main input and output ports 20 and 22 are provided to allow flow into and out of the chamber 48, respectively, through the aperture 56 formed in the spool 54. It is contemplated that the micro spool valve 12 may be formed with additional ports to provide multiple ports for flow into and out of the chamber 48 through the aperture 56 or respective additional apertures formed in the spool 54, similar in function to the aperture 56.

In the illustrated example, the micro spool valve 12 is configured using a "U-flow" arrangement where flow through the ports 20, 22, 24, and 26 occur on the same side of the valve 12, e.g. all thorough the bottom layer 18. Flow is up through the input port 20, generally horizontal through the aperture 56, and then down through the output port 22, generally describing an inverted U-shape. However, it must be understood that the micro spool valve 12 may be configured using other flow arrangement as desired. For example, one of the inlet and outlet ports may be disposed in the top layer 14 while the other of the inlet and outlet ports is disposed in the bottom layer 18 to form a "flow through" arrangement. Additionally, the micro spool valve 12 may be configured with ports in the middle layer 14 to use a "flow across" arrangement.

In operation, a reference pressure is created in the reference window 68 according to the position of the spool 54. When the spool 54 is in the first position (illustrated in FIGS. 4, 7, and 10), the reference inlet port 24 is fully blocked by the spool 54, and the reference outlet port 26 is fully unblocked from communication with the reference window 68. This will cause the reference pressure in the reference window 68 to match that of the reference outlet port 26, which will be a low pressure, since the reference outlet port 26 is connected to the destination device 36. When the spool 54 is in the second position (illustrated in FIGS. 6, 9, and 12), the reference inlet port 24 is fully unblocked by the spool 54, and the reference outlet port 26 is fully blocked from communication with the reference window 68. This will cause the reference pressure in the reference window 68 to match that of the reference inlet port 24, which will be a high pressure, since the reference inlet port 24 is connected to the supply source 32. When the spool 54 is in between the first position and the second position (as illustrated in FIGS. 5, 8, and 11), the reference inlet port 24 is partially unblocked by the spool 54, and the reference outlet port 26 is partially unblocked from communication with the reference window 68. This will cause the reference pressure in the reference window 68 to be in between that of the supply source 32 and the destination device 36, in proportion to the amount of movement from the first position to the second position, as the inlet port 24 is progressively unblocked and the reference outlet port 26 is progressively blocked. Therefore, as the spool 54 is moved from the first position to the second position thereof, the reference pressure will rise from the pressure of the destination device 36 to that of the supply source 32; as the spool 54 is moved from the second position to the first position thereof, the reference pressure will fall from the pressure of the supply source 32 to that of the destination device 36.

The reference window 68 is in continuous communication with a reference side of the spool 54 (the axial end face of the second end 54b of the spool 54) via the reference channel 28, so that the reference pressure is continuously applied to the reference side of the spool 54.

A command pressure is supplied to the command port 30 of the microvalve device 10 from the pilot valve 40. The command port 30 communicates, via the spring chamber 49, with the first end 50 of the spool cavity 48, so the command pressure is applied to the axial face of the first end 54a of the spool 54 (the "command side" of the spool 54). If a command pressure supplied by the pilot valve 40 on the command side of the spool 54 generates a force on the spool 54 that is greater than the total force exerted by the spring 66 and the force generated by the reference pressure acting on the reference side of the spool 54, then the spool 54 will move away from the first end 50 and toward the second end 51 of the spool cavity 48, opening the reference inlet port 24 and closing the reference outlet port 26, causing the reference pressure to rise. Typically, the spring 66 will exert a relatively insignificant force, so practically it can be ignored. In the remainder of this discussion, therefore, reference will not further be made to the force exerted by the spring 66. One should realize, however, that in certain applications, with relatively low pressures and a relatively strong spring 66, the contribution of the spring 66 could become significant and may therefore need to be accounted for when controlling the microvalve device 10.

The spool 54 will continue to travel toward the second position thereof until the second position is reached, or until the reference pressure rises to equal the command pressure applied.

If the command pressure is less than the reference pressure, then the spool 54 will move toward the first end 50 of the spool cavity 48 until the spool 54 reaches the first position thereof, or until the reference pressure decreases to equal the command pressure applied.

The spool 54 is pressure balanced when the command pressure and the reference pressure between the supply source 32 and the destination device 36 are equal. The spool 54 will tend to remain in this position. If the spool 54 is moved to a position closer to the first position, by vibration for example, the reference pressure will fall as discussed above, while the command pressure will remain constant. This will cause a pressure imbalance which moves the spool 54 back toward the second position until the spool 54 returns to the position of pressure balance. Obviously, the position of pressure balance is dependent upon, and proportional to, the command pressure.

It should be noted that while the micro spool valve 12 is illustrated in the drawings as being arranged such that that the main input port 20 is always open while the main output port 22 is selectively opened and closed in proportion to the movement of the spool 54, the micro spool valve 12 may be arranged such that the main output port 22 is always open while the main input port 20 is selectively opened and closed in proportion to the movement of the spool 54 or that the main input port 20 and the main output port 22 are both selectively opened and closed in proportion to the movement of the spool 54. Further, it must be understood that while it is generally preferable that the main input port 20 and the main output port 22 are both of greater width than the reference input port 24 and the reference output port 26 the specific geometry of the ports may be chosen depending on a particular application and need not be precisely as illustrated and described.

In the illustrated embodiment of the microvalve device 10, the microvalve device 10 is a normally open valve. When the spool 54 is in the unactuated first position thereof, pressurized fluid from the supply source 32 will enter the inlet port 20, flow through the aperture 56 in the spool 54, then flow out of the outlet port 22 to the destination device 36. When a decrease in flow is desired, the pilot valve 40 directs high pressure from the supply source 32 into the command port 30 of the micro spool valve 12. This will move the spool 54 from the first position, causing the spool 54 to progressively begin to cover the inlet port 20 and restrict fluid communication between the inlet port 20 and the aperture 56, and thereby decreasing flow from the supply source 32 to the destination device 36. As the flow decreases, the reference pressure on the opposite end of the spool 54 increases, as the reference inlet port 24 opens and the reference outlet port 26 closes, thus increasing the command pressure required to continue moving the spool 54. The spool 54 will come to rest in a position where the adjusted reference pressure matches the newly set command pressure. A similar process may used to increase flow by the pilot valve 40 reducing command pressure by dumping fluid to the destination device 36.

While the preferred embodiment has been described with regards to a normally open micro spool valve in conjunction with a normally closed pilot valve, it must be understood that other embodiments of the invention include a normally closed micro spool valve, and a variety of embodiments include either the normally open micro spool valve or the normally closed micro spool valve alone or in conjunction with a variety of pilot valves including a normally open pilot valve.

Preferably, the micro spool valve 12 is a MEMS device valve with two main ports and a movable spool selectively blocking and permitting communication between the two main ports for controlling flow between a supply source and a load device, although such is not required. Preferably, the micro spool valve 12 is a normally open device, with the spool 42 moving to the first position thereof when not commanded to another position to fully open the fluid path through the micro spool valve 12 and allow fluid communication between the supply source 32 and destination device 36. It must be understood, however, that the micro spool valve 12 may be arranged otherwise, such as a normally closed valve. The micro spool valve 12 could be formed as a normally closed valve in any suitable fashion, such as by relocating the input port 20 to be between the output port 22 and the reference outlet port 26, so that the input port 20 was blocked by the spool 54 when the spool 54 was in the first position thereof, and the input port 20 was in fluid communication with the output port 22 via the aperture 56 when the spool was in other than the first position thereof.

In the exemplary microvalve device 10, the pilot valve 40 is preferably a proportional valve, i.e., in an unactuated position, the pilot valve 40 fully opens the path between the control port 30 and the destination device 36 and fully closes the path between the control port 30 and the supply source 32, to bleed off pressure from the first end 50 of the spool cavity 48, allowing the reference pressure to push the spool 54 to the first position thereof. In a fully actuated position, the pilot valve 40 fully opens the path between the control port 30 and the supply source 32 and fully closes the path between the control port 30 and the destination device 36, to increase the pressure at the first end 50 of the spool cavity 48, moving the spool 54 out of the first position thereof. In a position between the two extremes amount of pressure supplied to the first end 50 from the pilot valve 40 is proportional to the signal supplied to the pilot valve 40 and the resultant amount of actuation of the pilot valve 40. It must be understood that other pilot valve arrangement may be used, including a "digital" type valve where flow is on or off and or switchable between closed and open to either device.

In a preferred embodiment, the main input port 20, the main output port 22, the reference inlet port 24, and the reference outlet port 26 all have a common length along the direction that the spool 54 travels. Preferably the reference inlet port 24 and the reference outlet port 26 have relatively small widths as compared to the main input port 20 and the main output port 22. In this preferred geometry, a change in command pressure by the pilot valve 40 is approximately linear to the length of displacement of the spool 54 and the change in the opening size of the main input port 20, the main output port 22, the reference inlet port 24 and the reference outlet port 26 which is approximately linear to the change in flow between the supply source 32 and the destination device 36.

Although, as stated above, in one preferred embodiment the main input port 20, the main output port 22, the reference inlet port 24 and the reference outlet port 26 all have a common length along the direction that the spool 54 travels, it is not required for the main input port 20, the main output port 22, the reference inlet port 24, and the reference outlet port 26 to have a common length. It may be desirable for the main input port 20 to close in close conjunction (but not necessarily at exactly the same axial position of the spool 54) with the closure of one of the reference ports, that is, either the reference inlet port 24 and the reference outlet port 26.

In the illustrated embodiment, the main input port 20 closes in close conjunction with the reference outlet port 26. This represents the shut-off position of the micro spool valve 12. The valve position where the other reference port (i.e., the reference inlet port 24) is just closed would then represent the maximum open position of the micro spool valve 12. In this position the main input port 20 may be just reaching a maximum opening, or, in another embodiment, the main input port 20 may be only partially open, depending upon the relative sizes and positions of the main input port 20, the central aperture 56, and the reference inlet port 24.

It might be desirable to have the main input port 20 close at a slightly different position of the spool 54 than that at which the reference outlet port 26 to achieve one or more of several secondary aims. One secondary aim would be to adjust the gain of the valve curve of the micro spool valve 12. FIGS. 15 through 20 depict valve curves showing idealized linear responses for the micro spool valve 12, but the valve curves of a particular micro spool valve 12 would not be necessarily linear. In FIG. 16, for example, the relationship between travel and area is depicted as exactly linear. In practice, this valve curve (like the other valve curves shown in FIGS. 15, and 17 through 20) would be unlikely to be an exactly a straight line relationship and, and indeed may have a plotted valve curve of multiple curvatures, with multiple inflection points. Slight adjustments in the relationship between the closing of the reference ports 24, 26 and the closing of the main input port 20 can be used to control the linearity of the relationship between travel of the spool 54 and cross-sectional flow area through the main ports 20, 22.

Another secondary aim may be to reduce leakage through the main input port 20. This would require that the main input port 20 come to a close position slightly before the reference outlet port 26 closes, so that as the spool 54 continues to move toward the position at which the reference outlet port 26 closes, there is an increased overlap of the body of the spool 54 over the bottom layer 18 beyond the periphery of the main input port 20. Such increased overlap provides additional restriction to leakage in the very small gap between the bottom layer 18 and the spool 54. As indicated above, this is referred to as an overlapped design, and an idealized (linear) valve curve for a normally open valve with an overlapped design is illustrated in FIG. 17, and FIG. 18 illustrates an idealized valve curve for a normally closed valve with an overlapped design.

Indeed, in practical installations, it is believed that it would almost always be desirable to have the main input port 20 and/or the main output port 22 close before the reference port 24, 26 associated with the closed position of the micro spool valve 12 (the reference outlet port 26, in the illustrated embodiment) to minimize leakage, i.e., an overlapped design. However, there may be an application, though rare, where some flow is desired when the micro spool valve 12 has been moved to the "closed" position thereof. In this case the main input port 20 would not close when the reference port associated with the closed position of the micro spool valve 12 (i.e., the reference outlet port 26) is closed. If the spring 66 is eliminated, or otherwise does not act to urge the spool 54 to move toward a position where the main input port 20 closes, the spool 54 cannot move past the point where the reference port (i.e., the reference outlet port 26) closes and the main input port 20 will be left partially open, if the micro spool valve 12 is designed so that the main input port 20 can only close after the reference port is fully closed. As indicated above, an idealized valve curve for this "underlapped" design is in a normally open valve is illustrated in FIG. 19, and an idealized valve curve for a normally closed valve with an underlapped design is illustrated in FIG. 20.

In a preferred method of operation, the pilot valve 40 is actuated in a linear proportion to a desired change in the position of the valve 12. In the preferred operation, the position of the micro spool valve 12 is set to control the cross-sectional area of flow restriction and not directly control a flow volume or a pressure. In the preferred operation, the movement of the micro spool valve 12 is generally directly and linearly related to the movement of the pilot valve 40. In this example, the purpose of the micro spool valve 12 is not to set a flow rate or system pressure, but to present a fluid system an orifice of selected size. In one such system, it is expected that another device, such as a variable pressure accumulator or variable volume pump, will set the flow rate and/or system pressure, although such is not required. This purpose is the same purpose as many traditional pilot valves. However, traditional pilot valves are too small for many applications. Thus, a device or system according to the present invention is advantageous in at least that in one aspect it contemplate a method and a device to proportionally replicate the motion of a pilot stage valve in a micro valve with a larger variable orifice. It should also be noted that in at least one embodiment, the power necessary to position the micro spool valve is provided by the fluid system alone.

The relationships between the cross-sectional port flow areas and the system pressure can be illustrated by the following mathematical Equations 1 and 3.

$$P_2 = \frac{P_1 A_1^2}{(A_1^2 + A_2^2)} \qquad \text{Equation 1}$$

where $P_2$ is the pressure of the command volume 48a set by the pilot valve 40 (note that the pressure of the reference volume 48b will also be $P_2$ plus or minus the force exerted by the spring 66), $P_1$ is the pressure of the fluid provided by the supply source 32, $A_1$ is the cross-sectional flow area of the pilot input orifice 40a, and $A_2$ is the cross-sectional area or the pilot output orifice 40b.

The following Equation 2 is achieved by rearranging Equation 1.

$$\frac{A_2}{A_1} = \sqrt{\frac{P_1 - P_2}{P_2}} \qquad \text{Equation 2}$$

Additionally, $$P_2 = \frac{P_1 A_3^2}{(A_3^2 + A_4^2)} \qquad \text{Equation 3}$$

where $A_3$ is the cross-sectional flow area of the reference input port 24, and $A_4$ is the cross-sectional area or the reference output port 26.

The following Equation 4 is achieved by rearranging Equation 3.

$$\frac{A_4}{A_3} = \sqrt{\frac{P_1 - P_2}{P_2}} \qquad \text{Equation 4}$$

Thus, $$\frac{A_2}{A_1} = \frac{A_4}{A_3} \qquad \text{Equation 5}$$

Equation 5 shows that the ratio of the cross-sectional flow area $A_2$ of the pilot output orifice 40b to the cross-sectional flow area $A_1$ of the pilot input orifice 40a is equal to the ratio of the cross-sectional flow area $A_4$ of the reference output port 26 to the cross-sectional flow area $A_3$ of the reference input port 24.

Note that the relationship illustrated by Equation 5 may be restated by inverting the ratios on each side of the equal sign, to come up with an equivalent statement, Equation 6:

$$\frac{A_1}{A_2} = \frac{A_3}{A_4} \qquad \text{Equation 6}$$

Equation 6 shows that the ratio of the cross-sectional flow area $A_1$ of the pilot input orifice 40a to the cross-sectional flow area $A_2$ of the pilot output orifice 40b is equal to the ratio of the cross-sectional flow area $A_3$ of the reference input port 24 to the cross-sectional flow area $A_4$ of the reference output port 26. However the relationship is stated, either according to Equation 5 or according to Equation 6, a change in a ratio of the cross-sectional flow areas of the pilot valve orifices 40a, 40b will result in a change in the corresponding ratio of the cross-sectional flow areas of the spool valve reference ports 20, 22.

Figure 21:
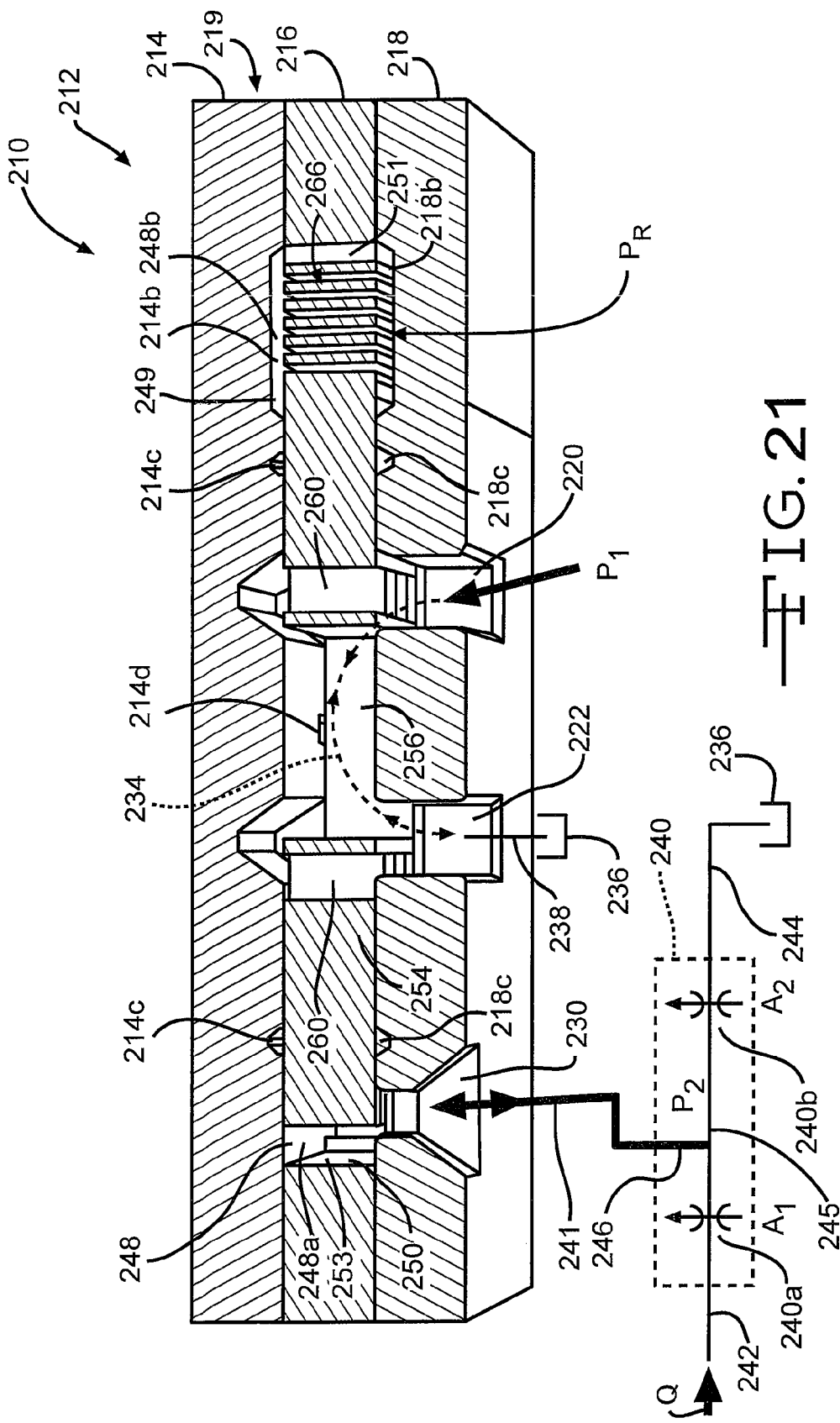
FIG. 21 is a partial perspective cross-section and partial schematic representation of a microvalve device having a pilot microvalve with two variable orifices.

Referring now to FIG. 21, there is illustrated a microvalve device, indicated generally at 210, according to another embodiment of the present invention. The microvalve device 210 may include a pilot operated micro spool valve, indicated generally at 212. The micro spool valve 212 may include a top layer 214, a middle layer 216, and a bottom layer 218, which may cooperate to form a body, indicated generally at 219. Furthermore, although only three layers 212, 214, and 216 are illustrated, the body 219 may includes a number of layers other than three.

The bottom layer 218 may define a main input port 220, a main output port 222 and a command port 230. The main input port 220 and the main output port 222 each may be in fluid communication with a first fluid passageway 234 defined within the micro spool valve 212. The main input port 220 may be in fluid communication with a supply source (not shown), such as a pump, an accumulator, or any other device that provides pressurized fluid at a first pressure (e.g., a high-pressure source). Although not illustrated, the main input port 220 and the supply source may be in communication via a supply fluid conduit, although such a common conduit is not required, and the main input port 220 and the supply source may be arranged in any suitable fluid communication arrangement.

The main output port 222 may be at a second pressure, which is less than the first pressure (at the main input port 220). The main output port 222 may be in fluid communication with a destination device 236 such as a fluid reservoir, fluid accumulator, or any other suitable destination for a selectively controlled flow of pressurized fluid from the micro spool valve 212. It must be understood that the destination device may be a return line to the supply source. As illustrated, the main output port 222 and the destination device 236 may be in fluid communication via a destination fluid conduit 238, although such a fluid conduit 238 is not required and the main output port 222 may be arranged in any suitable fluid communication arrangement with the destination device 236.

One or more load devices may be placed in fluid communication between the supply source and the main input port 220 and/or the main output port 222 and the destination device 236. The load device may be any fluid driven or fluid regulated device suitable to have a flow of fluid controlled by the spool micro spool valve 212, including, but not limited to hydraulic actuators, hydraulic motors, heat exchangers, sensors, fluid reservoirs, accumulators, pumps, compressors, HVACR (Heating, Ventilation, Air Conditioning, and Refrigeration) system components, other valves, and inlets or outlets communicating with ambient surroundings. It must be understood that any load device may be upstream or downstream of the spool micro spool valve 212 as desired.

While the bottom layer 218 of the micro spool valve 212 is illustrated as having a single main input port 220, a single main output port 222, and a single command port 230, it should be understood that the micro spool valve 212 may have any suitable number of ports in any suitable location (including in other layers of the micro spool valve 212), as desired. It may be desirable, for example, to form multiple smaller ports that are blocked and unblocked by various different portions of a movable spool 254 (described below) of the micro spool valve 212 rather than a single larger port for reasons of ease of reliable fabrication, or for reasons of improved operational performance. Accordingly, as used herein, the use of the singular words "port" (or "orifice") should be understood to include the possibility of multiple ports (or orifices) with the same functionality attributed to the single port (or single orifice).

The command port 230 of the micro spool valve 212 may be in fluid communication with a pilot valve, which is preferably a pilot microvalve 240. The pilot microvalve 240 supplies a command pressure $P_2$ via a second fluid passageway 241 to the command port 230. Furthermore, while the pilot microvalve 240 is illustrated as being a single three-way valve, such is not required, and any structure suitable may be substituted, including the use of multiple valves acting in concert to achieve the desired effect.

As illustrated, the pilot microvalve 240 may be in communication with a supply source (not shown) via a pilot supply conduit 242. Also, the pilot microvalve 240 may be in communication with a destination device via a pilot dump fluid conduit 244. Although not required, FIG. 21 illustrates that the destination device 236 for the micro spool valve 212 may be the destination device, and the pilot dump fluid conduit 244 may be connected to the downstream side of the micro spool valve 212 to the destination device 236. Similarly, the supply source for the pilot microvalve 240 and the supply source for the micro spool valve 212 may be the same supply source, and the pilot supply conduit 242 may be connected upstream of the micro spool valve 212 main output port 222. Moreover, the pilot microvalve 240 may be operable to allow the command port 230 to selectively communicate with the supply source and the destination device in order to increase or decrease, respectively, pressure in the command conduit 241.

More specifically, the position of the pilot microvalve 240 may be proportional to power applied to an actuator (not shown) of the pilot microvalve 240. The pilot microvalve 240 may be arranged such that actuation of a moving valve element 243 (seen in FIGS. 29A and 30A) may progressively open a pilot input orifice 240a with a cross sectional area $A_1$, the pilot input orifice 240a being in fluid communication with the pilot supply conduit 242. Simultaneously, the pilot microvalve 240 may progressively close a pilot output orifice 240b to a cross sectional area $A_2$, the pilot output orifice 240b being in fluid communication with the pilot dump fluid conduit 244. A third fluid passageway 245 may be defined within the pilot microvalve 240, extending between the pilot input orifice 240a and the pilot output orifice 240b. A pilot vent port 246 may be arranged to provide communication between the second fluid passageway 241 and the third fluid passageway 245 between the pilot input orifice 240a and the pilot output orifice 240b. The pilot vent port 246 may be communication with the command port 230 via the second fluid passageway 241, and may set the pressure of a command volume 248a as a function of the upstream pressure $P_1$ supplied to the pilot microvalve 240, the cross-sectional area $A_1$, and the cross-sectional area $A_2$, as will be described in further detail below. This function may be dependent upon the upstream pressure $P_1$, the amount of opening (cross-sectional area $A_1$) of the pilot input orifice 240a and amount of opening (cross-sectional area $A_2$) of the pilot output orifice 240b.

Returning to the micro spool valve 212, as best seen in FIGS. 23 through 26 and 28, the middle layer 216 may define a spool chamber or cavity 248, such as the wide, generally rectangular, spool cavity shown and an adjacent spring chamber 249, such as the relatively narrower rectangular spring chamber shown. The spool cavity 248 and the spring chamber 249 may be in fluid communication with each other.

The spool cavity 248 may have a first end 250 which may be adjacent and in fluid communication with the command port 230. The spool cavity 248 may also have a second end 251, opposite to the first end 250, which may be adjacent and in fluid communication with the spring chamber 249. The spool cavity 248 may have walls that extend between the first end 250 and the second end 251. The walls may have a plurality of outwardly extending recesses 252 (see FIG. 26) formed therein, the purpose of which will be described below. The wall of the spool cavity 248 at the first end 250 may have an outwardly extending recess 253 (see FIG. 26) formed thereon, the purpose of which will be described below.

Figure 28:
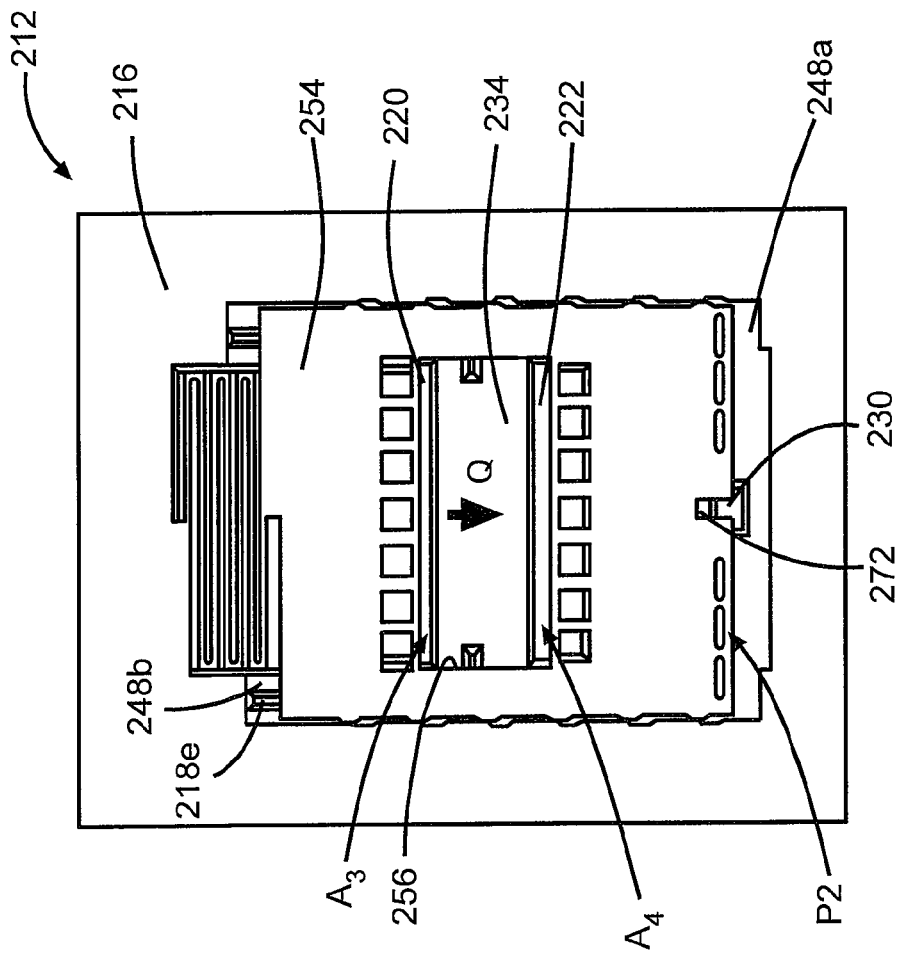
FIG. 28 is a plan view of the pilot operated micro spool valve with the top layer removed, wherein the pilot operated micro spool valve is in an open position.

The spool 254 may be disposed in the spool cavity 248 between the first and second ends 250 and 251 of the spool cavity 248. The spool 254 may be movable between a first position adjacent the first end 250 of the spool cavity 248 (as illustrated in FIG. 26), and a second position adjacent the second end 251 of the spool cavity 248 (as illustrated in FIG. 28).

The spool 254 may be generally rectangular. As shown in FIG. 26, the spool 254 may have a first end (e.g., a command end) 254a disposed nearest the first end 250 of the spool cavity 248. The first end 254a of the spool 254 may cooperate with the body 219 to define a first volume, the variable sized command volume 248a, between the first end 254a of the spool 254 and the first end 250 of the spool cavity 248. The spool 254 may have a second end 254b disposed nearest the second end 251 of the spool cavity 248. The second end 254b of the spool 254 may cooperate with the body 219 to define a second volume, a variable sized reference volume 248b (which may include the spring chamber 249) between the second end 254b of the spool 254 and the second end 251 of the spool cavity 248. The spool 254 may also have a central portion 254c between the first end 254a and the second end 254b. The central portion 254c may define a fluid flow aperture 256, which is preferably rectangular and may be generally centrally disposed in the spool 254. The spool 254 cooperates with the main input port 220 to define a variable orifice between the main input port 220 and the fluid flow aperture 256 of cross-sectional area $A_3$. The spool 254 cooperates with the main output port 222 to define a variable orifice between the main output port 222 and the fluid flow aperture 256 of cross-sectional area $A_4$.

One or more pressure-balancing micro vents 260 may be defined through the spool 254, at respective locations between the fluid flow aperture 256 and the first and second ends 254a, 254b, preferably immediately adjacent the fluid flow aperture 256, as shown. The purpose of the micro vents 260 will be described below. The spool 254 may also include pressure-balancing micro vents 270 formed through the spool 254 at the first end 254a of the spool as shown in FIG. 26. A recess 272 may be formed in the first end 254a of the spool 254 which cooperates with the recess 253 in the wall of the spool cavity to ensure fluid communication between the command port 230 and the command volume 248a acting on the axial end face of the first end 254a of the spool 254 in all positions of the spool 254.

The spool 254 may further have a plurality of bumps 264 (see FIG. 26) defined on the laterally outward walls thereof that extend between the first end 254a and the second end 254b. Each of the bumps 264 may be aligned with a corresponding one of the recesses 252 formed in the walls of the spool cavity 248, when the spool 254 is in the first position. The bumps 264 may be sufficiently shallow so as to not interfere with the travel of the spool 254 within the spool cavity 248. However, when the spool 254 is out of the first position, the outwardly-extending bumps 264 on the spool 254 may no longer be disposed next to the corresponding outwardly-extending recesses 252, and thus may have diminished clearance against the non-recessed portions of the inner-wall of the spool cavity 248. This arrangement may restrict a leakage path that may exist between the laterally outer walls of the spool 254 and the adjacent walls of the spool cavity 248 by which fluid could flow between the first end 250 and the second end 251 of the spool cavity 248 when the spool 254 is not in the first position thereof, preventing substantial fluid leakage flow.

The middle layer 216 may also include a tether, in the form of a spring 266, disposed in the spring chamber 249. The spring 266 may moveably connect a fixed portion of the middle layer 216 to the spool 254. In a manufacture operation, the spool 254 and the spring 266 may be integrally formed from the plate forming the middle layer 216 and defining the spool cavity 248 and the spring chamber 249. The spring 266 thus may be useful to retain the spool 254 in the spool cavity 248 prior to positioning and attaching the top layer 214 and the bottom layer 218 to the middle layer 216, simplifying handling of the middle layer 216 during manufacture. The spring 266 may bias the spool 254 to the first position, but will preferably have a low spring rate, such that any forces exerted by the spring 266 will normally be insignificant compared to pressure induced forces acting on the axial end faces of the spool 254.

The micro vents 260 may be associated with corresponding micro troughs 260a formed in the top layer 214 (as illustrated in FIG. 25). U.S. Pat. No. 6,540,203 entitled "Pilot Operated Microvalve Device," the disclosure of which is hereby incorporated herein by reference, describes a similar vent and trough arrangement suitable for use in a microvalve and explains the pressure balancing purpose of micro vents and micro troughs, which is generally to help equalize static fluid pressures between the upper and lower surfaces of the spool 254 in the region of fluid ports when the ports are blocked by the spool 254. In an alternative embodiment, instead of the micro troughs, for each port formed through the bottom layer 218 that may be blocked by the spool 254, a fluid port (not shown) may be formed through the top layer 214 opposite the location of, and connected in parallel to, the corresponding port formed through the bottom layer In such an arrangement, the micro vents through the spool 254 may be eliminated; however, even in such an arrangement, it is possible that pressure imbalances may momentarily exist between a port through the top layer 214 and the corresponding port in the bottom layer, so that it may be advantageous to retain the micro vents 260 through the spool 254 to help equalize such pressure imbalances.

In the exemplary microvalve device 210, the micro spool valve 212 is a pilot operated micro spool valve, although it must be understood that the micro spool valve 212 may be other than as shown and described. Although the micro spool valve 212 is described as being useful to control the flow of fluid between a supply source and a destination device, it should be understood that the micro spool valve 212 may be used with any suitable devices between which it may be desired to control the flow of fluid by use of the micro spool valve 212.

In the illustrated example, the main input port 220 and the main output port 222 are provided to allow flow into and out of the cavity 248, respectively, through the first fluid passageway 234, which includes the fluid flow aperture 256 formed in the spool 254. However, it is contemplated that the micro spool valve 212 may be formed with additional ports to provide multiple ports for flow into and out of the cavity 248 through the fluid flow aperture 256 or respective additional apertures formed in the spool 254, similar in function to the fluid flow aperture 256.

In the illustrated example, the micro spool valve 212 is configured using a generally U-shaped flow arrangement, where flow through the main input port 220 and the main output port 222 occurs on the same side of the micro spool valve 212 (e.g., all thorough the bottom layer 218). Flow through the first fluid passageway 234 is up through the main input port 220, generally horizontal through the fluid flow aperture 256, and then down through the main output port 222, generally describing an inverted U-shape. However, it must be understood that the micro spool valve 212 may be configured using other flow arrangement as desired. For example, one of the main input port 220 and the main output port 222 may be disposed in the top layer 214 while the other of the main input port 220 and the main output port 222 may be disposed in the bottom layer 218 to form a flow-through arrangement. Additionally, the micro spool valve 212 may be configured with ports in the middle layer 214 to use a flow-across arrangement.

Figure 24:
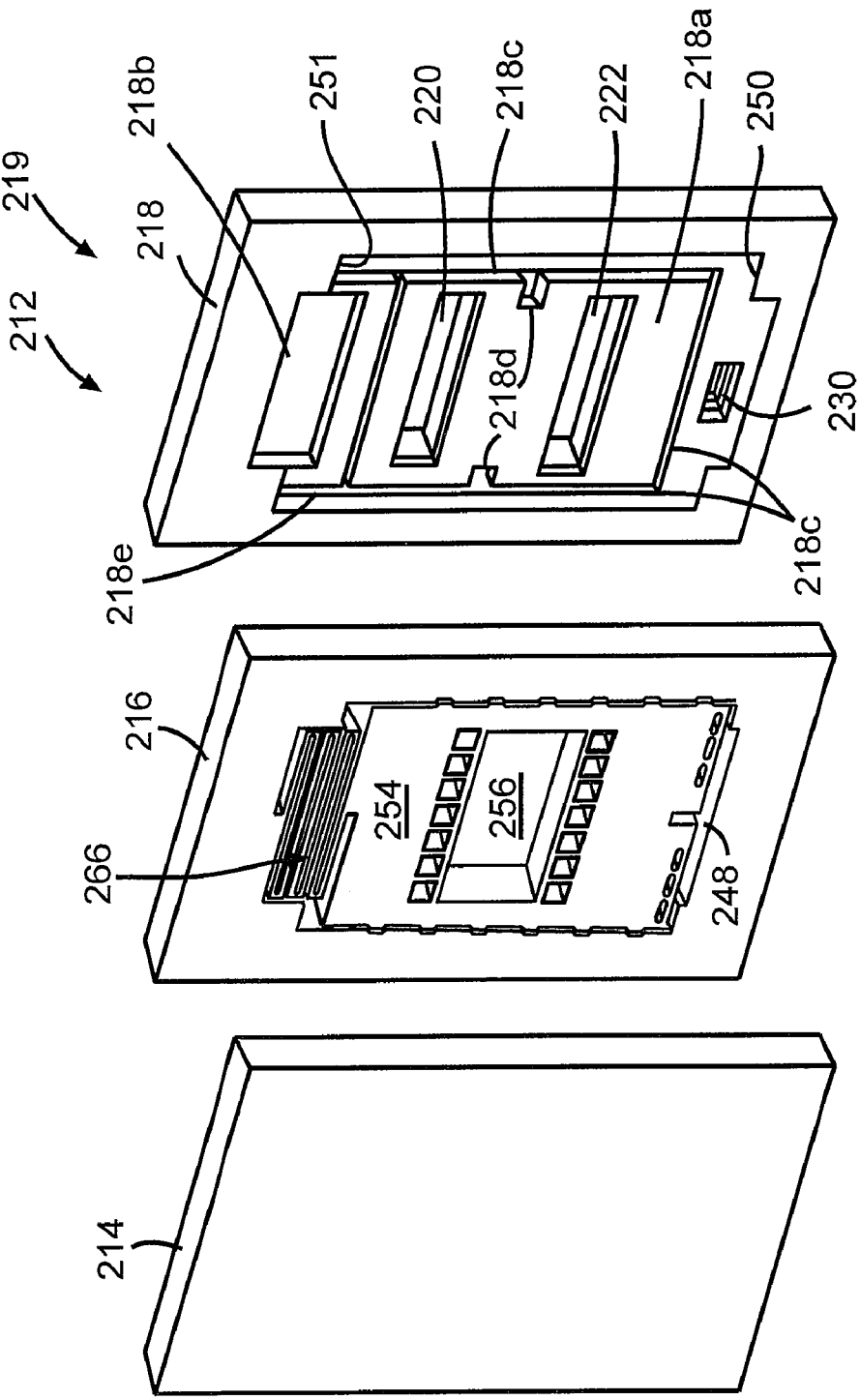
FIG. 24 is an exploded perspective view of the pilot operated micro spool valve.

Referring now to FIGS. 24, 25, and 27, the bottom layer 218 may further define a slight recess 218a, which may be on the order of 0.5 to 2 micrometers (microns) deep, in the area adjacent to, and generally co-extensive with, the spool cavity 248 defined in the middle layer 216. Similarly, the top layer 214 may further define a slight recess 214a, which may be on the order of 0.5 to 2 micrometers microns deep, in the area adjacent to, and generally co-extensive with, the spool cavity 248 defined in the middle layer 216. The recesses 218a and 214a each provide a slight clearance between the spool 254 and the top layer 214 and bottom layer 218 to minimize friction as the spool 254 moves; however, these clearances are not so great as to allow substantial fluid leakage flow through these clearances.

The bottom layer 218 may further define a recess 218b, which may be on the order of 20 to 100 micrometers microns deep, in the area adjacent to, and generally co-extensive with, the spring chamber 249 defined in the middle layer 216. Similarly, the top layer 214 may further define a recess 214b (see FIG. 21), which may be on the order of 20 to 100 micrometers deep, in the area adjacent to, and generally coextensive with, the spring chamber 249 defined in the middle layer 216. The recesses 218b and 214b each provide a clearance between the spring 266 and the top layer 214 and bottom layer 218 to minimize friction as the spool 254 moves. These clearances are sufficiently great as to allow substantial fluid flow through these clearances, preventing hydraulic lock as the spring 266 compresses back on itself, and, as will be discussed next, providing free flow through the reference volume 248b to the axial end face of the second end 254b of the spool 254.

As best seen in FIG. 27, the bottom layer 218 may further define a trench 218c within the recess 218a. The trench 218c may have a generally rectangular layout, extending about the main input port 220 and the main output port 222 and spaced inwardly from the edges of the recess 218a, with the result that four sides of the rectangular portion of the trench 218c will be covered by solid portions of the spool 254 during operation. Two laterally inwardly extending spurs 218d of the trench 218c may be defined between the main input port 220 and the main output port 222, providing fluid communication with the first fluid passageway 234 (see FIG. 21) and the rest of the trench 218c. Two longitudinally extending spurs 218e may be defined so as to provide fluid communication between the rest of the trench 218c and the reference volume 248b. Thus, the trench 218c provides fluid communication, via the spurs 218d and 218e, between the first fluid passageway 234 (at a location between the main input port 220 and the main output port 222) and the reference volume 248b. Similarly (or instead), the top layer 214 may further define a trench 214c within the recess 214a. The trench 214c may have a generally rectangular layout, extending about the main input port 220 and the main output port 222 and spaced inwardly from the edges of the recess 214a, with the result that 24 sides of the rectangular portion of the trench 214c will be covered by solid portions of the spool 254 during operation. Two laterally inwardly extending spurs 214d of the trench 214c may be defined between the main input port 220 and the main output port 222, providing fluid communication with the first fluid passageway 234 and the rest of the trench 214c. Two longitudinally extending spurs 214e may be defined so as to provide fluid communication between the rest of the trench 214c and the reference volume 248b. In this manner, the trenches 214c and 218c act to provide fluid communication between the first fluid passageway 234 and the reference volume 248b.

As indicated above, the command pressure $P_2$ is supplied to the command port 230 of the micro spool valve 212 from the pilot microvalve 240. The command port 230 communicates with the command volume 248a at the first end 250 of the spool cavity 248 so the command pressure $P_2$ is applied to the axial face of the first end 254a of the spool 254 (the command side of the spool 254). If a command pressure $P_2$ supplied by the pilot microvalve 240 on the command side of the spool 254 generates a force on the spool 254 that is greater than the total force exerted by the spring 266 and the force generated by the reference pressure $P_R$ in the reference volume 248b acting on the second end 254b the spool 254, then the spool 254 will be urged away from the first end 250 and toward the second end 251 of the spool cavity 248, unblocking the main input port 220 to permit flow through the micro spool valve 212. Typically, the spring 266 will exert a relatively insignificant force, so practically it can be ignored. In the remainder of this discussion, therefore, reference will not further be made to the force exerted by the spring 266. It should be appreciated, however, that in certain applications, with relatively low pressures and a relatively strong spring 266, the contribution of the spring 266 could become significant and may therefore need to be accounted for when controlling the microvalve device 210.

The spool 254 will continue to travel toward the second position thereof until the pressure in the first fluid passageway 234, communicated as the reference pressure $P_R$ to the reference volume 248b acting on the second end 254b of the spool 254 rises to equal the command pressure $P_2$ applied.

If the command pressure $P_2$ is less than the reference pressure $P_R$ acting on the second end 254b of the spool 254, then the spool 254 will move toward the first end 250 of the spool cavity 248, decreasing pressure in the reference volume 248b until the reference pressure $P_R$ acting on the second end 254b of the spool 254 decreases to equal the command pressure $P_2$ applied.

The spool 254 is pressure balanced when the command pressure $P_2$ and the reference pressure $P_R$ acting opposite ends the spool 254 are equal. The spool 254 will tend to remain in this position. If the spool 254 is moved to a position closer to the first position, by vibration for example, the reference pressure $P_R$ acting on the second end 254b of the spool 254 will fall, while the command pressure $P_2$ will remain constant. This will cause a pressure imbalance which may move the spool 254 back toward the second position until the spool 254 returns to the position of pressure balance. The position of pressure balance is dependent upon, and proportional to, the command pressure $P_2$.

It should be noted that while the micro spool valve 212 is illustrated in the drawings as being arranged such that that the main output port 222 is always open while the main input port 220 is selectively opened and closed in proportion to the movement of the spool 254, the micro spool valve 212 may be arranged such that the main input port 220 is always open while the main output port 222 is selectively opened and closed in proportion to the movement of the spool 254 or that the main input port 220 and the main output port 222 are both selectively opened and closed in proportion to the movement of the spool 254.

In the illustrated embodiment of the microvalve device 210, the microvalve device 210 is a normally open valve. When the spool 254 is in the unactuated first position thereof, pressurized fluid from the supply source will enter the inlet port 220, flow through the aperture 256 in the spool 254, then flow out of the outlet port 222 to the destination device. When a decrease in flow is desired, the pilot microvalve 240 directs high pressure from the supply source 232 into the command port 230 of the micro spool valve 212. This will move the spool 254 from the first position, causing the spool 254 to progressively begin to cover the inlet port 220 and restrict fluid communication between the inlet port 220 and the aperture 256, thereby decreasing flow from the supply source to the destination device. As the flow decreases, the reference pressure $P_R$ acting on the second end 254b of the spool 254 on the opposite end of the spool 254 increases, thus increasing the command pressure $P_2$ required to continue moving the spool 254. The spool 254 will come to rest in a position where the adjusted pressure acting on the second end 254b of the spool 254 matches the newly set command pressure $P_2$ A similar process may used to increase flow by the pilot microvalve 240 reducing command pressure $P_2$ by dumping fluid to the destination device.

While the preferred embodiment has been described with regards to a normally open micro spool valve in conjunction with a normally closed pilot microvalve, it must be understood that other embodiments of the invention include a normally closed micro spool valve, and a variety of embodiments include either the normally open micro spool valve or the normally closed micro spool valve alone or in conjunction with a variety of pilot microvalves including a normally open pilot microvalve.

Preferably, the micro spool valve 212 is a MEMS device valve with two main ports and a movable spool selectively blocking and permitting communication between the two main ports for controlling flow between a supply source and a load device, although such is not required. Preferably, the micro spool valve 212 is a normally closed device, with the spool 242 moving to the first position thereof when not commanded to another position to fully close the fluid path through the micro spool valve 212 and prevent fluid communication between the supply source and destination device. It must be understood, however, that the micro spool valve 212 may be arranged otherwise, such as a normally open valve. The micro spool valve 212 could be formed as a normally open valve in any suitable fashion.

In the exemplary microvalve device 210, the pilot microvalve 240 is preferably a proportional valve, that is, in an non-actuated position, the pilot microvalve 240 fully opens the path between the command port 230 and the destination device and fully closes the path between the command port 230 and the supply source, to bleed off pressure from the first end 250 of the spool cavity 248, allowing the reference pressure $P_R$ acting on the second end 254b of the spool 254 to push the spool 254 to the first position thereof. In a fully actuated position, the pilot microvalve 240 fully opens the path between the command port 230 and the supply source and fully closes the path between the command port 230 and the destination device, to increase the pressure at the first end 250 of the spool cavity 248, moving the spool 254 out of the first position thereof. In a position between the two extremes amount of pressure supplied to the first end 250 from the pilot microvalve 240 is proportional to the signal supplied to the pilot microvalve 240 and the resultant amount of actuation of the pilot microvalve 240. It must be understood that other pilot microvalve arrangement may be used, including a digital type valve where flow is on or off and or switchable between closed and open to either device.

In summary, the microvalve device 210 may comprise substantially two primary parts: the micro spool valve 212 and the pilot microvalve 240. The pilot microvalve 240 utilizes the pilot input orifice 240a and the pilot output orifice 240b in the third fluid passageway 245 to create a desired output pressure $P_2$ (as illustrated in FIG. 21) which output pressure $P_2$ will be intermediate the supply pressure $P_1$ upstream of the pilot input orifice 240a and a return pressure downstream of the pilot output orifice 240b in the pilot dump fluid conduit 244. The output pressure $P_2$ is communicated from the pilot microvalve 240 to the micro spool valve 212 via the second fluid passageway 241. The micro spool valve 212 uses the pressure $P_2$ signal to open and close a flow path in the first fluid passageway 234 through the micro spool valve 212.

The pilot microvalve 240 responds to a power input to vary the relationship between the cross-sectional flow area $A_1$ through the pilot input orifice 240a and the cross-sectional flow area $A_2$ area through the pilot output orifice 240b such that the sum of the flow areas $A_1$ and $A_2$ is a constant area.

The illustrated embodiment of the micro spool valve 212 has a single two-way valve with the flow path 234, but other arrangements are contemplated, including multiple two way valves formed with separate flow paths; multiple inlet ports or multiple outlet ports, or both multiple inlet ports and multiple outlet ports, the flow through which is controlled by selective communication through a single aperture such as the aperture 256, with such multiple ports being arranged, as desired, to form multiple flow paths between a single source and single destination, so that they function as a single two-way valve, or arranged, as desire, to form a 3-way, 4-way or other multiple-way valve; or other suitable arrangements. Similar multiple alternative arrangements for the spool valve main ports are also contemplated for the other embodiments described above and below.

The pilot microvalve output pressure $P_2$ is ported to the first end 254a of the spool 254 of the micro spool valve 212. Pressure in the first fluid passageway 234 between the main input port 220 and the main output port 222 of the micro spool valve 212 is communicated as a feedback reference pressure $P_R$ to the second end 254b of the spool 254 of the micro spool valve 212. The spool 254 will be in equilibrium when the two pressures $P_R$ and $P_2$ are equal.

From this, it can be shown that the spool 254 will be in equilibrium when the cross-sectional flow areas $A_1$, $A_2$ of the pilot input orifice 240a and the pilot output orifice 240b, respectively, are in the same proportion as the cross-sectional flow areas $A_3$, $A_4$ of the main input port 220 and the main output port 222, respectively, of the micro spool valve 212. This means that the micro spool valve 212 is following the motion of the pilot microvalve 240. If the pilot input orifice 240a begins to close, the main input port 220 will begin to close to maintain the proportion $A_3/A_4$ equal to the proportion $A_1/A_2$. As the pilot input orifice 240a opens, the main input port 220 will start to open and flow through the micro spool valve 212 will be permitted.

The net equivalent orifice size (cross-sectional flow area) $A_e$ of the pilot valve 240 is given by the is given by the following Equation 7:

$$Ae = \frac{A_1^2 A_2^2}{(A_1^2 + A_2^2)} \quad \text{Equation 7}$$

where $A_e$ is the area of an orifice which would have a cross-sectional flow area the equivalent to the net cross-sectional flow area of the third fluid passageway 245 in the pilot valve 240, through the pilot input and output orifices 240a, 240b; $A_1$ is the cross-sectional flow area through the pilot input orifice 240a; and $A_2$ is the cross-sectional flow area through the pilot output orifice 240b.

The largest value of the net equivalent orifice size $A_e$ of the pilot microvalve 240 is given when pilot microvalve 240 is moved to a position where the cross-sectional flow area $A_1$ through the pilot input orifice 240a is equal in size to the cross-sectional flow area $A_2$ through the pilot output orifice 240b.

Similarly, the net equivalent cross-sectional flow area $A_{es}$ of the micro spool valve 212 is given by the following Equation 8:

$$A_{es} = \frac{A_3^2 A_4^2}{(A_3^2 + A_4^2)} \quad \text{Equation 8}$$

where $A_{es}$ is the area of an orifice which would have a cross-sectional flow area equivalent to the net cross-sectional flow area of the first fluid passageway 234 in the micro spool valve 212, through the main input and output ports 220, 222; $A_3$ is the cross-sectional flow area through the main input port 220, and $A_4$ is the cross-sectional flow area through the main output port 222.

Thus, the maximum flow area available occurs when the micro spool valve 212 has traveled so that the cross-sectional flow areas $A_3$, $A_4$ through the main input and output ports 220, 222 of the micro spool valve 212 are equal. Thus, for the pilot microvalve 240 to operate the micro spool valve 212 at the largest flow capacity of the micro spool valve 212, the pilot microvalve 240 may use only the first half of travel between a first position in which the cross sectional area $A_3$ is zero (and the cross sectional area $A_4$ is at maximum) and a second position in which the cross sectional area $A_3$ is at maximum (and the cross sectional area $A_4$ is at zero). Both the first and second positions result in zero flow through the pilot microvalve 240, and, since the micro spool valve 212 is following the motion of the pilot microvalve 240, both the first and second positions result in zero flow through the micro spool valve 212. Thus, the pilot microvalve 240 is only opened until the cross-sectional flow areas $A_1$, $A_2$ of the pilot input and output orifices 240a, 240b are equal, at which point the greatest flow through the pilot microvalve 240 (and the micro spool valve 212) exists.

The pilot microvalve 240 may be used to regulate flow in a system in an approximate manner by varying the net equivalent cross-sectional flow area $A_{es}$ through the micro spool valve 212. If the supply pressure $P_1$ is closely regulated, the pilot microvalve 240 will cooperate with the micro spool valve 212 to control flow through the micro spool valve 212 in a precise manner. The precision of flow control by the microvalve device 210 may be directly related to the precision of control of the supply pressure $P_1$.

Figure 29:
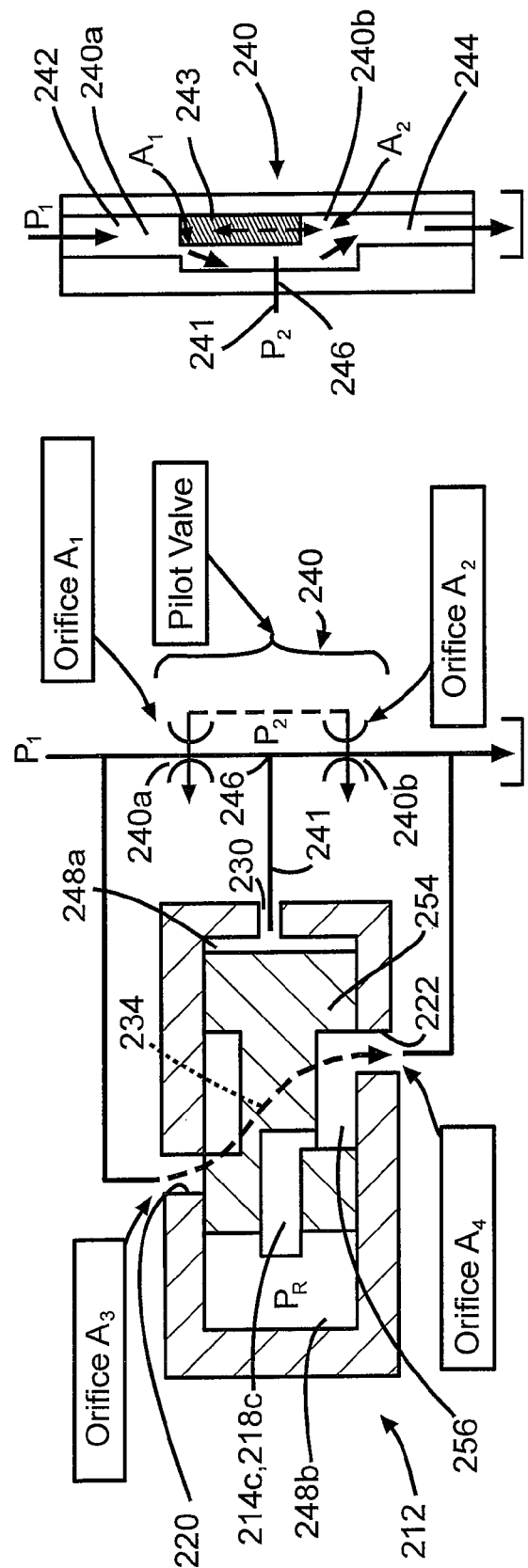
FIG. 29 is a diagrammatic representational view of the microvalve device in a closed position, with the pilot microvalve shown schematically.

As illustrated in FIGS. 29 and 29A, if the cross-sectional flow area $A_1$ of the pilot input orifice 240a is zero, that is, if the pilot input orifice 240a is closed, the pilot valve outlet pressure (command pressure $P_2$) will be low and reference pressure $P_R$ in the reference pressure volume 248b in the micro spool valve 212 will push the spool 254 to the right (i.e., when viewing FIG. 29), shutting off supply pressure $P_1$ until reference pressure $P_R$ is equivalent to the pilot valve outlet pressure (command pressure $P_2$). This closes off the flow path through the micro spool valve 212.

Figure 30:
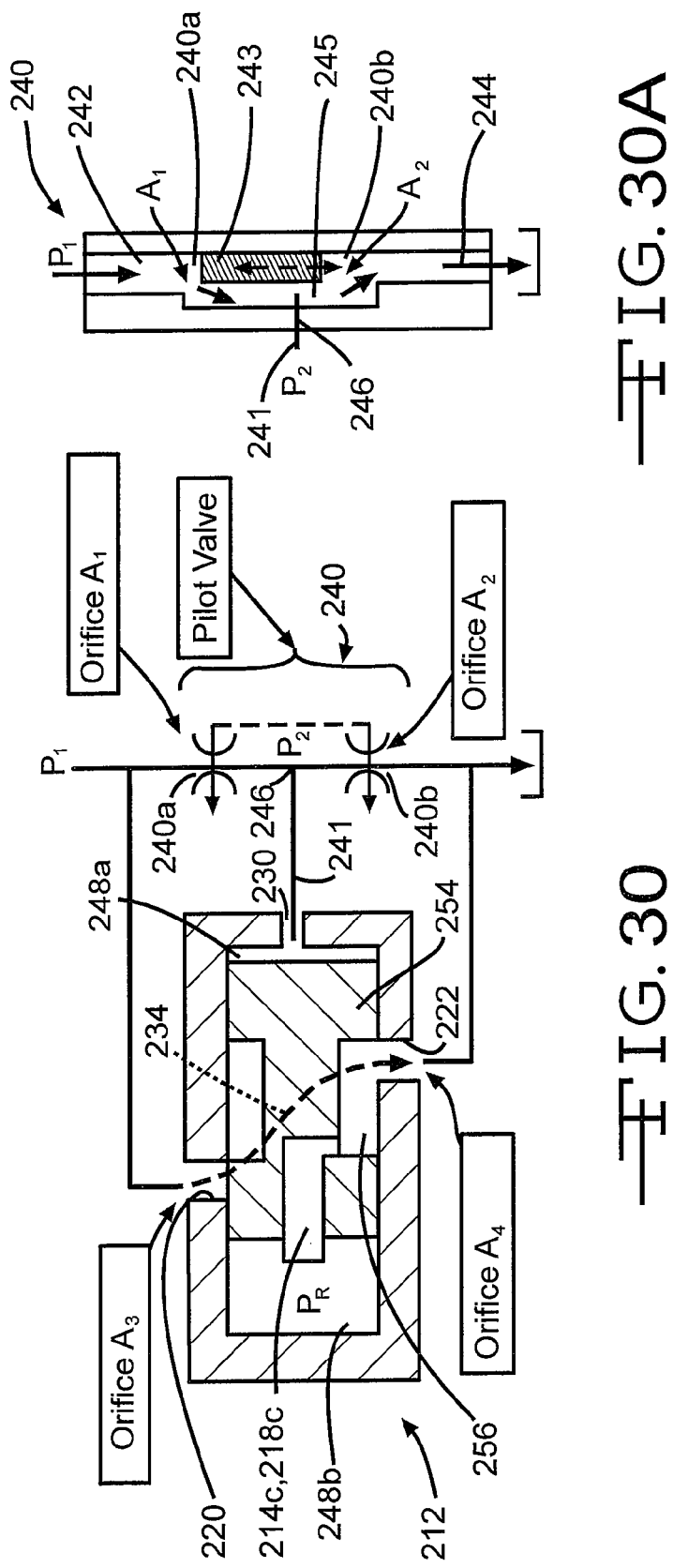
FIG. 30 is a diagrammatic representational view of the microvalve device in an opened position.

As illustrated in FIGS. 30 and 30A, when the pilot input orifice 240a opens, the cross-sectional flow area $A_1$ of the pilot input orifice 240a increases and the pilot valve outlet pressure $P_2$ increases. This causes the spool 254 to move to the left (i.e., when viewing FIG. 30), allowing supply pressure $P_1$ into the micro spool valve 212 until the reference pressure $P_R$ is equivalent to the pilot valve outlet pressure $P_2$. This will open the flow path in the micro spool valve 212. The pilot microvalve 240 will be operated to increase the cross-sectional flow area $A_1$ of the pilot input orifice 240a up to the point where the maximum equivalent orifice size $A_e$ of the pilot microvalve 240 is reached. The micro spool valve 212 will emulate the pilot microvalve 240 and increase the cross-sectional flow area $A_3$ of the main input port 220 until the maximum equivalent orifice size $A_e$ of the micro spool valve 212 is reached (i.e., until the first fluid passageway 234 is in it's least restrictive condition.

The relationships between the cross-sectional port flow areas $A_1$, $A_2$ and the system pressures $P_1$, $P_2$, can be expressed by the following mathematical Equations 9 and 10:

$$P_2 = \frac{P_1 A_1^2}{(A_1^2 + A_2^2)} \qquad \text{Equation 9}$$

where $P_2$ is the pilot microvalve output pressure (note that the pressure of the reference volume 248b will also be $P_2$ plus or minus the force exerted by the spring 266), $P_1$ is the supply pressure, $A_1$ is the cross-sectional flow area of the pilot input orifice 240a, and $A_2$ is the cross-sectional flow area of the pilot output orifice 240b, and $$P_2 = \frac{P_1 A_3^2}{(A_3^2 + A_4^2)} \qquad \text{Equation 10}$$

where $A_3$ is the cross-sectional flow area of the main input port 220 and $A_4$ is the cross-sectional flow area of the main output port 222.

The following Equations 11 and 12 are achieved by rearranging Equations 9 and 10, respectively.

$$\frac{A_2}{A_1} = \sqrt{\frac{P_1 - P_2}{P_2}} \qquad \text{Equation 11}$$

$$\frac{A_4}{A_3} = \sqrt{\frac{P_1 - P_2}{P_2}} \qquad \text{Equation 12}$$

By substitution, it will be seen that the ratio of the cross-sectional flow areas of the pilot input orifice 240a and the pilot output orifice 240b is equal to the ratio of the cross-sectional flow areas of the main input port 220 and the main output port 222, as expressed in the following Equation 13:

$$\frac{A_2}{A_1} = \frac{A_4}{A_3} \qquad \text{Equation 13}$$

Equation 13 shows that the ratio of the cross-sectional flow area $A_2$ of the pilot output orifice 240b to the cross-sectional flow area $A_1$ of the pilot input orifice 240a is equal to the ratio of the cross-sectional flow area $A_4$ of the main output port 222 to the cross-sectional flow area $A_3$ of the main input port 220. Note that rearranging Equation 13 gives Equation 14:

$$\frac{A_1}{A_2} = \frac{A_3}{A_4} \qquad \text{Equation 14}$$

Equation 14 is a restatement of the relationships shown in Equation 13, and shows that the ratio of the cross-sectional flow area $A_1$ of the pilot input orifice 240a to the cross-sectional flow area $A_2$ of the pilot output orifice 240b is equal to the ratio of the cross-sectional flow area $A_3$ of the main input port 220 to the cross-sectional flow area $A_4$ of the main output port 222. However the relationship is stated, either according to Equation 13 or according to Equation 14, a change in a ratio of the cross-sectional flow areas of the pilot microvalve orifices 240a, 240b will result in a change in the corresponding ratio of the cross-sectional flow areas of the pilot valve main ports 220, 222.

Figure 31:
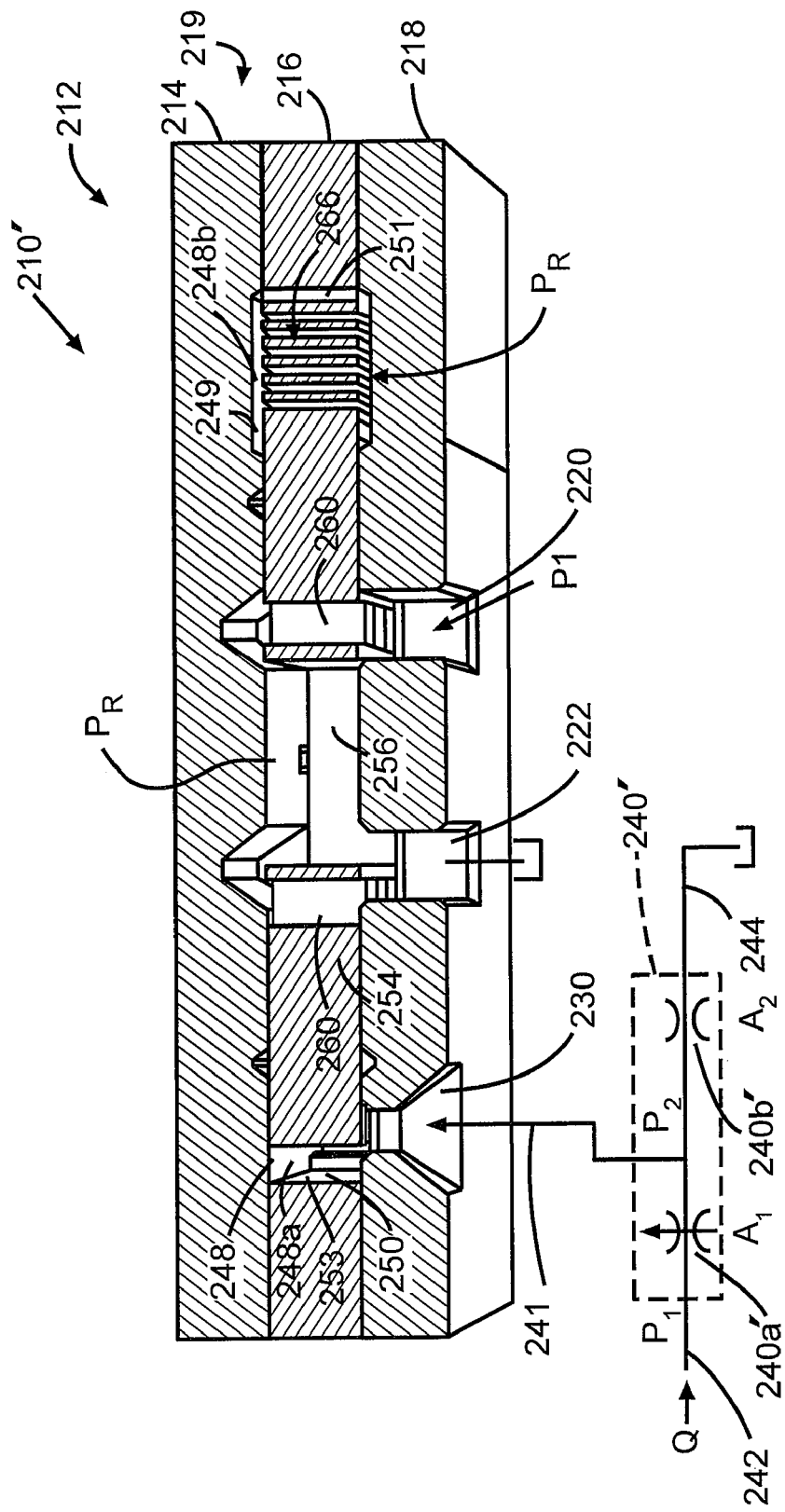
FIG. 31 is a partial perspective cross-section and partial schematic representation of a microvalve device having a pilot microvalve with a variable upstream orifice and a fixed downstream orifice.

Referring now to FIG. 31, an alternate embodiment of a microvalve device is illustrated, generally at 210'. The microvalve device 210' includes a micro spool valve 212 which may be similar to that discussed above. However, the micro spool valve 212 receives a command pressure $P_2$ from a pilot microvalve arrangement 240' in which a two-way valve is configured as normally closed upstream variable orifice 240a' (having cross-sectional flow area $A_1$), while downstream a fixed orifice 240b', having fixed cross-sectional flow area $A_2$, is provided. The command pressure $P_2$ is developed between the variable orifice 240a' and the fixed orifice 240b', and supplied to the command port 230 of the micro spool valve 212 via the second fluid passageway 241. The cross-sectional area of the net equivalent orifice size $A_e$ of the pilot microvalve arrangement 240' can be expressed by Equation 7 above, whether or not both the cross-sectional flow areas $A_1$, $A_2$ of the pilot input orifice 240a' and the pilot output orifice 240b', respectively are variable. Therefore, the pressure feedback mechanism in the micro spool valve 212 will adjust the cross-sectional flow areas $A_3$, $A_4$ of the main inlet and outlet ports 220, 222 of the micro spool valve 212 in accordance with Equations 13 and 14 above, that is, that the ratio of the cross-sectional flow area $A_2$ of the fixed orifice 240b' in the pilot microvalve arrangement 240' to the cross-sectional flow area $A_1$ will control the ratio of the cross-sectional flow area $A_4$ of the main output port 222 to the cross-sectional flow area $A_3$ of the main input port 220 of the micro spool valve 212.

Figure 32:
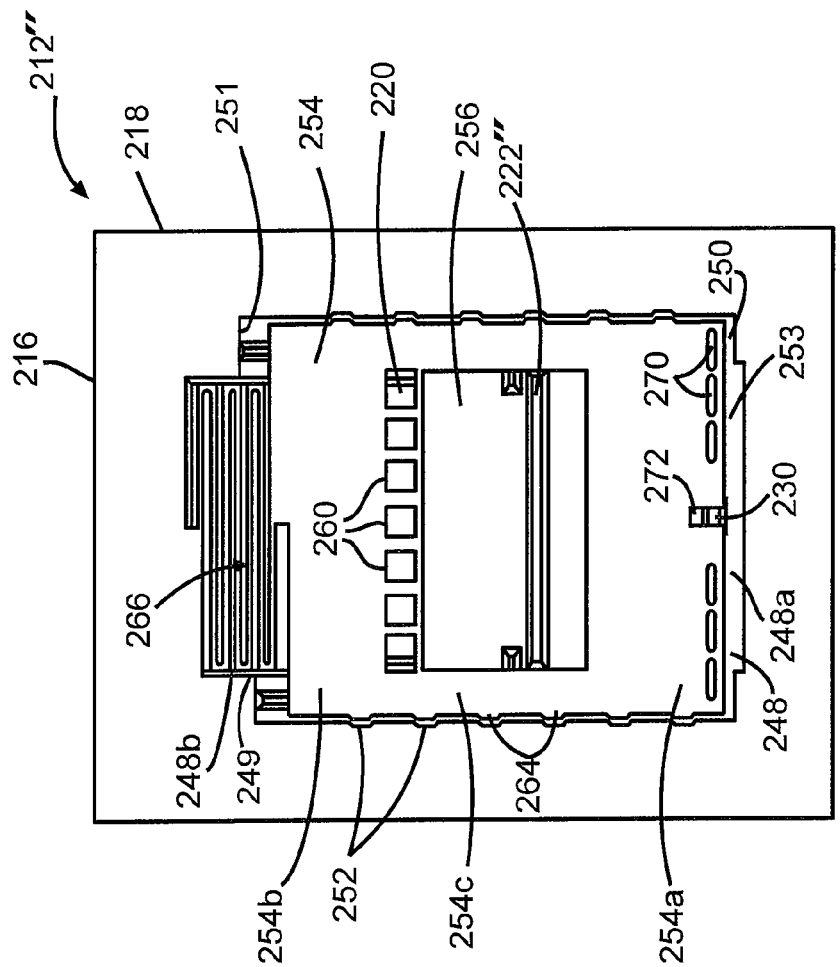
FIG. 32 is a diagrammatic representation of a micro spool valve with a normally closed variable inlet port and an open outlet port of fixed cross-sectional flow area.

Similarly, as seen in FIG. 32, a micro spool valve, indicated generally at 212" may be provided in another alternate embodiment of a microvalve device. The micro spool valve 212" is similar to the micro spool valve 212 described above in all respects, except that the main output port 222" is repositioned toward the second end 251 of the spool cavity 248 so that the main output port 222" remains fully in communication with the fluid flow aperture 256 in all positions of the spool 254. Thus, the cross-sectional flow area $A_4$ of the main output port 222" of the micro spool valve 212" is fixed in size. The net equivalent cross-sectional flow area $A_{es}$ of the micro spool valve 212" can be expressed by Equation 8 above, whether or not both the cross-sectional flow areas $A_3$, $A_4$ of the main input port 220 and the main output port 222" are variable. Therefore, the feedback mechanism provided by the position-dependent reference pressure $P_R$ in the micro spool valve 212 will adjust the opening of the main input port 220 as required to maintain the cross-sectional flow areas $A_3$, $A_4$ of the main inlet and outlet ports 220, 222 of the micro spool valve 212 in accordance with Equations 13 and 14 above. In other words, that the ratio of the cross-sectional flow area $A_2$ of the pilot output orifice 240b to the cross-sectional flow area $A_1$ of the pilot input orifice 240a of the will control the ratio of the cross-sectional flow area $A_4$ of the main output port 222 to the fixed cross-sectional flow area $A_3$ of the main input port 220 of the micro spool valve 212.

Figure 33:
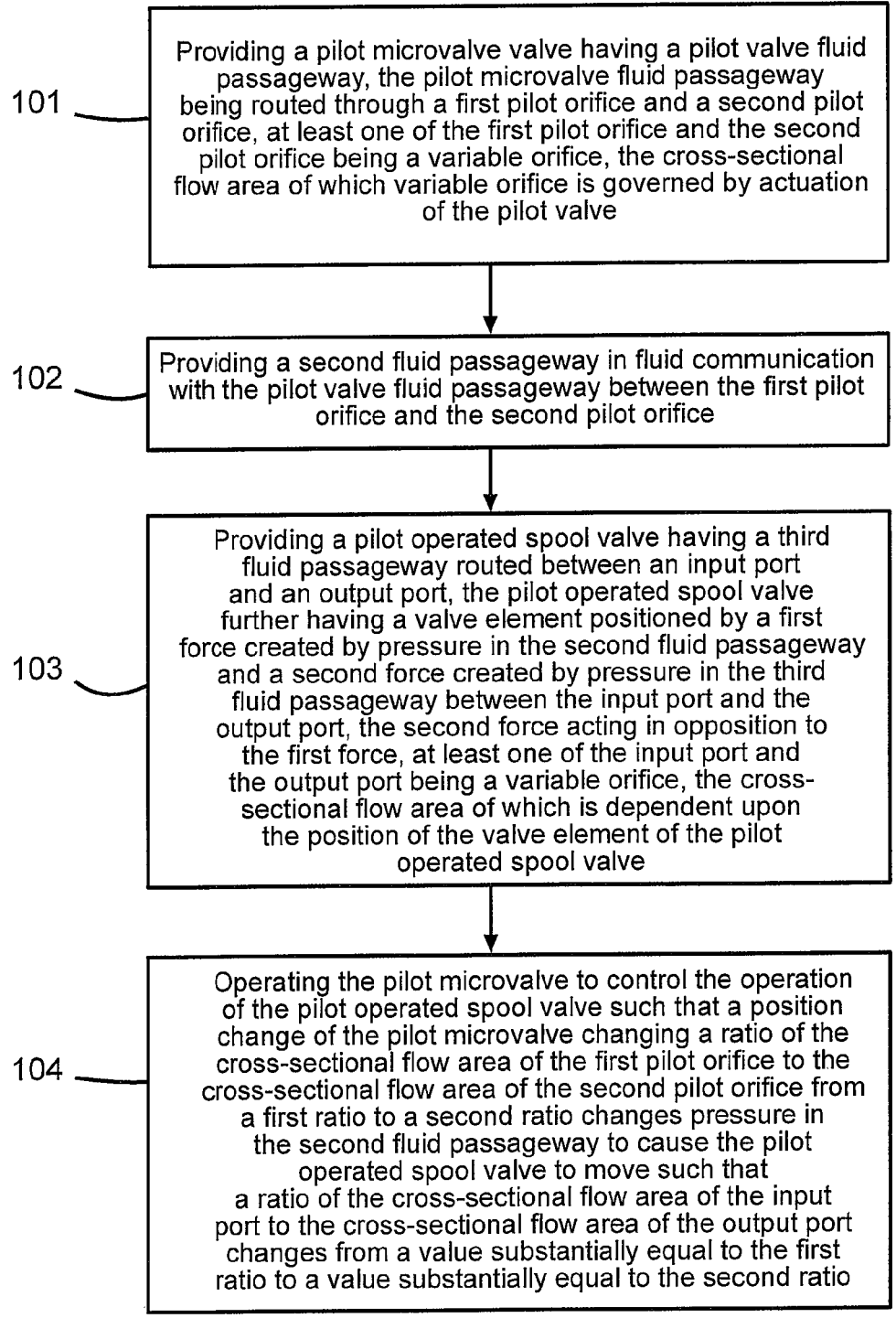
FIG. 33 is a flow chart illustrating a method of controlling the position of a spool of a spool valve.

FIG. 33 illustrates another aspect of the present invention, being a method of operating a microvalve device.

A first step 101 of the method includes providing a pilot microvalve valve, which may be, for example, a pilot microvalve such as the pilot microvalves 40, 240, or 240', or those illustrated in, and described with respect to FIGS. 34 through 37 below. The pilot microvalve has a pilot valve fluid passageway. The pilot microvalve fluid passageway is routed through a first pilot orifice and a second pilot orifice, at least one of the first pilot orifice and the second pilot orifice being a variable orifice, the cross-sectional flow area of which variable orifice is governed by actuation of the pilot valve. The other of the pilot orifice and the second pilot orifice may be a fixed or a variable orifice.

A second step 102 of the method includes providing a second fluid passageway in fluid communication with the pilot valve fluid passageway between the first pilot orifice and the second pilot orifice.

A third step 103 of the method includes providing a pilot operated spool valve having a third fluid passageway routed between an input port and an output port. The pilot operated spool valve may be, for example, the pilot operated micro spool valves 12, 212, or 212" described above, or the spool valves illustrated in, and described below with respect to, FIGS. 34 through 37. The pilot operated spool valve further has a valve element (such as the spools 54, and 254, or those illustrated in FIGS. 35 and 37, for example) positioned by a first force created by pressure in the second fluid passageway (a command pressure from between the orifices of the pilot microvalve) and a second force created by pressure (a reference pressure) in the third fluid passageway between the input port and the output port. The second force acts in opposition to the first force. At least one of the input port and the output port is a variable orifice, the cross sectional flow area of which is dependent upon the position of the valve element of the pilot operated spool valve. The other of the input port and the output port may be a variable orifice or a fixed orifice.

According to a fourth step 104, the method includes operating the pilot microvalve to control the operation of the pilot operated spool valve such that a position change of the pilot microvalve changing a ratio of the cross-sectional flow area of the first pilot orifice to the cross-sectional flow area of the second pilot orifice from a first ratio to a second ratio changes pressure in the second fluid passageway to cause the pilot operated spool valve to move such that a ratio of the cross-sectional flow area of the input port to the cross-sectional flow area of the output port changes from a value substantially equal to the first ratio to a value substantially equal to the second ratio. Thus, the pilot microvalve may be moved to change the cross-sectional flow area of at least one or both of the two orifices in the pilot microvalve in a manner that changes the ratio of the cross-sectional flow area of the first pilot orifice to the cross-sectional flow area of the second pilot orifice. When this occurs, the command pressure generated in the first fluid passageway and transmitted via the second fluid passageway to the pilot operated valve changes, upsetting the balance of forces between the first force and the second force on the valve element, causing the valve element to move to a position where the resultant change in the second force, generated by the position dependent reference pressure from the third passageway, restores the balance of forces, at which position, the resultant ratio of the cross-sectional flow area of the input port to the cross-sectional flow area of the output port is substantially equal to the ratio of the cross-sectional flow area of the first pilot orifice to the cross-sectional flow area of the second pilot orifice.

Thus, the method illustrated in FIG. 33 describes how to control the effective orifice size of a spool valve, with a flow path through the spool valve having two orifices in series, at least one of which is of variable area, by operating the pilot microvalve to vary the relative cross-sectional flow areas of two series orifices of the pilot microvalve.

Referring now to FIG. 34, there is shown in schematic form, a diagram of a microvalve device according to an aspect of the invention. It will be appreciated that the schematic diagram in FIG. 34 could be seen to illustrate the embodiments of the microvalve device 10 and 210 described above. However, the microvalve device shown in FIG. 34 will be described in particular with respect to a microvalve device, generally shown 310, shown in both FIGS. 34 and 35. The microvalve device 310 includes a standard sized (i.e., non-micromachined) pilot operated spool valve, indicated generally at 312, and a pilot microvalve indicated generally at 340.

Like the pilot microvalves 40 and 240 described above, the pilot valve 340 is preferably arranged such that actuation progressively opens a pilot input orifice 340a in communication with a pilot supply conduit 342 at a supply pressure $P_1$ while equally and oppositely closing a pilot output orifice 340*b* in fluid communication with a pilot dump fluid conduit 344. A pilot passageway 345 provides fluid communication between the pilot input orifice 340*a* and the pilot output orifice 340*b*, within which a command pressure $P_2$ is developed as fluid flows from the pilot supply conduit 342 through the pilot input orifice 340*a* and the pilot output orifice 340*b*, out of the pilot microvalve 340 to the pilot dump fluid conduit 344, to a destination device 336 such as a fluid reservoir, fluid accumulator, or any other suitable destination for a selectively controlled flow of pressurized fluid from the pilot microvalve 340. The command pressure $P_2$ developed is a function of the supply pressure $P_1$, the cross-sectional flow area $A_1$ of the pilot input orifice 340*a* and cross-sectional flow area $A_2$ of the pilot output orifice 340*b*. The command pressure $P_2$ is transmitted to the spool valve 312 by an interconnecting fluid passageway 341.

The spool valve 312 may have a body 319 defining a generally cylindrical bore 370 that may have an open end, indicated generally at 371, in an external surface of the body 319, and has a closed end 372. The open end 371 may be closed by a suitable plug 374. The plug 374 may be sealingly fixed in the open end by any suitable mechanism, such as welding, press fitting, rolling, or, as illustrated, held in place by a threaded region 376, and made leak-tight by a seal or o-ring 377. The plug 374 may define an internal passage 378, the purpose of which will be described below.

The bore 370 may be stepped, as illustrated, including having a shoulder 370*a*. A generally cylindrical sleeve 380 may have a first end 380*a* and a second end 380*b*. The sleeve 380 may be provided with a radially outwardly extending flange 382 at the first end 380*a* thereof. The flange 382 may be captured between the plug 374 and the shoulder 370*a*, to fix the position of the sleeve 380 within the bore 370. The sleeve 380 may have two spaced apart, circumferentially extending grooves formed in an outer surface thereof, including a first groove 384 adjacent the first end 380*a*, and a second groove 386 between the first groove 384 and a second end 380*b* of the sleeve 380. The sleeve 380 has a longitudinal bore 388 formed therethrough. One or more first radial ports 389 are formed through the sleeve 380, providing fluid communication between the longitudinal bore 388 and the first groove 384. One or more second radial ports 390 are formed through the sleeve 380, providing fluid communication between the longitudinal bore 388 and the second groove 386.

Circumferentially extending seals or o-rings 391 may provide fluid sealing between the outer surface of the sleeve 380 and the surface defining the bore 370 at three locations, that is, between the first groove 384 and the first end 380*a*, between the first groove 384 and the second groove 386, and between the second groove 386 and the second end 380*b* of the sleeve 380. The sleeve 380, the body 319, and the pair of o-rings 391 on either side of the second groove 386 cooperate to form a fluid inlet chamber 392 within the circumferentially extending second groove 386. The fluid inlet chamber 392 is connected via a supply fluid conduit (not shown in FIG. 35, but shown schematically in FIG. 34) at a supply pressure $P_1$. The sleeve 380, the body 319, and the pair of o-rings 391 on either side of the first groove 384 cooperate to form a fluid outlet chamber 393 within the circumferentially extending first groove 384. The fluid outlet chamber 393 is connected via a destination fluid conduit (not shown in FIG. 35, but shown schematically in FIG. 34) to a destination device 336 (which may be the same destination device 336 as is connected to the pilot dump fluid conduit 344) such as a fluid reservoir, fluid accumulator, or any other suitable destination for a selectively controlled flow of pressurized fluid from the micro spool valve 312.

A movable valve element in the form of a generally cylindrical spool 354 may be at least partially disposed in the longitudinal bore 388 of, and supported for relative movement by, the sleeve 380. The spool 354 has a first end 354*a* disposed near the first end 380*a* of the sleeve 380, and a second end 354*b* disposed near the second end 380*b* of the sleeve 380. The spool 354 may have two spaced apart, circumferentially extending grooves formed in an outer surface thereof, including a first groove 394 adjacent the first end 380*a*, and a second groove 395 between the first groove 394 and the second end 354*b* of the spool 354. The spool 354 has a longitudinal bore 396 formed therein, extending from an opening in the axial end face of the second end 354*b* of the spool 354, to a close end proximate the first groove 394. One or more first radial ports 397 are formed through the spool 354, providing fluid communication between the longitudinal bore 396 and the first groove 394. One or more second radial ports 398 are formed through the spool 354, providing fluid communication between the longitudinal bore 396 and the second groove 395. The ports 398 may be formed with relatively small cross-sectional flow areas, for a purpose which will be described below. Leakage of fluid between the spool 354 and the sleeve 380 could lead to pressure imbalances as a result of minute manufacturing differences, resulting in radial forces increasing friction. To help prevent this situation, additional narrow circumferential equalizing grooves 354*c* may be formed at various locations along the exterior surface of the spool 354, for the purposes of equalizing pressure on all sides of the spool.

The second radial port 390 through the sleeve 380 cooperates with the spool 354 to define a main input port 320 having a variable cross-sectional flow area $A_3$ for fluid flow from the fluid inlet chamber 392 into the second groove 395 of the spool 354. The first radial port 389 through the sleeve 380 cooperates with the spool 354 to define a main output port 322 having a variable cross-sectional flow area $A_4$ for fluid flow from the second groove 395 of the spool 354 into the fluid outlet chamber 393. Thus, a spool flow passageway 334 is defined in the spool valve 312 which extends from the variable area main input port 320, through the groove 395, and to the variable area main input port 322. As the spool 354 is moved, the cross-sectional flow area $A_3$ of the main input port 320 and the cross-sectional flow area $A_4$ of the main output port 322 change, and a ratio of the cross-sectional flow area $A_3$ to the cross-sectional flow area $A_4$ will change.

For example, as the spool 354 moves rightward (as seen in FIG. 35) the cross-sectional flow area $A_3$ will decrease as the spool 354 covers and blocks flow through an increasing amount of the second radial port 390 of the sleeve 380, while simultaneously, the cross-sectional flow area $A_4$ will increase as the groove 395 moves more directly radially inwardly of the first radial ports 389 of the sleeve 380, and the spool 354 uncovers an increasing amount of the first radial port 389 of the sleeve 380. Thus the ratio of $A_3$ to $A_4$ will change with position of the spool 354 (decrease), and the pressure existing in the groove 395, that is, in the spool flow passageway 334, will decrease as the spool flow passageway 334 is increasingly isolated from the relatively higher fluid pressure in the fluid inlet chamber 392, and increasingly coupled to the relatively lower fluid pressure in the fluid outlet chamber 393.

If the spool 354 is subsequently moved back leftward (as viewed in FIG. 35), the ratio of $A_3$ to $A_4$ will increase as the main inlet port 390 opens and the main outlet port 389 closes, causing the pressure in the spool flow passageway 334 to increase.

A first volume of fluid 348*a* at the command pressure $P_2$ is disposed between the first end 354*a* of the spool 354 and the plug 374. Pressure in the first volume of fluid 348a acts to urge the spool 354 to move toward the closed end 372 of the bore 370. The first volume of fluid 348 is in fluid communication with the pilot microvalve 340 via the interconnecting fluid passageway 341 as shown in FIG. 35. The internal passageway 378 of the plug 374 may be seen to define a portion of the interconnecting fluid passageway 341.

A second volume of fluid 348b at a reference pressure is disposed between the second end 354b of the spool 354 and the closed end 372 of the bore 370. Pressure in the second volume of fluid 348b acts to urge the spool 354 to move toward the plug 374, away from the closed end 372 of the bore 370. The second volume of fluid 348b is connected, via a reference passageway 328 consisting of the longitudinal bore 396 and the second radial port 398 in the spool 354. The reference passageway 328 transmits a reference pressure $P_R$ from the spool flow passageway 334 to the second volume of fluid 348b acting on the second end 354 of the spool 354. As indicated above, the port or ports 398 may be formed with a relatively small cross-sectional flow area, which may dampen pressure pulses (noise) in the groove 398, so that the reference pressure $P_R$ acting on the second end 354b of the spool 354 will be a dampened signal, with all the attendant benefits thereof.

A compression spring 366 may be disposed between the second end 354b of the spool 354 and the closed end 372 of the bore 370. The spring 366 urges the spool 354 toward a first position near the first end 380a of the spool 380. As in the other embodiments, it will normally be expected that the force of the spring 366 will be relatively small to insignificant compared to the pressure forces acting to position the spool 366 axially in the sleeve 380, and can normally be overlooked for the purposes of analyzing operation of the microvalve device 310, and in any case, the contribution of the spring to the balance of forces acting on the spool 380 will be readily understood by one of ordinary skill in the art. Note that the spool 354 is shown in FIG. 34 in a second position extending near the closed end of the bore 370, extending partially out of the second end 380b of the sleeve 380. The spool 354 is thus at an opposite end of travel from the first position to which the spring 366 urges the spool 354.

In operation, initially assume that the reference pressure $P_R$ is equal to the command pressure $P_2$ and thus the balance of forces acting on the axial ends of the spool 354 are balanced. The pilot microvalve 340 may be operated like the pilot microvalves 40 and 240 to generate a desired command pressure $P_2$ that is a function of the ratio of the cross-sectional flow area $A_1$ of the pilot input orifice 340a to the cross-sectional flow area $A_2$ of the pilot output orifice 340b. The command pressure $P_2$ is transmitted to the first volume of fluid 348a via the interconnecting fluid passageway 341. The second volume of fluid 348b is at the reference pressure $P_R$, the reference pressure $P_R$ being a function of the ratio of the cross-sectional flow area $A_3$ of the main input port 320 to the cross-sectional flow area $A_4$ of the main output port 322. For the sake of illustration, assume that the command pressure $P_2$ which was commanded is an increased command pressure $P_2$ which means that the ratio of the cross-sectional flow area $A_1$ of the pilot input orifice 340a to the cross-sectional flow area $A_2$ of the pilot output orifice 340b will have increased to cause the increased command pressure $P_2$. When the pressure of first volume of fluid 348a is raised by the increased command pressure $P_2$ from the pilot microvalve 340, initially, the reference pressure $P_R$ will be unchanged since the ratio of the cross-sectional flow area $A_3$ of the main input port 320 to the cross-sectional flow area $A_4$ of the main output port 322 is initially unchanged. The imbalance of forces on the spool 354 due to the unequal pressures of the first volume of fluid 348a and the second volume of fluid 348b will cause the spool 354 to move leftward (as viewed in FIG. 35, which illustrates the spool 354 after the leftward move has occurred). As the spool 354 moves leftward, the ratio of the cross-sectional flow area $A_3$ of the main input port 320 to the cross-sectional flow area $A_4$ of the main output port 322 will increase until it matches the ratio of the cross-sectional flow area $A_1$ of the pilot input orifice 340a to the cross-sectional flow area $A_2$ of the pilot output orifice 340b, at which point the reference pressure $P_R$ will have increased to match the command pressure $P_2$, and the spool 354 will cease moving.

Operating the pilot microvalve 340 to decrease the ratio of the cross-sectional flow area $A_1$ of the pilot input orifice 340a to the cross-sectional flow area $A_2$ of the pilot output orifice 340b, will cause a decrease in command pressure $P_2$ leading to the spool 354 to move (rightward as seen in FIG. 35) until the ratio of the cross-sectional flow area $A_3$ of the main input port 320 to the cross-sectional flow area $A_4$ of the main output port 322 decreases to match the ratio of the cross-sectional flow area $A_1$ of the pilot input orifice 340a to the cross-sectional flow area $A_2$ of the pilot output orifice 340b, at which point the reference pressure $P_R$ will have decreased to match the command pressure $P_2$, and the spool 354 will cease moving.

Note that during operation, reference pressure $P_R$ is communicated to the first groove 394 of the spool 354, via the longitudinal bore 396 and the first radial ports 397 formed in the spool 354. Reference pressure $P_R$ will be generally equal to command pressure $P_2$ except briefly during transient conditions while to spool 354 is moving to a position where reference pressure $P_R$ does equal command pressure $P_2$ Even during such transient conditions, it is expected that in most applications, reference pressure $P_R$ will generally not be greatly different from command pressure $P_2$. Accordingly, with the pressure in the first radial groove 394 being equal to, or nearly equal to, the command pressure $P_2$ in the first volume of fluid 348a, there should be little or no difference in pressure to drive leakage from the first volume of fluid 348a axially along the spool 354 between the sleeve 380 and the spool 354. This arrangement facilitates controlling the a relatively large spool valve 312 with a substantially smaller pilot microvalve 340 in the manner described above, since the pilot microvalve 340 will not have a substantial flow of (leakage) fluid through the interconnecting fluid passageway 341. Otherwise, if there were substantial leakage from the first volume of fluid 348a, the pilot input orifice 340a would be feeding two downstream fluid flow paths (normal flow through the pilot output orifice 340b and leakage flow through the interconnecting fluid passageway). Since the spool flow passageway 384 would not have any corresponding substantial leakage path, the ability of the spool valve 354 to move such that the ratio of the cross-sectional flow area $A_3$ of the main input port 320 to the cross-sectional flow area $A_4$ of the main output port 322 would follow the ratio of the cross-sectional flow area $A_1$ of the pilot input orifice 340a to the cross-sectional flow area $A_2$ of the pilot output orifice 340b might be impaired.

Figures 36, 37:
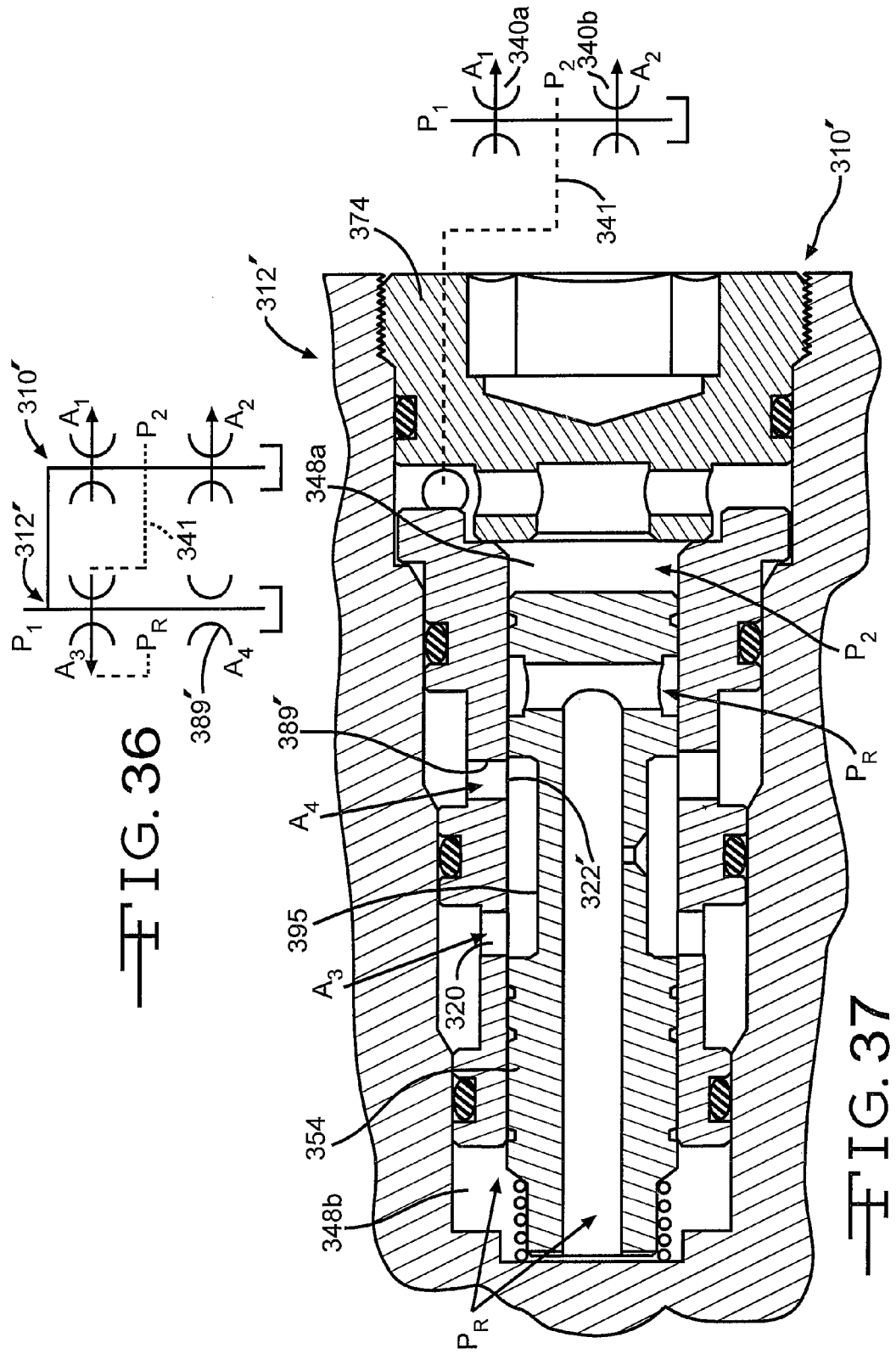
FIG. 36 is a schematic view of a microvalve device in accordance with another embodiment of the present invention.
FIG. 37 is a partial cross-section and partial schematic representation of the microvalve device in FIG. 36, including a macro spool valve having a pilot microvalve with one variable orifice and one fixed orifice.

FIGS. 36 and 37 illustrate a microvalve device 310' which is an alternate embodiment of the microvalve device 310 shown and described with respect to FIGS. 34 and 37. The microvalve device 310' is generally identical in structure and function to the microvalve device 310, with the sole exception of one or more first radial ports 289', which are smaller than the first radial ports 389 of the microvalve device 310. As the other components are identical, the reference numbers used to identify features of the microvalve device 310 will be used to identify corresponding features of the microvalve device 310'. The first radial ports 389' are sufficiently small that there is no axial position that the spool 354 can be moved in which the cross-sectional flow area $A_4$ of a main output port 322' between the second groove 395 and the radial ports 289' will be changed. Moving the spool 354 from the second position thereof, illustrated in FIG. 37, toward the first position thereof (i.e., toward the plug 374) only brings the second groove 395 to a more axially centered position radially inward of the first radial ports 389' of the, and no land adjacent the second groove 395 is brought into position to block the first radial ports 389'. Thus the main output port 322', unlike the main output port 322, is a fixed orifice.

Nevertheless, in operation, the spool valve 312' of the microvalve device 310' operates in the same manner as the spool valve 312 of the microvalve device 310. For example, assume that the command pressure $P_2$ is increased from a previously steady-state value equal to the reference pressure $P_R$. This means that the ratio of the cross-sectional flow area $A_1$ of the pilot input orifice 340a to the cross-sectional flow area $A_2$ of the pilot output orifice 340b will have increased to cause the increased command pressure $P_2$. When the pressure of first volume of fluid 348a is raised by the increased command pressure $P_2$ from the pilot microvalve 340, initially, the reference pressure $P_R$ will be unchanged since the ratio of the cross-sectional flow area $A_3$ of the main input port 320 to the cross-sectional flow area $A_4$ of the main output port 322' is initially unchanged. The imbalance of forces on the spool 354 due to the unequal pressures of the first volume of fluid 348a and the second volume of fluid 348b will cause the spool 354 to move leftward (as viewed in FIG. 37, which illustrates the spool 354 after the leftward move has occurred). As the spool 354 moves leftward, the ratio of the cross-sectional flow area $A_3$ of the main input port 320 to the fixed cross-sectional flow area $A_4$ of the main output port 322' will increase until the ratio matches the ratio of the cross-sectional flow area $A_1$ of the pilot input orifice 340a to the cross-sectional flow area $A_2$ of the pilot output orifice 340b, at which point the reference pressure $P_R$ will have increased to match the command pressure $P_2$, and the spool 354 will cease moving.

It should be appreciated that many other embodiments of a microvalve device embodying aspects of my invention should now be apparent in light of this disclosure. For example, it is contemplated that one such embodiment would be a microvalve device, including a pilot microvalve, which may be similar to those described above, and a standard sized (i.e., non-micromachined) spool valve. A command pressure generated between series orifices, at least one of which had a variable cross-sectional flow area, of the microvalve could be conveyed to the spool valve via an interconnecting fluid passageway so as to exert an axial force on an end of a spool of the spool valve. Like the spool valves 312 and 312', such a spool valve might have a spool flow passageway similar to the spool flow passageway 384, the spool flow passageway extending between a main input port and a main output port, at least one of which having a variable cross-sectional flow area, so as to generate a reference pressure dependent upon the position of the spool. The reference pressure could be conveyed by a reference passageway so as to exert an axial force on a second end of the spool of the spool valve such that the spool valve would operate similar to the spool valves 312 and 312', with the ratio of main input to main output port flow cross-sectional areas being controlled by controlling the ratio of the pilot microvalve pilot input to pilot output orifice flow cross-sectional areas.

However, unlike the spool valves 312 and 312', it is contemplated that such a spool valve could be provided with additional spool flow passageways between additional sets of fluid ports, with the spool moving (under the control of the pilot microvalve) relative to these additional sets of fluid ports to simultaneously control flow through these additional spool flow passageways. Preferably, such additional spool flow passageways would not be connected to the reference passageway, and the fluid pressures in such additional spool flow passageway would not influence the movement of the spool. It is also contemplated that multiple two way valves could be formed by multiple separate flow paths. Also contemplated are multiple inlet ports or multiple outlet ports, or both multiple inlet ports and multiple outlet ports, the flow through which is controlled by selective communication through a single spool flow passageway defined by a groove in the spool, with such multiple ports being arranged, as desired, to form multiple flow paths between a single source and single destination, so that they function as a single two-way valve, or arranged, as desire, to form a 3-way, 4-way or other multiple-way valves.

It should now further be appreciated in light of the disclosures associated with at least FIGS. 3, 21, 31, 32, and 34 through 37, that an aspect of the invention contemplates a microvalve device that includes a spool valve, which spool valve has an first opening and a second opening, a passage connecting the first opening to the second opening, and a spool which is movable to selectively vary a cross-sectional flow area of at least the first opening. The second opening may be a fixed orifice (that is, an opening whose cross-sectional flow area does not vary), or a variable orifice (that is, an opening whose cross-sectional flow area varies as the spool moves). According to another aspect of the invention, the microvalve device may also include a pilot microvalve may be used to operate the spool valve. The pilot microvalve may have a first opening and a second opening, a passage connecting the first opening to the second opening. The cross-sectional flow area of at least the first opening of the pilot microvalve may be varied when operating the pilot microvalve. The second opening of the pilot microvalve may be a fixed orifice (that is, an opening whose cross-sectional flow area does not vary), or a variable orifice (that is, an opening whose cross-sectional flow area varies as the pilot microvalve is operated). Either type of pilot microvalve (whether the second opening of the pilot microvalve is fixed or variable) may be used to operate either type of spool valve (whether the second opening of the spool valve is fixed or variable), and regardless of whether the spool valve is a microvalve, or a standard sized (i.e., non-micromachined) valve.

In summary, in at least one aspect the invention relates to a microvalve device for controlling fluid flow, including a body defining a chamber having first and second ends The body has an input port for fluid communication into the chamber and an output port for fluid communication out of the chamber. The microvalve device also includes a micromachined spool valve having first and second ends disposed in the chamber for sliding movement between a first position which allows fluid flow from the input port to the output port, and a second position which restricts fluid flow the input port to the output port. The spool valve is positioned by differential pressure across the spool valve between a first volume of fluid at a control pressure disposed between the first valve end and the first end of the chamber and a second volume of fluid at a reference pressure disposed between the second valve end and the second end of the chamber, wherein the reference pressure is changed by changing the position of the spool valve.

According to another aspect, this invention also relates to a normally open microvalve device including a body defining a spool cavity having a first end and a second end, a input port communicating with the spool cavity, an output port, a command port adapted to receive a command pressure signal, a reference inlet port adapted to be connected to a source of fluid at a first pressure, and a reference outlet port adapted to be connected to a region of fluid at a second pressure, less than the first pressure. The microvalve device also includes a spool having a command side and a reference side disposed in the spool cavity with the command side next to the first end of the spool cavity. The command end cooperates with the body to define a variable sized command volume between the command side and the first end of the spool cavity. The command volume is in continuous fluid communication with the command port. The reference side of the spool cooperates with the body to define a variable sized reference volume between the reference side of the spool and the second end of the spool cavity. The spool is movable between a first position adjacent the first end of the spool cavity and a second position adjacent the second end of the spool cavity while preventing substantial fluid leakage flow through the spool cavity between the command volume and the reference volume. The spool permits fluid communication between the input port and the output port when the spool is in the first position, and blocks fluid communication between the input port and the output port when the spool is in the second position. The spool progressively decreases fluid communication between the reference outlet port and the reference volume and progressively increases fluid communication between the reference inlet port and the reference volume as the spool is moved from the first position thereof toward the second position thereof, thus causing pressure to rise in the reference volume as the spool is moved from the first position toward the second position thereof. The spool is moved by a difference in pressures between the command volume and the reference volume.

Another aspect of this invention relates to a normally closed microvalve device including a body defining a spool cavity having a first end and a second end, an input port communicating with the spool cavity, an output port, a command port adapted to receive a command pressure signal, a reference inlet port adapted to be connected to a source of fluid at a first pressure, and a reference outlet port adapted to be connected to a region of fluid at a second pressure, less than the first pressure. The microvalve device also includes a spool having a command side and a reference side disposed in the spool cavity with the command side next to the first end of the spool cavity. The command end cooperates with the body to define a variable sized command volume between the command side and the first end of the spool cavity. The command volume is in continuous fluid communication with the command port. The reference side of the spool cooperates with the body to define a variable sized reference volume between the reference side of the spool and the second end of the spool cavity. The spool is movable between a first position adjacent the first end of the spool cavity and a second position adjacent the second end of the spool cavity while preventing substantial fluid leakage flow through the spool cavity between the command volume and the reference volume. The spool prevents fluid communication between the input port and the output port when the spool is in the first position, and permits fluid communication between the input port and the output port when the spool is in the second position. The spool progressively decreases fluid communication between the reference outlet port and the reference volume and progressively increases fluid communication between the reference inlet port and the reference volume as the spool is moved from the first position thereof toward the second position thereof, thus causing pressure to rise in the reference volume as the spool is moved from the first position toward the second position thereof. The spool is moved by a difference in pressures between the command volume and the reference volume.

In at least one aspect, the invention relates to a microvalve device for controlling fluid flow, including a body defining a chamber having first and second ends The body has an input port for fluid communication into the chamber and an output port for fluid communication out of the chamber. The microvalve device also includes a micromachined spool valve having first and second ends disposed in the chamber for sliding movement between a first position which allows fluid flow from the input port to the output port, and a second position which restricts fluid flow the input port to the output port. The spool valve is positioned by differential pressure across the spool valve between a first volume of fluid at a control pressure disposed between the first valve end and the first end of the chamber and a second volume of fluid at a reference pressure disposed between the second valve end and the second end of the chamber, wherein the reference pressure is changed by changing the position of the spool valve.

According to another aspect, this invention also relates to a normally open microvalve device including a body defining a spool cavity having a first end and a second end, an input port communicating with the spool cavity, an output port, a command port adapted to receive a command pressure signal, a reference inlet port adapted to be connected to a source of fluid at a first pressure, and a reference outlet port adapted to be connected to a region of fluid at a second pressure, less than the first pressure. The microvalve device also includes a spool having a command side and a reference side disposed in the spool cavity with the command side next to the first end of the spool cavity. The command end cooperates with the body to define a variable sized command volume between the command side and the first end of the spool cavity. The command volume is in continuous fluid communication with the command port. The reference side of the spool cooperates with the body to define a variable sized reference volume between the reference side of the spool and the second end of the spool cavity. The spool is movable between a first position adjacent the first end of the spool cavity and a second position adjacent the second end of the spool cavity while preventing substantial fluid leakage flow through the spool cavity between the command volume and the reference volume. The spool permits fluid communication between the input port and the output port when the spool is in the first position, and blocks fluid communication between the input port and the output port when the spool is in the second position. The spool progressively decreases fluid communication between the reference outlet port and the reference volume and progressively increases fluid communication between the reference inlet port and the reference volume as the spool is moved from the first position thereof toward the second position thereof, thus causing pressure to rise in the reference volume as the spool is moved from the first position toward the second position thereof. The spool is moved by a difference in pressures between the command volume and the reference volume.

According to another aspect, this invention also relates to a normally closed microvalve device including a body defining a spool cavity having a first end and a second end, an input port communicating with the spool cavity, an output port, a command port adapted to receive a command pressure signal, a reference inlet port adapted to be connected to a source of fluid at a first pressure, and a reference outlet port adapted to be connected to a region of fluid at a second pressure, less than the first pressure. The microvalve device also includes a spool having a command side and a reference side disposed in the spool cavity with the command side being next to the first end of the spool cavity. The command end cooperates with the body to define a variable sized command volume between the command side and the first end of the spool cavity. The command volume is in continuous fluid communication with the command port. The reference side of the spool cooperates with the body to define a variable sized reference volume between the reference side of the spool and the second end of the spool cavity. The spool is movable between a first position adjacent the first end of the spool cavity and a second position adjacent the second end of the spool cavity while preventing substantial fluid leakage flow through the spool cavity between the command volume and the reference volume. The spool prevents fluid communication between the input port and the output port when the spool is in the first position, and permits fluid communication between the input port and the output port when the spool is in the second position. The spool progressively decreases fluid communication between the reference outlet port and the reference volume and progressively increases fluid communication between the reference inlet port and the reference volume as the spool is moved from the first position thereof toward the second position thereof, thus causing pressure to rise in the reference volume as the spool is moved from the first position toward the second position thereof. The spool is moved by a difference in pressures between the command volume and the reference volume.

Another aspect of the invention also relates to a microvalve device comprising a pilot microvalve, including a pilot input orifice; a pilot output orifice, at least one of the pilot input orifice and the pilot output orifice having a cross-section flow area that changes as the pilot microvalve is actuated; and a passageway providing fluid communication between the pilot input orifice and the pilot output orifice. The microvalve device, according to this aspect, also comprises a pilot operated spool valve, including a spool having a surface in fluid communication with the passageway; a spool input port; and a spool output port, at least one of the spool input port and the spool output port having a cross-section flow area that changes as the spool is actuated, the spool valve being operable by the pilot microvalve such that a ratio of the cross-sectional flow area of the spool input port to the spool output port will substantially equal to a ratio of the cross-sectional flow area of the pilot input orifice to the pilot output orifice.

According to another aspect of the invention, the invention relates to a microvalve device including a pilot microvalve, and a pilot operated spool valve, the spool valve being a microvalve.

According to another aspect of the invention, the invention relates to a microvalve device including a pilot microvalve, and a pilot operated spool valve, the spool valve being a microvalve, the spool valve including a body and a micromachined spool, the body defining a micromachined chamber having first and second ends; a spool input port for fluid communication into the chamber; and a spool output port for fluid communication out of the chamber. The micromachined spool may have first and second ends disposed in the chamber for sliding movement between a first position which allows fluid flow from the spool input port to the spool output port and a second position which restricts fluid flow the spool input port to the spool output port the spool being positioned by differential pressure across the spool between a first volume of fluid at a control pressure disposed between the first end of the spool and the first end of the chamber and a second volume of fluid at a reference pressure disposed between the second end of the spool and the second end of the chamber, the reference pressure being changed by changing the position of the spool valve, the first volume of fluid being in fluid communication with a passageway in the pilot microvalve, the surface of the spool in fluid communication with the passageway of the pilot microvalve being on the first end of the spool.

According to another aspect of the invention, the invention relates to a microvalve device including a pilot microvalve, and a pilot operated spool valve, the spool valve being a microvalve, the spool valve having a spool main input port and a spool main output port, at least one of the spool main input port and the spool main output port having a cross-section flow area that changes as the spool is actuated to vary fluid communication through a spool valve passageway defined through the spool valve between the spool main input port and the spool main output port, the spool valve passageway being in fluid communication with a volume of fluid acting on one end of the spool to supply the volume of fluid with fluid at a reference pressure.

According to another aspect of the invention, the invention relates to a microvalve device including a pilot microvalve, and a pilot operated spool valve, the spool valve being a microvalve, the spool valve having a spool main input port and a spool main output port, at least one of the spool main input port and the spool main output port having a cross-section flow area that changes as the spool is actuated to vary fluid communication through a spool valve passageway defined through the spool valve between the spool main input port and the spool main output port, the spool valve further having a reference inlet port in fluid communication with a volume of fluid acting on one end of the spool and a reference outlet port in fluid communication with the volume of fluid, at least one of the reference inlet port and the reference inlet port having a cross-section flow area that changes as the spool is actuated to vary fluid communication through the spool valve between the reference inlet port and the reference outlet port.

An aspect of the invention also relates to a microvalve device which includes a body, the body including a plate, the plate defining a chamber, and wherein a spool movably disposed in the chamber is integrally formed with the plate.

An aspect of the invention also relates to a micromachined spool valve being formed of a semiconductor material.

Another aspect of the invention relates to a microvalve device that may comprise a pilot microvalve, including a pilot input orifice; a pilot output orifice, at least one of the pilot input orifice and the pilot output orifice having a cross-section flow area that changes as the pilot microvalve is actuated; and a passageway providing fluid communication between the pilot input orifice and the pilot output orifice. The microvalve device, according to this aspect, may also comprise a standard size (that is, non-micromachined) pilot operated spool valve, including a spool having a surface in fluid communication with the passageway; a spool input port; and a spool output port, at least one of the spool input port and the spool output port having a cross-section flow area that changes as the spool is actuated, the spool valve being operable by the pilot microvalve such that a ratio of the cross-sectional flow area of the spool input port to the spool output port will substantially equal to a ratio of the cross-sectional flow area of the pilot input orifice to the pilot output orifice. According to an additional aspect of the invention, the spool valve may include a body, defining: a chamber having first and second ends; the spool input port for fluid communication into the chamber; and the spool output port for fluid communication out of the chamber; the spool having first and second ends disposed in the chamber for sliding movement between a first position which allows fluid flow from the spool input port to the spool output port and a second position which restricts fluid flow the spool input port to the spool output port, the spool being positioned by differential pressure across the spool between a first volume of fluid at a control pressure disposed between the first end of the spool and the first end of the chamber and a second volume of fluid at a reference pressure disposed between the second end of the spool and the second end of the chamber, the reference pressure being changed by changing the position of the spool valve, the first volume of fluid being in fluid communication with the passageway in the pilot microvalve, the surface of the spool in fluid communication with the passageway of the pilot microvalve being on the first end of the spool.

Another aspect of the invention relates to a microvalve device with a standard size pilot operated spool valve (i.e., not a micro spool valve) and a pilot microvalve supplying fluid at a command pressure to a first volume of fluid, in which the spool valve has a spool that has a first end upon which the first volume of fluid exerts a force to urge the spool to move in a first direction, at least one of a spool input port and a spool output port have a cross-section flow area that changes as the spool is actuated to vary fluid communication through a spool valve passageway defined through the spool valve between the spool input port and the spool output port, the spool valve passageway being in fluid communication with a second volume of fluid to supply the second volume of fluid with fluid at a reference pressure that exerts a force on a second end of the spool to urge the spool to move in a second direction opposite the first direction. According to another aspect of the invention, the spool valve passageway may be formed in part by a groove defined in an exterior surface of the spool at an axial location intermediate the first end and the second end of the spool; and the spool may define an internal passageway providing fluid communication between the spool valve passageway and the second volume of fluid. According to another aspect of the invention the axial location intermediate the first end of the spool and the second end of the spool is a first axial location, and the spool may define a second groove in the exterior surface thereof at a second axial location between the first axial location and the first end of the spool, which second groove may be in fluid communication with the internal passageway of the spool. According to an additional aspect of the invention the second groove may extend circumferentially about the spool. According to additional aspects of the invention, the spool may move to vary the cross-section flow area between the groove and at least one of the spool input port and the spool output port, and may simultaneously vary cross-sectional flow areas between the groove and both the spool input port and the spool output port.

Another aspect of the invention also relates to a microvalve device comprising a pilot microvalve, including a pilot input orifice; a pilot output orifice, the pilot input orifice having a cross-section flow area that changes as the pilot microvalve is actuated, the cross-sectional flow area of the pilot output orifice remaining constant in all positions of the pilot microvalve; and a passageway providing fluid communication between the pilot input orifice and the pilot output orifice. The microvalve device, according to this aspect, also comprises a pilot operated spool valve, including a spool having a surface in fluid communication with the passageway; a spool input port; and a spool output port, at least one of the spool input port and the spool output port having a cross-section flow area that changes as the spool is actuated, the spool valve being operable by the pilot microvalve such that a ratio of the cross-sectional flow area of the spool input port to the spool output port will substantially equal to a ratio of the cross-sectional flow area of the pilot input orifice to the pilot output orifice, wherein the at least one of the pilot input orifice and the pilot output orifice may have a cross-section flow area that changes as the pilot microvalve is actuated is the pilot input orifice.

Another aspect of the invention also relates to a microvalve device comprising a pilot microvalve, including a pilot input orifice; a pilot output orifice, at least one of the pilot input orifice and the pilot output orifice having a cross-section flow area that changes as the pilot microvalve is actuated; and a passageway providing fluid communication between the pilot input orifice and the pilot output orifice. The microvalve device, according to this aspect, also comprises a pilot operated spool valve, including a spool having a surface in fluid communication with the passageway; a spool input port; and a spool output port, at least one of the spool input port and the spool output port having a cross-section flow area that changes as the spool is actuated, the spool valve being operable by the pilot microvalve such that a ratio of the cross-sectional flow area of the spool input port to the spool output port will substantially equal to a ratio of the cross-sectional flow area of the pilot input orifice to the pilot output orifice, wherein both the pilot input orifice and the pilot output orifice may have a cross-section flow area that changes as the pilot microvalve is actuated is the pilot input orifice, the cross-sectional flow area of the pilot output orifice varying inversely to the cross-sectional flow area of the pilot input orifice. According to an additional aspect, the pilot microvalve may include a single valve element that is selectively movable to vary the cross-sectional flow area of both the pilot input orifice and the pilot output orifice.

The invention also relates to a method of operating a microvalve device, including, as a first step, providing a pilot microvalve valve having a pilot valve fluid passageway, the pilot microvalve fluid passageway being routed through a first pilot orifice and a second pilot orifice, at least one of the first pilot orifice and the second pilot orifice being a variable orifice, the cross-sectional flow area of which variable orifice is governed by actuation of the pilot valve; as a second step, providing a second fluid passageway in fluid communication with the pilot valve fluid passageway between the first pilot orifice and the second pilot orifice; as a third step, providing a pilot operated spool valve having a third fluid passageway routed between an input port and an output port, the pilot operated spool valve further having a valve element positioned by a first force created by pressure in the second fluid passageway and a second force created by pressure in the third fluid passageway between the input port and the output port, the second force acting in opposition to the first force, at least one of the input port and the output port being a variable orifice, the cross-sectional flow area of which is dependent upon the position of the valve element of the pilot operated spool valve; and as a fourth step, operating the pilot microvalve to control the operation of the pilot operated spool valve such that a position change of the pilot microvalve changing a ratio of the cross-sectional flow area of the first pilot orifice to the cross-sectional flow area of the second pilot orifice from a first ratio to a second ratio changes pressure in the second fluid passageway to cause the pilot operated spool valve to move such that a ratio of the cross-sectional flow area of the input port to the cross-sectional flow area of the output port changes from a value substantially equal to the first ratio to a value substantially equal to the second ratio.

Another aspect of the invention relates to a microvalve device, comprising a pilot microvalve, including a first fluid passageway, a first orifice in said fluid passageway, a second orifice in said fluid passageway, at least one of said first orifice and said second orifice being a variable orifice; and a second fluid passageway in fluid communication with said first fluid passageway between said first orifice and said second orifice; and a pilot operated valve, including a body defining an inlet port, an outlet port, a third fluid passageway between said inlet port and said outlet port, and a control port in fluid communication with said second fluid passageway of said pilot microvalve, and a spool modulating flow through said third fluid passageway, said spool being positioned at least in part by a difference in fluid pressure between said control port and said third fluid passageway, said difference in pressure between said control port and said third fluid passageway tending to drive said spool to a position where said difference in fluid pressure between said control port and said third fluid passageway is minimized.

While the principle and mode of operation of this invention have been explained and illustrated with regards to particular embodiments, it must, however, be understood that this invention may be practiced otherwise than as specifically explained and illustrated without departing from its spirit or scope.

What is claimed is:

1. A microvalve device comprising:
   a pilot microvalve, including:
   a pilot input orifice;
   a pilot output orifice, at least one of the pilot input orifice and the pilot output orifice having a cross-section flow area that changes as the pilot microvalve is actuated; and
   a passageway providing fluid communication between the pilot input orifice and the pilot output orifice; and
   a pilot operated spool valve, including:
   a spool having a surface in fluid communication with the passageway;
   a spool input port; and
   a spool output port, at least one of the spool input port and the spool output port having a cross-section flow area that changes as the spool is actuated, the spool valve being operable by the pilot microvalve such that a ratio of the cross-sectional flow area of the spool input port to the spool output port will substantially equal to a ratio of the cross-sectional flow area of the pilot input orifice to the pilot output orifice.

2. The microvalve device of claim 1, wherein the spool valve is a microvalve.

3. The microvalve device of claim 2, the spool valve including
   a body, defining:
   a micromachined chamber having first and second ends;
   the spool input port for fluid communication into the chamber; and
   the spool output port for fluid communication out of the chamber; and
   a micromachined spool, having:
   first and second ends disposed in the chamber for sliding movement between a first position which allows fluid flow from the spool input port to the spool output port and a second position which restricts fluid flow from the spool input port to the spool output port,
   the spool being positioned by differential pressure across the spool between a first volume of fluid at a control pressure disposed between the first end of the spool and the first end of the chamber and a second volume of fluid at a reference pressure disposed between the second end of the spool and the second end of the chamber,
   the reference pressure being changed by changing the position of the spool valve,
   the first volume of fluid being in fluid communication with the passageway in the pilot microvalve,
   the surface of the spool in fluid communication with the passageway of the pilot microvalve being on the first end of the spool.

4. The microvalve device of claim 3, wherein:
   the spool input port is a reference inlet port in fluid communication with the second volume of fluid into the chamber;
   the spool output port is a reference outlet port in fluid communication with the second volume of fluid out of the chamber; and
   wherein the spool valve body further defines:
   a spool main input port; and
   a spool main output port, at least one of the spool main input port and the spool main output port having a cross-section flow area that changes as the spool is actuated to vary fluid communication through the spool valve between the spool main input port and the spool main output port.

5. The microvalve device of claim 3 wherein the body includes a plate, the plate defining the chamber, and wherein the spool is integrally formed with the plate.

6. The microvalve device of claim 3, wherein the spool input port is a spool main input port and the spool output port is a spool main output port, at least one of the spool main input port and the spool main output port having a cross-section flow area that changes as the spool is actuated to vary fluid communication through a spool valve passageway defined through the spool valve between the spool main input port and the spool main output port, the spool valve passageway being in fluid communication with the second volume of fluid to supply the second volume of fluid with fluid at said reference pressure.

7. The microvalve device of claim 2, wherein the spool valve is formed of a semiconductor material.

8. The microvalve device of claim 1, wherein the spool valve is a standard size valve.

9. The microvalve device of claim 8, the spool valve including:
   a body, defining:
   a chamber having first and second ends;
   the spool input port for fluid communication into the chamber; and
   the spool output port for fluid communication out of the chamber; and
   a spool, having:
   first and second ends disposed in the chamber for sliding movement between a first position which allows fluid flow from the spool input port to the spool output port and a second position which restricts fluid flow from the spool input port to the spool output port,
   the spool being positioned by differential pressure across the spool between a first volume of fluid at a control pressure disposed between the first end of the spool and the first end of the chamber and a second volume of fluid at a reference pressure disposed between the second end of the spool and the second end of the chamber,
   the reference pressure being changed by changing the position of the spool valve,
   the first volume of fluid being in fluid communication with the passageway in the pilot microvalve,
   the surface of the spool in fluid communication with the passageway of the pilot microvalve being on the first end of the spool.

10. The microvalve device of claim 9, wherein
at least one of the spool input port and the spool output port having a cross-section flow area that changes as the spool is actuated to vary fluid communication through a spool valve passageway defined through the spool valve between the spool input port and the spool output port,
the spool valve passageway being in fluid communication with the second volume of fluid to supply the second volume of fluid with fluid at said reference pressure.

11. The microvalve device of claim 10, wherein:
the spool valve passageway is formed in part by a groove defined in an exterior surface of the spool at an axial location intermediate the first end and the second end of the spool; and
the spool defines an internal passageway providing fluid communication between the spool valve passageway and the second volume of fluid.

12. The microvalve device of claim 11, wherein:
the axial location intermediate the first end of the spool and the second end of the spool is a first axial location, and
the spool defines a second groove in the exterior surface thereof at a second axial location between the first axial location and the first end of the spool, the second groove being in fluid communication with the internal passageway of the spool.

13. The microvalve device of claim 12, wherein the second groove extends circumferentially about the spool.

14. The microvalve device of claim 11, wherein the groove defined by the spool includes a larger diameter portion of the spool and a smaller diameter portion of the spool, the smaller diameter portion defining a bottom of the groove, the larger diameter portion of the spool being moveable with the spool relative to the at least one of the spool input port and the spool output port to vary the cross-section flow area between the groove and the at least one of the spool input port and the spool output port.

15. The microvalve device of claim 14, wherein the at least one of the spool input port and the spool output port is the spool input port, the groove having sufficient width that the cross-sectional flow area of the spool output port remains constant in all positions of the spool.

16. The microvalve device of claim 14, wherein:
the at least one of the spool input port and the spool output port is the spool input port;
the groove is defined between the larger diameter portion of the spool and a second larger diameter portion of the spool; and
the second larger diameter portion of the spool is moveable with the spool relative to the spool output port to vary the cross-section flow area between the groove and the spool output port.

17. The microvalve device of claim 1, wherein:
the at least one of the pilot input orifice and the pilot output orifice having a cross-section flow area that changes as the pilot microvalve is actuated is the pilot input orifice, the cross-sectional flow area of the pilot output orifice remaining constant in all positions of the pilot microvalve.

18. The microvalve device of claim 1, wherein both the pilot input orifice and the pilot output orifice have a cross-section flow area that changes as the pilot microvalve is actuated, the cross-sectional flow area of the pilot output orifice varying inversely to the cross-sectional flow area of the pilot input orifice.

19. The microvalve device of claim 18, wherein the pilot microvalve includes a single valve element that is selectively movable to vary the cross-sectional flow area of both the pilot input orifice and the pilot output orifice.

20. A microvalve device, comprising:
a pilot microvalve, including:
a first fluid passageway,
a pilot input orifice in said fluid passageway;
a pilot output orifice in said fluid passageway, at least one of said pilot input orifice and said pilot output orifice being a variable orifice; and
a second fluid passageway in fluid communication with said first fluid passageway between said pilot input orifice and said pilot output orifice; and
a pilot operated valve, including:
a body defining:
a spool input port;
a spool output port;
a third fluid passageway between said spool input port and said spool output port; and
a control port in fluid communication with said second fluid passageway of said pilot microvalve; and
a spool modulating flow through said third fluid passageway, said spool being positioned at least in part by a difference in fluid pressure between said control port and said third fluid passageway, said difference in pressure between said control port and said third fluid passageway tending to drive said spool to a position where said difference in fluid pressure between said control port and said third fluid passageway is minimized.

21. A microvalve device, comprising:
a pilot valve having:
a pilot input port, and
a pilot output port; and
a spool valve having:
a spool input port; and
a spool output port,
the spool valve responding to the pilot valve such that a ratio of the cross-sectional flow area of the spool input port to the spool output port is maintained substantially equal to a ratio of the cross-sectional flow area of the pilot input port to the pilot output port.

22. The microvalve device of claim 21, the spool valve further comprising:
a body defining a chamber having first and second ends, the spool input port providing fluid communication into the chamber, the spool output port providing fluid communication out of the chamber; and
a spool having first and second ends disposed in the chamber for sliding movement between a first position which allows fluid flow from the spool input port to the spool output port and a second position which restricts fluid flow from the spool input port to the spool output port, the spool being disposed between a first volume of fluid at a control pressure and a second volume of fluid at a reference pressure, the first volume of fluid being disposed between the first valve end and the first end of the chamber, the second volume of fluid being disposed between the second valve end and the second end of the chamber, the reference pressure being changed by changing the position of the spool, the spool being urged by any difference in the control pressure and the reference pressure to a position wherein the reference pressure is changed to a pressure equal to the control pressure.

23. The microvalve device of claim 22, wherein the spool valve is a micro spool valve, the spool is micromachined, the body includes a plate, the plate defines the chamber, and wherein the micromachined spool is integrally formed with the plate.

24. The microvalve device of claim 22, wherein:
the spool input port is a reference inlet port providing fluid communication into the chamber to the second volume of fluid;
the spool output port is a reference outlet port providing fluid communication out of the chamber from the second volume of fluid, at least one of the reference inlet port and the reference outlet port having a first reference flow capacity when the spool is in the first position and a flow capacity different from the first reference flow capacity when the spool is in the second position;
the body further defines a main spool input port providing fluid communication into the chamber; and
the body further defines a main spool output port providing fluid communication out of the chamber, at least one of the main spool input port and the main spool output port having a first main spool flow capacity when the spool is in the first position and a flow capacity different from the first main spool flow capacity when the spool is in the second position.

25. The microvalve device of claim 21 wherein the spool valve is a micro spool valve.

26. The microvalve device of claim 21, the spool valve further comprising:
a body defining a spool cavity having a first end and a second end,
a main spool input port communicating with the spool cavity,
a main spool output port communicating with the spool cavity,
a command port adapted to receive a command pressure signal,
the spool input port being a reference inlet port adapted to be connected to a source of fluid at a first pressure,
the spool output port being a reference outlet port adapted to be connected to a region of fluid at a second pressure, less than the first pressure; and
a spool having a command side and a reference side disposed in the spool cavity with the command side next to the first end of the spool cavity, the command end cooperating with the body to define a variable sized command volume between the command side and the first end of the spool cavity, the command volume being in continuous fluid communication with the command port, the reference side of the spool cooperating with the body to define a variable sized reference volume between the reference side of the spool and the second end of the spool cavity, the spool being movable between a first position adjacent the first end of the spool cavity and a second position adjacent the second end of the spool cavity while substantially preventing fluid leakage through the spool cavity between the command volume and the reference volume, the spool permitting fluid communication between the main spool input port and the main spool output port when the spool is in the first position, the spool blocking fluid communication between the main spool input port and the main spool output port when the spool is in the second position, the spool progressively decreasing fluid communication between the reference outlet port and the reference volume and progressively increasing fluid communication between the reference inlet port and the reference volume as the spool is moved from the first position thereof toward the second position thereof to cause pressure to rise in the reference volume as the spool is moved from the first position toward the second position thereof, the spool being moved by a difference in pressures between the command volume and the reference volume.

27. The microvalve device of claim 26, wherein the spool valve is a micro spool valve.

28. The microvalve device of claim 21, further comprising:
a first fluid passageway providing fluid communication between the pilot input port and the pilot output port, at least one of the pilot input port and the pilot output port having a cross-sectional flow area that varies as the pilot valve is actuated;
a second fluid passageway in fluid communication with the first fluid passageway between the pilot input port and the pilot output port;
a third fluid passageway providing fluid communication between the spool input port and the spool output port; and
a spool which is movable to modulate flow through the third fluid passageway, the spool being positioned at least in part by a difference in fluid pressure between the second fluid passageway and the third fluid passageway, the difference in pressure between the second fluid passageway and the third fluid passageway tending to drive the spool to a position where the difference in fluid pressure between the second fluid passageway and the third fluid passageway is minimized.

29. The microvalve device of claim 28, further comprising:
a body defining a spool cavity, the spool being disposed in the spool cavity;
a main spool input port communicating with the spool cavity;
a main spool output port communicating with the spool cavity,
the spool input port being a reference inlet port; adapted to be connected to a source of fluid at a first pressure,
the spool output port being a reference outlet port adapted to be connected to a region of fluid at a second pressure, less than the first pressure,
the spool being movable to simultaneously modulate flow through the spool cavity from the main spool input port to the main spool output port and modulate flow through the third passageway providing fluid communication between the reference inlet port and the reference outlet port.

30. The microvalve device of claim 21, the spool valve further comprising:
a body comprising a plurality of layers, a first layer defining a chamber having first and second ends, a second layer, adjacent the first layer defining the spool input port providing fluid communication into the chamber, one of the second layer and a third layer located adjacent to the first layer on a side of the first layer opposite the second layer defining the spool output port providing fluid communication out of the chamber; and
a spool having first and second ends, the spool being disposed in the first layer for sliding movement in the chamber between a first position which allows fluid flow from the spool input port to the spool output port and a second position which restricts fluid flow the spool input port to the spool output port, the spool being positioned by differential pressure across the spool between a first volume of fluid at a control pressure disposed between the first valve end and the first end of the chamber and a second volume of fluid at a reference pressure disposed between the second valve end and the second end of the chamber, wherein the reference pressure is changed by changing the position of the spool;

a first fluid passageway providing fluid communication between the pilot input port and the pilot output port, at least one of the pilot input port and the pilot output port having a cross-sectional flow area that varies as the pilot valve is actuated;

a second fluid passageway providing fluid communication through at least one of the second and the third layer between the first volume of fluid and the first fluid passageway at a location between the pilot input port and the pilot output port to provide fluid at the control pressure to the first volume of fluid;

a third fluid passageway defined as an aperture through the spool providing selective fluid communication between the spool input port and the spool output port, the spool being movable to modulate flow through the third fluid passageway, a reference channel being defined in at least one of the second layer and the third layer to provide fluid communication between the third fluid passageway, at a location between the spool input port and the spool output port, and the second volume of fluid to provide fluid at the reference pressure to the second volume of fluid.

31. The microvalve device of claim 30, further comprising:

a main spool input port defined through at least one of the second layer and the third layer and communicating with the spool chamber;

a main spool output port defined through at least one of the second layer and the third layer and communicating with the spool chamber, a fourth fluid passageway defined as a second aperture through the spool providing selective fluid communication between the main spool input port and the main spool output port, the spool cross-sectional flow area between the second aperture and at least one of the main spool input port and the main spool output port varying as the spool is moved, the spool input port being a reference inlet port, defined through at least one of the second layer and the third layer; adapted to be connected to a source of fluid at a first pressure, the spool output port being a reference outlet port, defined through at least one of the second layer and the third layer, adapted to be connected to a region of fluid at a second pressure, less than the first pressure, the spool being movable to simultaneously modulate flow through the fourth fluid passageway from the main spool input port to the main spool output port and modulate flow through the third passageway providing fluid communication between the reference inlet port and the reference outlet port.

32. The microvalve device of claim 21, wherein the pilot valve is a microvalve.

33. A method of operating a microvalve device, including:

a) providing a pilot microvalve having a pilot valve fluid passageway, the pilot microvalve fluid passageway being routed through a first pilot orifice and a second pilot orifice, at least one of the first pilot orifice and the second pilot orifice being a variable orifice, the cross-sectional flow area of which variable orifice is governed by actuation of the pilot valve;

b) providing a second fluid passageway in fluid communication with the pilot valve fluid passageway between the first pilot orifice and the second pilot orifice;

c) providing a pilot operated spool valve having a third fluid passageway routed between an input port and an output port, the pilot operated spool valve further having a valve element positioned by a first force created by pressure in the second fluid passageway and a second force created by pressure in the third fluid passageway between the input port and the output port, the second force acting in opposition to the first force, at least one of the input port and the output port being a variable orifice, the cross-sectional flow area of which is dependent upon the position of the valve element of the pilot operated spool valve; and d) operating the pilot microvalve to control the operation of the pilot operated spool valve such that a position change of the pilot microvalve changing a ratio of the cross-sectional flow area of the first pilot orifice to the cross-sectional flow area of the second pilot orifice from a first ratio to a second ratio changes pressure in the second fluid passageway to cause the pilot operated spool valve to move such that a ratio of the cross-sectional flow area of the input port to the cross-sectional flow area of the output port changes from a value substantially equal to the first ratio to a value substantially equal to the second ratio.

* * * * *